United States Patent
Marggraff et al.

(10) Patent No.: US 10,564,714 B2
(45) Date of Patent: Feb. 18, 2020

(54) SYSTEMS AND METHODS FOR BIOMECHANICALLY-BASED EYE SIGNALS FOR INTERACTING WITH REAL AND VIRTUAL OBJECTS

(71) Applicant: GOOGLE LLC, Mountain View, CA (US)

(72) Inventors: Lewis James Marggraff, Lafayette, CA (US); Nelson George Publicover, Reno, NV (US); Spencer James Connaughton, Palo Alto, CA (US); Nathan Lord, San Jose, CA (US); Peter Milford, Los Gatos, CA (US); Ivan Maleev, Pleasanton, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 15/237,581

(22) Filed: Aug. 15, 2016

(65) Prior Publication Data

US 2017/0123492 A1    May 4, 2017
US 2018/0011533 A9    Jan. 11, 2018

Related U.S. Application Data

(63) Continuation-in-part of application No. 14/708,234, filed on May 9, 2015, and a continuation-in-part of
(Continued)

(51) Int. Cl.
*G06F 3/01*         (2006.01)
*G06F 3/0488*       (2013.01)
(Continued)

(52) U.S. Cl.
CPC ......... *G06F 3/013* (2013.01); *G02B 27/0093* (2013.01); *G02B 27/017* (2013.01);
(Continued)

(58) Field of Classification Search
CPC ..... A61B 3/113; G05F 3/012; G06T 2200/24; G02B 27/0093; G06F 1/163; G06F 3/013
See application file for complete search history.

(56) References Cited

U.S. PATENT DOCUMENTS 3,798,599 A    3/1974   Kafafian
3,863,243 A    1/1975   Skolnick
(Continued)

FOREIGN PATENT DOCUMENTS

EP    0679984 A1    4/1995
EP    0984347 A2    8/1998
(Continued)

OTHER PUBLICATIONS

Díaz Tula, Antonio; Morimoto, Carlos Hitoshi. Dynamic and meta-context switching for gaze-based interaction. SBC Journal on Interactive Systems, Rio de Janeiro, v. 6, n. 1, p. 66-75, 2015. (Year: 2015).*
(Continued)

*Primary Examiner* — Khalil Naghdali

(57) ABSTRACT

Systems and methods are provided for discerning the intent of a device wearer primarily based on movements of the eyes. The system may be included within unobtrusive headwear that performs eye tracking and controls screen display. The system may also utilize remote eye tracking camera(s), remote displays and/or other ancillary inputs. Screen layout is optimized to facilitate the formation and reliable detection of rapid eye signals. The detection of eye signals is based on tracking physiological movements of the eye that are under voluntary control by the device wearer. The detection of eye signals results in actions that are compatible with wearable computing and a wide range of display devices.

28 Claims, 36 Drawing Sheets

Related U.S. Application Data application No. 14/708,241, filed on May 9, 2015, now Pat. No. 9,600,069, and a continuation-in-part of application No. 14/708,229, filed on May 9, 2015, now abandoned.

(60) Provisional application No. 62/205,707, filed on Aug. 15, 2015, provisional application No. 62/252,347, filed on Nov. 6, 2015, provisional application No. 62/319,751, filed on Apr. 7, 2016, provisional application No. 61/991,435, filed on May 9, 2014, provisional application No. 62/023,940, filed on Jul. 13, 2014, provisional application No. 62/027,774, filed on Jul. 22, 2014, provisional application No. 62/027,777, filed on Jul. 22, 2014, provisional application No. 62/038,984, filed on Aug. 19, 2014, provisional application No. 62/039,001, filed on Aug. 19, 2014, provisional application No. 62/046,072, filed on Sep. 4, 2014, provisional application No. 62/074,920, filed on Nov. 4, 2014, provisional application No. 62/074,927, filed on Nov. 4, 2014.

(51) Int. Cl.
| | |
|---|---|
| G06F 3/0484 | (2013.01) |
| G06F 3/03 | (2006.01) |
| G06F 21/32 | (2013.01) |
| G06K 9/00 | (2006.01) |
| G06T 19/00 | (2011.01) |
| H04L 29/06 | (2006.01) |
| H04N 5/232 | (2006.01) |
| H04N 5/247 | (2006.01) |
| H04W 12/06 | (2009.01) |
| G02B 27/01 | (2006.01) |
| G02B 27/00 | (2006.01) |
| G06F 3/023 | (2006.01) |

(52) U.S. Cl.
CPC ......... *G02B 27/0172* (2013.01); *G06F 3/017* (2013.01); *G06F 3/0236* (2013.01); *G06F 3/0304* (2013.01); *G06F 3/04845* (2013.01); *G06F 3/04886* (2013.01); *G06F 21/32* (2013.01); *G06K 9/00604* (2013.01); *G06T 19/006* (2013.01); *H04L 63/0861* (2013.01); *H04N 5/23229* (2013.01); *H04N 5/247* (2013.01); *H04W 12/06* (2013.01); *G02B 2027/014* (2013.01); *G02B 2027/0138* (2013.01); *G02B 2027/0141* (2013.01); *G02B 2027/0178* (2013.01); *G02B 2027/0187* (2013.01); *G06F 2203/011* (2013.01)

(56) References Cited

U.S. PATENT DOCUMENTS

| | | | |
|---|---|---|---|
| 4,359,724 A | | 11/1982 | Zimmerman et al. |
| 4,737,040 A | * | 4/1988 | Moon ............... G06F 3/018 178/30 |
| 4,815,839 A | | 3/1989 | Waldorf |
| 4,850,691 A | | 7/1989 | Gardner et al. |
| 4,953,111 A | | 8/1990 | Yamamoto et al. |
| 5,214,456 A | | 5/1993 | Gersten |
| 5,345,281 A | | 9/1994 | Taboada et al. |
| 5,402,109 A | | 3/1995 | Mannik |
| 5,469,143 A | | 11/1995 | Cooper |
| 5,481,622 A | | 1/1996 | Gerhardt et al. |
| 5,517,021 A | | 5/1996 | Kaufman et al. |
| 5,566,067 A | | 10/1996 | Hobson et al. |
| 5,570,698 A | | 11/1996 | Liang et al. |
| 5,682,144 A | | 10/1997 | Mannik |
| 5,689,241 A | | 11/1997 | Clarke, Sr. et al. |
| 5,748,113 A | | 5/1998 | Torch |
| 5,844,544 A | * | 12/1998 | Kahn ............... G06F 3/013 345/156 |
| 5,867,587 A | | 2/1999 | Aboutalib et al. |
| 5,886,683 A | | 3/1999 | Tognazzini |
| 5,912,721 A | | 6/1999 | Yamaguchi et al. |
| 6,003,991 A | | 12/1999 | Viirre |
| 6,087,941 A | | 7/2000 | Ferraz |
| 6,097,295 A | | 8/2000 | Griesinger et al. |
| 6,102,870 A | | 8/2000 | Edwards |
| 6,163,281 A | | 12/2000 | Torch |
| 6,204,828 B1 | | 3/2001 | Amir et al. |
| 6,243,076 B1 | | 6/2001 | Hatfield |
| 6,246,344 B1 | | 6/2001 | Torch |
| 6,260,968 B1 | | 7/2001 | Stark et al. |
| 6,323,884 B1 | | 11/2001 | Bird et al. |
| 6,334,683 B2 | | 1/2002 | Apple et al. |
| 6,346,929 B1 | | 2/2002 | Fukushima |
| 6,456,262 B1 | | 9/2002 | Bell |
| 6,526,159 B1 | | 2/2003 | Nickerson |
| 6,542,081 B2 | | 4/2003 | Torch |
| 6,549,644 B1 | | 4/2003 | Yamamoto |
| 6,577,329 B1 | | 6/2003 | Flickner et al. |
| 6,608,615 B1 | | 8/2003 | Martins |
| 6,867,752 B1 | | 3/2005 | Yamazaki et al. |
| 6,919,907 B2 | | 7/2005 | Berstis |
| 6,932,090 B1 | | 8/2005 | Reschke |
| 7,029,121 B2 | | 4/2006 | Edwards |
| 7,071,831 B2 | | 7/2006 | Johns |
| 7,245,273 B2 | | 7/2007 | Eberl et al. |
| 7,365,738 B2 | | 4/2008 | Molander et al. |
| 7,401,920 B1 | | 7/2008 | Kranz et al. |
| 7,429,108 B2 | | 9/2008 | Rosenberg |
| 7,460,940 B2 | | 12/2008 | Larsson et al. |
| 7,488,294 B2 | | 2/2009 | Torch |
| 7,515,054 B2 | | 4/2009 | Torch |
| 7,561,143 B1 | | 7/2009 | Milekic |
| 7,760,910 B2 | | 7/2010 | Johnson et al. |
| 7,850,306 B2 | | 12/2010 | Uusitalo et al. |
| 7,881,493 B1 | | 2/2011 | Edwards et al. |
| 8,120,577 B2 | | 2/2012 | Bouvin et al. |
| 8,185,845 B2 | | 5/2012 | Bjorklund et al. |
| 8,311,267 B2 | | 11/2012 | Miyake et al. |
| 8,339,446 B2 | | 12/2012 | Blixt et al. |
| 8,382,285 B2 | | 2/2013 | Eberl et al. |
| 8,462,949 B2 | | 6/2013 | Anderson et al. |
| 8,564,533 B2 | | 10/2013 | Yuan |
| 8,593,375 B2 | | 11/2013 | Maltz |
| 8,643,680 B2 | | 2/2014 | Baldwin et al. |
| 2001/0028309 A1 | | 10/2001 | Torch |
| 2003/0038754 A1 | | 2/2003 | Goldstein et al. |
| 2003/0091215 A1 | | 5/2003 | Lauper et al. |
| 2003/0156742 A1 | | 8/2003 | Witt et al. |
| 2004/0061680 A1 | | 4/2004 | Taboada |
| 2005/0007552 A1 | | 1/2005 | Fergason et al. |
| 2005/0047629 A1 | | 3/2005 | Farrell et al. |
| 2005/0243054 A1 | | 11/2005 | Beymer et al. |
| 2005/0243277 A1 | | 11/2005 | Nashner |
| 2006/0217816 A1 | | 9/2006 | Pesaran et al. |
| 2007/0024579 A1 | | 2/2007 | Rosenberg |
| 2009/0018419 A1 | | 1/2009 | Torch |
| 2009/0125849 A1 | | 5/2009 | Bouvin |
| 2009/0289895 A1 | | 11/2009 | Nakada et al. |
| 2010/0045596 A1 | | 2/2010 | De Leon |
| 2010/0165093 A1 | | 7/2010 | Sugio et al. |
| 2011/0085700 A1 | | 4/2011 | Lee |
| 2011/0175932 A1 | | 7/2011 | Yu et al. |
| 2011/0211056 A1 | | 9/2011 | Publicover et al. |
| 2012/0081666 A1 | | 4/2012 | Kiderman |
| 2012/0105486 A1 | | 5/2012 | Lankford et al. |
| 2012/0154277 A1 | | 6/2012 | Bar Zeev et al. |
| 2012/0154557 A1 | | 6/2012 | Perez et al. |
| 2012/0272179 A1 | | 10/2012 | Stafford |
| 2012/0293773 A1 | | 11/2012 | Publicover et al. |
| 2012/0294478 A1 | | 11/2012 | Publicover et al. |
| 2013/0050258 A1 | | 2/2013 | Liu et al. |
| 2013/0114850 A1 | | 5/2013 | Publicover et al. |
| 2013/0135196 A1 | | 5/2013 | Park et al. |
| 2013/0176533 A1 | | 7/2013 | Raffle |

(56) References Cited

U.S. PATENT DOCUMENTS

| | | | |
|---|---|---|---|
| 2013/0207887 A1 | 8/2013 | Raffle et al. | |
| 2013/0293844 A1 | 11/2013 | Gross et al. | |
| 2013/0336547 A1 | 12/2013 | Komogortsev | |
| 2014/0002352 A1 | 1/2014 | Jacob et al. | |
| 2014/0062853 A1 | 3/2014 | Chaundhri et al. | |
| 2014/0092006 A1 | 4/2014 | Boelter et al. | |
| 2014/0096077 A1 | 4/2014 | Jacob | |
| 2014/0129987 A1 | 5/2014 | Feit et al. | |
| 2014/0139652 A1 | 5/2014 | Aiden et al. | |
| 2014/0143407 A1 | 6/2014 | Kruglick | |
| 2014/0173407 A1 | 6/2014 | Kruglick | |
| 2014/0184775 A1 | 7/2014 | Drake et al. | |
| 2014/0204029 A1 | 7/2014 | Lopez et al. | |
| 2014/0232638 A1 | 8/2014 | Choi et al. | |
| 2014/0237366 A1 | 8/2014 | Poulos | |
| 2014/0240220 A1 | 8/2014 | Moon et al. | |
| 2014/0247210 A1* | 9/2014 | Henderek | G06F 3/02 345/156 |
| 2014/0285641 A1 | 9/2014 | Kato et al. | |
| 2014/0289833 A1 | 9/2014 | Briceno | |
| 2014/0289834 A1 | 9/2014 | Lindemann | |
| 2014/0362346 A1 | 12/2014 | Leinonen | |
| 2014/0380230 A1* | 12/2014 | Venable | G06F 3/013 715/781 |
| 2015/0169050 A1 | 6/2015 | Publicover | |
| 2015/0212576 A1 | 7/2015 | Ambrus et al. | |
| 2015/0220157 A1 | 8/2015 | Marggraff et al. | |
| 2015/0323990 A1* | 11/2015 | Maltz | G02B 27/0179 345/173 |
| 2015/0324568 A1 | 11/2015 | Publicover et al. | |
| 2015/0338915 A1* | 11/2015 | Publicover | G06F 21/64 345/633 |
| 2016/0062459 A1 | 3/2016 | Publicover et al. | |
| 2016/0085302 A1 | 3/2016 | Publicover et al. | |
| 2016/0274660 A1 | 9/2016 | Publicover et al. | |
| 2017/0123492 A1 | 5/2017 | Publicover et al. | |

FOREIGN PATENT DOCUMENTS

| | | |
|---|---|---|
| EP | 0989722 A1 | 3/2000 |
| EP | 2679147 A2 | 12/2013 |
| KR | 10-2011-0125460 A | 11/2011 |
| WO | 188857 A1 | 11/2001 |
| WO | 2006092022 A1 | 9/2006 |
| WO | 2007050029 A2 | 5/2007 |
| WO | 2011006760 A1 | 1/2011 |
| WO | 2012082444 A1 | 6/2012 |
| WO | 2013060826 A1 | 5/2013 |
| WO | 2013144807 A1 | 10/2013 |
| WO | 2014111924 A1 | 7/2014 |
| WO | 2014134623 | 9/2014 |
| WO | 2015172124 A1 | 12/2015 |
| WO | 2016018487 A2 | 4/2016 |

OTHER PUBLICATIONS

Antonio Diaz Tula, Filipe M. S. de Campos, and Carlos H. Morimoto. 2012. Dynamic context switching for gaze based interaction. In Proceedings of the Symposium on Eye Tracking Research and Applications (ETRA '12), Stephen N. Spencer (Ed.). ACM, New York, NY, USA, 353-356. (Year: 2012).*

Antonio Diaz Tula and Carlos H. Morimoto. 2014. Meta-keys: extending the functionality of gaze-based interaction. In Proceedings of the 13th Brazilian Symposium on Human Factors in Computing Systems (IHC '14). Sociedade Brasileira de Connputação, Porto Alegre, Brazil, Brazil, 285-292. (Year: 2014).*

Examination Report dated Jul. 14, 2017 for Australian Application No. 2015297035, 6 pages.

Final Office Action dated Jul. 14, 2017 for U.S. Appl. No. 15/131,273, 41 pages.

Final Office Action dated Jul. 12, 2017 for U.S. Appl. No. 14/437,782, 33 pages.

Notice of Allowance dated Jun. 28, 2017 for U.S. Appl. No. 14/930,617, 13 pages.

Non-Final Office Action dated Jul. 7, 2017 for U.S. Appl. No. 14/708,234, 24 pages.

Final Office Action dated Apr. 14, 2016 for U.S. Appl. No. 14/937,782, 22 pages.

Final Office Action dated Jul. 15, 2016 for U.S. Appl. No. 14/930,617, 22 pages.

Final Office Action dated Mar. 20, 2017 for U.S. Appl. No. 14/708,234, 17 pages.

Final Office Action dated Nov. 22, 2016 for U.S. Appl. No. 14/937,782, 24 pages.

Final Office Action dated Nov. 25, 2016 for U.S. Appl. No. 15/131,273, 22 pages.

Non-Final Office Action dated Apr. 21, 2016 for U.S. Appl. No. 14/930,617, 34 pages.

Non-Final Office Action dated Feb. 17, 2016 for U.S. Appl. No. 14/937,782, 19 pages.

Non-Final Office Action dated Jul. 15, 2016 for U.S. Appl. No. 14/937,782, 23 pages.

Non-Final Office Action dated Jul. 20, 2016 for U.S. Appl. No. 15/131,273, 23 pages.

Non-Final Office Action dated Jul. 26, 2016 for U.S. Appl. No. 14/708,234, 17 pages.

Non-Final Office Action dated Mar. 20, 2017 for U.S. Appl. No. 14/937,782, 26 pages.

Non-Final Office Action dated Mar. 29, 2017 for U.S. Appl. No. 15/131,273, 29 pages.

Notice of Allowance dated Apr. 5, 2017 for U.S. Appl. No. 14/708,229, 10 pages.

Notice of Allowance dated Apr. 5, 2017 for U.S. Appl. No. 14/930,617, 7 pages.

Notice of Allowance dated Nov. 23, 2016 for U.S. Appl. No. 14/930,617, 16 pages.

International Preliminary Report on Patentability correlating to PCT/U52015/030050 (EYE-023 WO), dated Nov. 15, 2016, 26 pages.

International Search Report and Written Opinion correlating to PCT/US2015/030047 (G14025T WO), dated Aug. 25, 2015, 8 pages.

International Search Report and Written Opinion correlating to PCT/US2016/047105 (G14026T WO), dated Dec. 20, 2016, 56 pages.

International Search Report and Written Opinion correlating to PCT/US2015/030050 (EYE-023 WO), dated Mar. 31, 2016, 28 pages.

Dario D. Salvucci, "Inferring intent in eye-based interfaces: tracing eye movements with process models", Proceedings of the SIGCHI conference on Human Factors in Computing Systems, May 15-20, 1999, p. 254-261.

International Preliminary Report on Patentability correlating to PCT/US2015/030047 (EYE-025 WO), dated Nov. 15, 2016, 6 pages.

Notice of Allowance dated Oct. 12, 2017 for U.S. Appl. No. 14/708,229, 22 pages.

International Preliminary Report on Patentability dated Feb. 20, 2018 for PCT/US2016/047105, 54 pages.

Examination Report dated Feb. 14, 2018 for Australian Application No. 2015297035, 4 pages.

Search Report dated Nov. 23, 2017 for European Patent Application No. 15826370, 8 pages.

Extended European Search Report dated Oct. 30, 2017 for EP Application No. 15789095.5, 8 pages.

Examination Report dated May 16, 2017 for Australian Application No. 2015255652, 3 pages.

Non-Final Office Action dated Apr. 4, 2018 for U.S. Appl. No. 14/708,229, 30 pages.

Examination Report No. 3 dated Oct. 26, 2017 for Australian Application No. 2015297035, 7 pages.

Final Office Action dated Oct. 31, 2017 for U.S. Appl. No. 14/708,234, 28 pages.

Examination Report No. 2 dated May 16, 2017 for Australian Application No. 2015255652, 3 pages.

(56) References Cited

OTHER PUBLICATIONS

Communication Pursuant to Rules 70(2) and 70a(2) dated Dec. 12, 2017 for European Application No. 15826370.7, 1 page.
Communication Pursuant to Rules 70(2) and 70a(2) dated Nov. 16, 2017 for European Application No. 15789095.5, 1 page.
Notice of Allowance dated Jun. 18, 2018 for correlating Australian Application No. 2015297035, 3 pages.
English Translation of Chinese Office Action dated Feb. 19, 2019 for CN Application No. 20150031094.1, 18 pages.
Examination Report dated Feb. 18, 2019 for European Application No. 15789095.5, 7 pages.
Final Office Action dated Jan. 25, 2019 for U.S. Appl. No. 14/708,229, 13 pages.
Supplementary European Search Report dated Feb. 1, 2019 for corresponding EP Application No. 16837677, 9 pages.
Morimoto, Carlos H. et al., "Context Switching for Fast Key Selection in Text Entry Applications," Proceedings of the 2010 Symposium on Eye-Tracking Research and Applications, ACM Press, Mar. 22, 2010, pp. 271-274.
Office Action dated Oct. 23, 2018 for corresponding Chinese Patent Application No. 201580035714.9, with English translation; 57 pages.
English Translation of Office Action dated Aug. 6, 2019 for corresponding Japanese Application No. 2017-511568, 9 pages.
English Translation of Chinese Office Action dated Oct. 10, 2019 for CN Application No. 20150031094.1, 19 pages.
Examination Report dated Oct. 23, 2019 for European Application No. 15826370.7, 6 pages.

\* cited by examiner

SYSTEMS AND METHODS FOR BIOMECHANICALLY-BASED EYE SIGNALS FOR INTERACTING WITH REAL AND VIRTUAL OBJECTS

RELATED APPLICATION DATA

The present application claims benefit of provisional application Ser. No. 62/025,707, filed Aug. 15, 2015, 62/252,347, filed Nov. 6, 2015, and 62/319,751, filed Apr. 7, 2016, and is a continuation-in-part of application Ser. Nos. 14/708,234, 14/708,241, and 14/708,229, all filed May 9, 2015, which benefit of provisional application Ser. No. 61/991,435, filed May 9, 2014, 62/023,940, filed Jul. 13, 2014, 62/027,774, filed Jul. 22, 2014, 62/027,777, filed Jul. 22, 2014, 62/038,984, filed Aug. 19, 2014, 62/039,001, filed Aug. 19, 2014, 62/046,072, filed Sep. 4, 2014, 62/074,920, filed Nov. 4, 2014, and 62/074,927, filed Nov. 4, 2014, the entire disclosures of which are expressly incorporated by reference herein.

COPYRIGHT NOTICE

Contained herein is material that is subject to copyright protection. The copyright owner has no objection to the facsimile reproduction by anyone of the patent document or the patent disclosure, as it appears in the United States Patent and Trademark Office patent file or records, but otherwise reserves all rights to the copyright whatsoever. The following notice applies to the software, screenshots and data as described below and in the drawings hereto and All Rights Reserved.

FIELD OF THE INVENTION

The present invention relates generally to systems and methods for Discerning the Intent of a User (DIU) and subsequently controlling and interacting with computing and other devices primarily using one's eyes with optional ancillary input support. The system utilizes techniques within the fields of Human-Machine Interfaces (HMIs), wearable computing, human physiology, image processing, and deep learning. The system can be implemented within unobtrusive eye-tracking headwear and/or remote eye-tracking hardware that can optionally be associated with head-mounted displays (HMD), remote displays, and/or other wearable sensors or actuators. The system may provide a user with an easy-to-use, intuitive, and flexible input mechanism to control and interact with local or remote computing devices.

BACKGROUND

Computer mice, joysticks, and other manual tracking devices are ubiquitous tools for specifying positional information during human-machine interactions. With the advent of wearable computing, such bulky and obtrusive devices that, for example, generally require stationary surfaces for proper operation, are incompatible with the portable nature of apparatus that are designed to be worn on the body.

Eye tracking may be used to view displays and to purposefully specify positional information relative to virtual objects on a display or real objects within a device user's environment. However, the eyes are also used extensively during normal human activities. Thus, a challenge when using eye position as an input data stream for interaction and control is to discern the intent of a user (DIU) based on eye movements. One of the goals of the systems and methods herein is to distinguish between movements of the eye that are associated with normal daily activities versus conscious or voluntary movements, herein referred to as "eye signals," that are intended to interact with, and control, a device.

New paradigms are required to discern intent from eye movements while retaining the ability of individuals to visualize and interact with their environment.

SUMMARY

In view of the foregoing, systems and methods are provided herein for substantially continuously discerning the various intents or operational objectives of one or more users, based substantively on purposeful movements of one or more eyes.

In accordance with one embodiment, a method for providing a graphical user interface to determine intent of a user based at least in part on movement of the user's one or both eyes using a detector is provided that includes identifying, with the detector, when the user's one or both eyes blink; confirming, with the detector, that an eye movement of the user's one or both eyes starts within a predetermined post-blink blink duration following the blink; classifying, with the detector, that the eye movement is saccadic based on a saccadic velocity of the user's one or both eyes exceeding a predetermined, post-blink saccadic threshold velocity; and performing an action associated with the saccadic eye movement.

In accordance with another embodiment, a method for providing a graphical user interface to convey intent of a user based at least in part on movement of the user's one or both eyes using a detector and a display is provided that includes identifying, with the detector, when the user's one or both eyes are directed at an object; identifying, with the detector, a saccade of the user's one or both eyes from the object towards a target location on the display; based at least in part on identifying the saccade, moving, on the display during the saccade, locations of one or more displayed objects within a predefined region around the target location on the display; confirming, with the detector, that the saccade is completed to within a pre-determined distance from the target location; determining, with the detector, one or more eye gaze movements that follow one of the displayed objects, thereby identifying a followed object; and performing an action related to one or more of the target location and the followed object.

In accordance with another embodiment, a method for providing a graphical user interface to convey intent of a user based at least in part on movement of the user's one or both eyes using a detector is provided that includes identifying, with the detector, when the user's one or both eyes are directed at a first key on a first keyboard; identifying, with the detector, a first saccade of the user's one or both eyes from the first key towards a second key on a second keyboard; confirming, with the detector, that the first saccade is completed to within a pre-determined distance from a location of the second key; and performing an action associated with one or both of the first key and the second key, without waiting for perception of the second key by the user.

In accordance with yet another embodiment, a method for providing a graphical user interface to convey intent of a user based at least in part on movement of the user's one or both eyes using a detector is provided that includes providing a first keyboard including a first area having a plurality of keys and a second keyboard including a second area having a plurality of keys; identifying, with the detector, when the user's one or both eyes are directed at the first area of the first keyboard; identifying, with the detector, when the user's one or both eyes are directed at a first key on the first keyboard; identifying, with the detector, a first saccade of the user's one or both eyes from the first key towards the second area of the second keyboard; confirming, with the detector, that the first saccade is completed within the second area of the second keyboard; and performing an action associated with the first key, without waiting for perception of the second area of the second keyboard by the user.

In accordance with still another embodiment, a method for providing a graphical user interface to convey intent of a user based at least in part on movement of the user's one or both eyes using a detector is provided that includes presenting on a display a first field including a first area having a plurality of icons and a second field including a second area having a plurality of icons; identifying, with the detector, when the user's one or both eyes are directed at the first area of the first field; identifying, with the detector, when the user's one or both eyes are directed at a first icon in the first field; identifying, with the detector, a first saccade of the user's one or both eyes from the first icon towards the second area of the second field; confirming, with the detector, that the first saccade is completed within the second area of the second field; and upon confirming that the first saccade is completed from the first icon to the second area, performing an action associated with the first icon, without waiting for perception of the second area by the user.

In accordance with another embodiment, a method for providing a graphical user interface to convey intent of a user based at least in part on movement of the user's one or both eyes using a keyboard and a detector is provided that includes identifying, with the detector, when the user's one or both eyes are directed at a first key on the keyboard; identifying, with the detector, a first saccade of the user's one or both eyes from the first key towards a second key on the keyboard; confirming, with the detector, that the saccade is completed to within a pre-determined distance from a location of the second key; and performing an action associated with one or both of the first key and the second key, without waiting for perception of the second key by the user.

In accordance with yet another embodiment, a method for providing a graphical user interface to convey intent of a user based at least in part on movement of the user's one or both eyes using a keyboard and a detector is provided that includes identifying, with the detector, when the user's one or both eyes are directed at a first key on the keyboard; identifying, with the detector, a first saccade of the user's one or both eyes from the first key towards a second key on the keyboard; identifying, with the detector, one or more corrective saccades of the user's one or both eyes further directed towards the second key on the keyboard; confirming, with the detector, that at least one of the one or more corrective saccades is completed to within a pre-determined distance from a location of the second key; and performing an action associated with one or both of the first key and the second key, without waiting for perception of the second key by the user.

In accordance with still another embodiment, a method for providing a graphical user interface to convey intent of a user based at least in part on movement of the user's one or both eyes using a keyboard, and a detector is provided that includes identifying, with the detector, when the user's one or both eyes are directed within a predetermined distance from a location of a first key on the keyboard; identifying, with the detector, a first saccade of the user's one or both eyes from the first key towards a second key on the keyboard; confirming, with the detector, that the saccade is completed to within a pre-determined distance from a location of the second key; and performing an action associated with one or both of the first key and the second key, without altering a display so as to not attract attention of the user.

In accordance with yet another embodiment, a method for providing a graphical user interface to convey intent of a user based at least in part on movement of the user's one or both eyes using a keyboard, a display, and a detector is provided that includes identifying, with the detector, when the user's one or both eyes are directed at a first location on the keyboard; identifying, with the detector, a first saccade of the user's one or both eyes from the first location towards an auto-fill activation target at an auto-fill activation target location on the display; showing, within a predetermined region around the auto-fill activation target location on the display, one or more completion elements of a data set; performing a selection eye movement to indicate selection of one of the one of the more completion elements, thereby identifying a selected completion element; and appending the selected completion element to the data set.

In accordance with yet another embodiment, a method for providing a graphical user interface to convey intent of a user based at least in part on movement of the user's one or both eyes using a keyboard, and a detector is provided that includes identifying, with the detector, when the user's one or both eyes are directed within a predetermined distance from a location of a first key on the keyboard; identifying, with the detector, a first saccade of the user's one or both eyes from the first key towards a second key on the keyboard; identifying, with the detector, one or more additional saccades of the user's one or both eyes towards one or more additional keys on the keyboard; identifying, with the first saccade and the one or more additional saccades, a pattern of eye movements; classifying, using the pattern of eye movements as input to a neural network, one or more alphanumeric characters; and performing an action related to the one or more alphanumeric characters.

In accordance with another embodiment a method for providing a graphical user interface to convey intent of a user based at least in part on movement of the user's one or both eyes using a detector and a display is provided that includes identifying, with the detector, when the user's one or both eyes are directed at a first location; identifying, with the detector, a first saccade of the user's one or both eyes from the first location towards a first activation target at a first activation target location on the display; removing the first activation target from the display and presenting a second activation target on the display at a second activation target location that is different compared to the first activation target location; identifying, with the detector, a second saccade of the user's one or both eyes from the first activation target location towards a second location on the display; confirming, with the detector, that the second saccade is completed to within a predetermined distance from the second location; identifying, with the detector, a third saccade of the user's one or both eyes from the second location towards the second activation target location on the display; and performing an action related to one or more of the first location, the first activation target, the second location and the second activation target.

In accordance with yet another embodiment, a method for providing a graphical user interface to convey intent of a user based at least in part on movement of the user's one or both eyes using a detector is provided that includes identifying, with the detector, when the user's one or both eyes are directed at a viewed position within a scale; identifying, with the detector, a saccade of the user's one or both eyes from the viewed position within the scale towards an activation target at an activation target location; confirming, with the detector, that the saccade is completed within a pre-determined distance from the activation target location; and performing an action related to one or both of the viewed position within the scale relative to a location of the scale, and the activation target.

In accordance with another embodiment, a method for providing a graphical user interface to discern intent of a user based at least in part on movement of the user's one or both eyes using a detector is provided that includes identifying, with the detector, when the user's one or both eyes are directed within a predetermined distance from an object at an object location; identifying, with the detector, a saccade of the user's one or both eyes from the object towards a target at a target location; confirming, with the detector, that the saccade is completed to within a pre-determined distance from the target location; and performing an action associated with one or more of the object, object location, target and target location, prior to perception of the target, wherein the action comprises providing a user feedback designed to not attract a visual attention of the user.

In accordance with yet another embodiment, a method for providing a graphical user interface to determine intent of a user based at least in part on movement of the user's one or both eyes using a detector and a viewing device is provided that includes identifying, with the detector, when the user's one or both eyes are directed at an object at an object location; identifying, with the detector, a first saccade of the user's one or both eyes from the object location towards a first target at a first target location; during the first saccade, altering, with the viewing device, the user's view of the first target, thereby producing a gap effect, identifying, with the detector, a second saccade of the user's one or both eyes from the first target location toward a second target at a second target location; confirming, with the detector, that the second saccade is completed within a pre-determined distance from the second target location; and performing an action related to one or more of the object, the object location, the first target, the first target location, the second target, and the second target location.

In accordance with still another embodiment, a method for providing a graphical user interface to determine intent of a user based at least in part on movement of the user's one or both eyes using a display and a detector is provided that includes identifying, with a scene camera directed away from the user, objects located within the environment of the user; determining, with a data base of object templates, whether one or more objects located within the environment of the user are high-importance objects; receiving, using a telecommunications apparatus, an incoming data set destined for showing on the display; and showing the incoming data set on the display only when no high-importance objects are determined to be present in the environment of the user.

In accordance with another embodiment, a method to determine intent of two (2) wearable-device users based at least in part on movement of the users' one or both eyes using a scene camera and a detector is provided that includes identifying, with a scene camera operatively coupled to a first wearable device associated with a first wearable-device user, a region within one or more scene camera images that includes one or both eyes of a second wearable-device user; identifying, using image recognition, when the one or both eyes of the second wearable-device user are directed, within a predetermined angular range, toward the first wearable-device user; confirming that the one or both eyes of the second wearable-device user are directed toward the first wearable-device user for a predetermined time; and allowing electronic communication between the first wearable device associated with the first wearable-device user and a second wearable device associated with the second wearable-device user.

In accordance with another embodiment, a method for providing a graphical user interface to determine intent of a user based at least in part on movement of the user's one or both eyes using a display, one or more scene cameras and a detector is provided that includes identifying, with the one or more scene cameras directed towards an environment of the user, viewed objects in the environment of the user; receiving, using a telecommunications apparatus, one or more incoming data sets destined for showing on the display; and determining, based on one or more predetermined user preferences, a selection and timing of data sets shown to the user on the display.

In accordance with yet another embodiment, a method to determine intent of a wearable-device user based at least in part on movement of the user's one or both eyes using a scene camera and a detector of a wearable device associated with the wearable-device user is provided that includes identifying, with the scene camera of the wearable device, a region within one or more scene camera images that includes one or both eyes of a viewed individual; identifying, using the detector and scene camera, that a gaze of the wearable-device user is directed, within a predetermined angular range, toward the one or both eyes of the viewed individual; identifying, using image recognition, when the one or both eyes of the viewed individual are directed, within a predetermined angular range, toward the wearable-device user; and performing, with the wearable device, an action.

In accordance with another embodiment, a method to determine intent of two (2) wearable device users based at least in part on movement of the users' one or both eyes using a scene camera and one or more beacons is provided that includes identifying, with a scene camera operatively coupled to a first wearable device associated with the first wearable-device user, a region within one or more scene camera images that includes one or more beacons from a second wearable device associated with a second wearable-device user; identifying, with the scene camera, a code broadcast by the one or more beacons of the second wearable device associated with the second wearable device user; confirming, with a data base of access codes, that the code broadcast by the beacon permits access to a data base of information regarding the second wearable device user; and allowing electronic communication between the first wearable device associated with the first user and a data base containing information regarding the second wearable device user.

In accordance with still another embodiment a method to determine intent of a user based at least in part on movement of the user's one or both eyes using a detector is provided that includes identifying, with the detector, when the user's one or both eyes move in a manner that is determined to be a purposeful eye movement; identifying, using a data base of eye movement templates, an eye action associated with the purposeful eye signal; identifying, at substantially the same time, a user input generated by an input device not associated with the user's one or both eyes; identifying a device action associated with the user input generated by the input device; and performing, based on a data base of input hierarchies, one of an eye action associated with the purposeful eye signal and a device action associated with the user input.

In accordance with yet another embodiment, a method for moving a pointer on one or more displays based at least in part on movement of a user's one or both eyes using a detector and a pointing device is provided that includes identifying a source location on a source display of a pointer wherein the position of the pointer is controlled, at least in part, by a pointing device; identifying, with the detector, when the user's one or both eyes are directed at a target location on a target display; confirming, with the pointing device, a movement of the pointing device in a direction, within a predetermined directional range, toward the target location on the target display relative to the source location on the source display; and displaying the pointer at a new pointer location on the target display within a predetermined distance away from the target location.

In accordance with another embodiment, a method for providing a graphical user interface to determine intent of a user based at least in part on movement of the user's one or both eyes using a display and a detector is provided that includes displaying, on the display, a section of a musical score; identifying, with the detector, when the user's one or both eyes are directed at a viewing location within the displayed section of the musical score; identifying, with a data base that includes the musical score, one or more break locations within the musical score; confirming, with the detector, that the viewing location is within a predetermined distance from at least one of the break locations within the musical score; and displaying a new section of the musical score.

In accordance with still another embodiment, a method for providing a graphical user interface to convey intent of a user when controlling a vehicle based at least in part on movement of the user's one or both eyes using a detector, a scene camera and a display is provided that includes showing, on the display operatively coupled to the scene camera, video images of the environment of the vehicle; identifying, with the detector, when the user's one or both eyes are directed at a target location within video images of the environment of the vehicle on the display; identifying, with the detector, a first saccade of the user's one or both eyes from the target location on the display towards an activation target on the display; confirming, with the detector, that the saccade is completed to within a pre-determined distance from a location of the activation target; and causing the vehicle to move toward a destination location in the environment of the vehicle represented by the target location on the display.

In accordance with yet another embodiment, a method for providing a graphical user interface to convey intent of a user when driving a vehicle based at least in part on movement of the user's one or both eyes using a detector is provided that includes identifying, with the detector, when the user's one or both eyes are directed at an object at an object location; identifying, with the detector, a first saccade of the user's one or both eyes from the object location towards an activation target at a target location on a display; confirming, with the detector, that the saccade is completed to within a pre-determined distance from the target location; confirming, with the detector, that the user's one or both eyes are directed within a predetermined time, to within a predefined direction range, towards a direction of movement of the vehicle; and performing an action related to one or more of the object and the activation target.

In accordance with still another embodiment, a method for providing a graphical user interface to augment a user's memory based at least in part on movement of the user's one or both eyes using a detector is provided that includes identifying, with the detector, when the user's one or both eyes are directed within a predetermined distance from a location of a store object; identifying, with the detector, a first saccade of the user's one or both eyes from the store object location towards a storage activation target at a target location; confirming, with the detector, that the saccade is completed to within a pre-determined distance from the target location; performing, with a memory device, a store function comprising storing a data set associated with the store object to a location within a plurality of data sets that corresponds to a storage data set index, and incrementing the storage data set index by one (1).

In accordance with another embodiment, a method for providing a graphical user interface to augment a user's memory based at least in part on movement of the user's one or both eyes using a detector and a display is provided that includes identifying, with the detector, when the user's one or both eyes are directed at a retrieve object at a retrieve object location on a display; identifying, with the detector, a first saccade of the user's one or both eyes from the retrieve object location on the display towards a retrieve activation target at a target location; confirming, with the detector, that the saccade is completed to within a pre-determined distance from the target location; performing, with a memory device, a retrieve function comprising retrieving a retrieved data set from a location that corresponds to a retrieve data set index within a plurality of data sets.

In accordance with another embodiment, a method for providing a graphical user interface to augment a user's memory based at least in part on movement of the user's one or both eyes using a detector is provided that includes performing, when a saccade from an object to within a pre-determined distance from a location of a storage activation target is identified using the detector, a storage function of a data set associated with the object at a location within a plurality of data sets that corresponds to a storage data set index, and incrementing the storage data set index by one (1); performing, when a saccade from an object to within a pre-determined distance from a location of a retrieval activation target is identified using the detector, a retrieval function of a data set associated with the object at a location within a plurality of data sets that corresponds to a retrieval data set index; selecting, when a saccade to an up activation target is identified using the detector, a retrieval data set index by incrementing the retrieval data set index by one (1); selecting, when a saccade to a down activation target is identified using the detector, a retrieval data set index by decrementing the retrieval data set index by one (1); and performing, when a saccade from an object to within a pre-determined distance from a location of a delete activation target is identified using the detector, a delete function that comprises one or more of deleting the object at a location within an plurality of data sets that corresponds to a retrieval data set index and decreasing the storage data set index by one (1).

In accordance with yet another embodiment, a method for providing a user interface to enhance document security based at least in part on a direction of the one or both eyes of a user using one or more eye cameras directed at the user's one or both eyes, and a scene camera directed at an environment of the user, is provided that includes acquiring, using the one or more eye cameras, one or more images of the user's one or both eyes; determining, by comparing the one or more images of the user's one or both eyes to a data base of known identity eye templates, an identity of the user; identifying, using the scene camera, a document that viewed by the user's one or both eyes; confirming, using the one or more eye cameras, that the user's one or both eyes are directed toward the document; and electronically acknowledging the document to indicate that the identified user has viewed the document.

In accordance with still another embodiment, a method for providing a graphical user interface to determine intent of a user based at least in part on movement of the user's one or both eyes using a display, a head motion detector and an eye position detector is provided that includes displaying, on the display, a plurality of displayed objects; identifying, with the eye position detector, when the user's one or both eyes are directed towards one of the plurality of displayed objects, thereby identifying a viewed object; identifying, with the head movement detector, a head movement by the user in a first direction; confirming, with the eye movement detector, an eye movement of the user's one or both eyes; classifying whether the eye movement is vestibule-ocular based on whether the eye movement causes the user to continue to view the viewed object during the head movement; and determining that the eye movement is not vestibulo-ocular, and consequently moving the plurality of displayed objects on the display in the first direction.

In accordance with yet another embodiment, a method for providing a user interface to convey intent of a user based at least in part on movement of the user's one or both eyes using a detector and a scene camera is provided that includes identifying, with the detector, when the user's one or both eyes are directed at a first viewed location within an environment of the user; identifying, with the scene camera, a first viewed object at the first viewed location within the environment of the user; identifying, using a data base of object templates, the first viewed object thereby creating a first identified viewed object; identifying, with the detector, when the user's one or both eyes perform an eye movement toward a second viewed location within the environment of the user; identifying, with the scene camera, a second viewed object at the second viewed location within the environment of the user; identifying, using the data base of object templates, the second viewed object thereby creating a second identified viewed object; confirming, using a data base of activatable objects, that the second identified viewed object is corresponds to an activation target; and performing an action related to one or more of the first identified viewed object, the first viewed location, the second identified viewed object, and the second viewed location.

In accordance with still another embodiment, a method for providing a user interface to convey intent of a user based at least in part on movement of the user's one or both eyes using a detector, a scene camera and a display is provided that includes identifying, with the detector, when the user's one or both eyes are directed at a viewed location within an environment of the user; identifying, with the scene camera, a viewed object at the viewed location within the environment of the user; identifying, using a data base of object templates, the viewed object thereby creating an identified viewed object; identifying, with the detector, when the user's one or both eyes perform one or more eye movements from the identified viewed object towards one of one or more activation targets on the display; confirming, with the detector, that the one or more eye movements are completed to within a pre-determined distance from the one of the one or more activation targets, thereby creating a selected activation target; and performing an action related to one or more of the first identified viewed object, and the selected activation target.

In accordance with another embodiment, a method for adjusting recognition of signaling a user's intent within a graphical user interface comprising an electronic display using a detector based at least in part on a user's cognitive state, physiological condition, or eye movement history is provided that includes observing at least one of a user's cognitive state, neurological condition, physiological condition, and eye movement history; identifying, using the detector, at least one known eye signal indicated by an eye movement to communicate user intent that may be performed by a predefined movement of the user's eye or eyes; and adjusting a tolerance for recognition of the at least one known signal based on one or more of the user's cognitive state, physiological condition, or eye movement behavior prior to or during the at least one known signal.

In accordance with still another embodiment, a method for adjusting response to a recognition of signaling of a user's intent within a graphical user interface comprising an electronic display using a detector based at least in part on a user's cognitive state, physiological condition or eye movement history, is provided that includes observing at least one of a user's cognitive state, neurological condition, physiological condition, and eye movement history; identifying at least one known eye signal to communicate user intent, the eye signal comprising one or more of a predefined movement of the user's one or both eyes, pupil dilation of the user's one or both eyes, and pupil restriction of the user's one or both eyes; recognizing the at least one known eye signal based upon at least one of the user's cognitive state, physiological condition, or eye movement behavior prior to or during the at least one known signal; adjusting a response to the at least one known eye signal by altering at least one of timing of the response, selection of graphics to be presented as a part of the response, transition of graphical elements shown as a part of the response, timing of any part of the response, and action taken as a part of the response.

In accordance with yet another embodiment, a method for providing a graphical user interface to determine intent of a user based at least in part on movement of the user's one or both eyes using a headset and a detector is provided that includes determining, with the headset, motions in a region of the user's head; determining, based on one or more of an amplitude and a frequency of the motions of the user's head, an eye movement stringency range; confirming, with the detector, that one or more eye movements of the user's one or both eyes match one or more of a template of eye-signal movements within an eye movement stringency range; and performing an action related to the one or more eye movements.

In accordance with another embodiment, method for providing a graphical user interface to determine intent of a user based at least in part on movement of the user's one or both eyes using a headset is provided that includes determining, with the headset, ambient lighting in a region of the user's head; determining, based on one or more of an amplitude and changes in ambient lighting, an eye movement stringency range; confirming, with an eye movement detector mounted on the headset, that one or more eye movements of the user's one or both eyes match one or more of a template of eye-signal movements within an eye movement stringency range; and performing an action related to the one or more eye movements.

In accordance with still another embodiment, a method for providing a graphical user interface to determine intent of a user based at least in part on movement of the user's one or both eyes using a detector and a display is provided that includes identifying, with the detector, when the user's one or both eyes are directed toward an initially viewed object on the display at an initially viewed object location; determining, using a data base of preferred magnification centers for objects shown on the display, a preferred location on the display of a center for a magnification of all objects on the display that are within a predefined distance from the initially viewed object location; identifying, with the detector, when the user's one or both eyes follow a tracked object during the magnification of all objects on the display that are within the predefined distance from the initially viewed object location; confirming, with the detector, that the tracked object is followed during the magnification for one of a predetermined distance and a predetermined time, thereby identifying a selected object; and performing an action related to the selected object.

In accordance with yet another embodiment, a method for providing a graphical user interface to determine intent of a user based at least in part on movement of the user's one or both eyes using a detector and a display is provided that includes identifying, with the detector, when the user's one or both eyes are directed toward an initially viewed object on the display at an initially viewed object location; determining, using a data base of preferred magnification centers for objects shown on the display, a preferred location on the display of a center for a magnification of all objects on the display that are within a predefined distance from the initially viewed object location; identifying, with the detector, when the user's one or both eyes follow a tracked object during the magnification of all objects on the display that are within the predefined distance from the initially viewed object location; confirming, with the detector, that the tracked object is followed during the magnification for one of a predetermined distance and a predetermined time, thereby identifying a selected object; and performing an action related to the selected object.

In accordance with another embodiment, a method for providing a graphical user interface to determine intent of a user based at least in part on movement of the user's one or both eyes using a detector, a display, and a keyboard is provided that includes identifying, with the detector, when the user's one or both eyes are directed at a region on the display containing a plurality of selectable targets; superimposing, on the display, a plurality of keyboard symbols wherein each of the keyboard symbols is associated with one or more of the selectable targets; confirming, with the keyboard, that the user selects a key on the keyboard that corresponds to one of the keyboard symbols associated with one or more selectable targets, thereby identifying one or more selected targets; and performing an action related to the one or more selected targets.

In accordance with still another embodiment, a method for providing a graphical user interface to determine intent of a user based at least in part on movement of the user's one or both eyes using a detector, a display, and a microphone is provided that includes identifying, with the detector, when the user's one or both eyes are directed at a region on the display that contains a plurality of selectable targets; superimposing, on the display, a plurality of symbols wherein each of the symbols is associated with one or more of the selectable targets; confirming, with the microphone and a data base of sound templates, that the user produces a sound that corresponds to one of the symbols associated with one or more of the selectable targets, thereby identifying one or more selected targets; and performing an action related to the one or more selected targets.

In accordance with yet another embodiment, a method to determine gaze direction to convey intent of a user using a detector and a display is provided that includes identifying, with the detector, a right eye gaze location of the user when viewing a target object on the display at a target object location; identifying, with the detector, a left eye gaze location of the user when viewing the target object on the display; determining which of the left eye gaze location and right eye gaze location is closer to the target object location; and assigning, based on which eye gaze direction is closer to the location of the target object, an eye dominance for a range of locations within a predetermined range around the target object location.

In accordance with another embodiment, a method to determine gaze direction to convey intent of a user based at least in part on movement of the user's eye using a detector and a display is provided that includes identifying, with the detector, when the user's eye is directed at a first object, appearing at a first object distance; identifying, with the detector, when the user's eye is directed at a second object on the display, appearing at a second object distance that differs from the first object distance; modifying, using the display, one or more of the position and size of the second object on the display; confirming that the first object and the second object appear to overlap maximally when viewed by the user's eye; and determining, based on a location of the first object and a location of the second object, a visual axis of the user's eye.

In accordance with still another embodiment, a method for displaying images on a display within a transmission bandwidth based at least in part on a gaze location of a device user's one or both eyes using a detector and a display is provided that includes identifying, with the detector, when the user's one or both eyes are directed at a gaze location on the display; identifying, based on the gaze location, a foveal viewing region on the display within a field-of-view of the user; identifying, based on a data base of viewable objects, displayed objects that are high-relevancy objects to the device user; and rendering, using the display, objects that are one or more of within the foveal view and high-relevancy objects, at high resolution compared with remaining objects within the user's field-of-view.

In accordance with yet another embodiment, a method for displaying images on a display within a transmission bandwidth based at least in part on a gaze location of a device user's one or both eyes using a detector and a display is provided that includes identifying, with the detector, when the user's one or both eyes are directed at a gaze location on the display; identifying, based on the gaze location, a foveal viewing region on the display within a within a predetermined area surrounding the gaze location; identifying, based on the user's field-of-view outside the foveal viewing region, a non-foveal viewing region on the display; and rendering, using the display, objects in the non-foveal region with reduced color content.

In accordance with still another embodiment, a method for displaying images on a display within a predetermined transmission bandwidth based at least in part on a gaze location of a user's one or both eyes using a gaze detector and a display is provided that includes identifying, with the gaze detector, when the user's one or both eyes are directed at a gaze location on the display; identifying, based on the gaze location, a high-resolution viewing region on the display within a field-of-view of the user; rendering, using the display, objects in the high-resolution viewing region on the display at higher resolution compared with remaining objects on the display within the user's field-of-view outside the high-resolution viewing region; and modifying, based on an amount of light reaching the user's one or both eyes, one of a size and shape of the high-resolution viewing region on the display.

In accordance with another embodiment, a method for measuring eye gaze to determine intent of a user based at least in part on movement of the user's one or both eyes using a detector is provided that includes identifying, with the detector, when the user's one or both eyes are directed at a first viewing location relative to an object's reference location; determining, using a saliency map associated with the object, a first weight factor based on the first viewing location relative to the object's reference location; identifying, with the detector, when the user's one or both eyes are directed at a second viewing location relative to the object's reference location; determining, using the saliency map associated with the object, a second weight factor based on the second viewing location relative to the object's reference location; and determining a weighted average viewing location based on the first viewing location multiplied by the first weight factor, and the second viewing location multiplied by the second weight factor.

In accordance with yet another embodiment, a method for providing a graphical user interface to convey intent of a user based at least in part on movement of the user's one or both eyes using a detector and a display is provided that includes identifying, with the detector, when the user's one or both eyes are directed at a first location on the display; confirming, with the detector, that a first saccade of the user's one or both eyes from the first location towards an area selection target is completed to within a predetermined distance from a location of the area selection target; identifying, with the detector, when the user's one or both eyes are directed at a second location on the display; confirming, with the detector, that a second saccade of the user's one or both eyes from the second location towards an activation target is completed to within a predetermined distance from a location of the activation target; identifying, based on objects projected onto the display, all objects bounded by a rectangular region having corners at the first location and the second location; and performing an action related to the activation target, on all objects on the display bounded by the rectangular region having corners at the first location and the second location.

Other aspects and features of the present invention will become apparent from consideration of the following description taken in conjunction with the accompanying drawings.

BRIEF DESCRIPTION OF THE DRAWINGS

A more complete understanding of the present invention may be derived by referring to the detailed description when considered in connection with the following illustrative figures. In the figures, like-reference numbers refer to like-elements or acts throughout the figures. The presently exemplary embodiments are illustrated in the accompanying drawings, in which:

FIG. 30A demonstrates an exemplary eye-signal process to select a specific cell within a spreadsheet.

FIG. 30B shows a single frame during the pursuit process illustrated in FIG. 30A to select a single cell within a spreadsheet.

DETAILED DESCRIPTION OF THE EXEMPLARY EMBODIMENTS

Timing Considerations During Eye Signalling

Figure 1A:
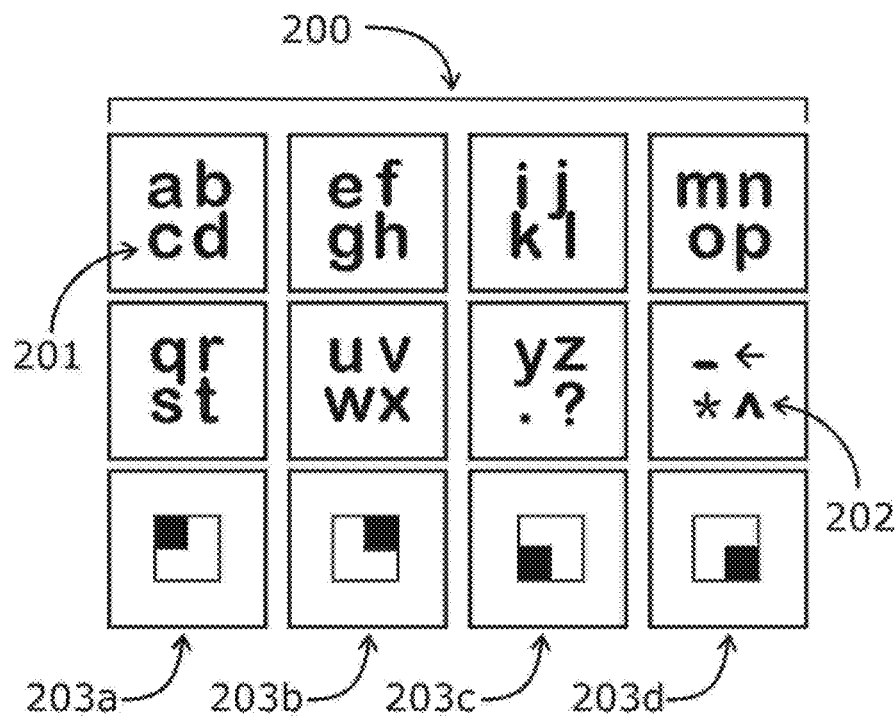
FIG. 1A is an exemplary display that allows eye-signal data entry via a selection of 1 of 4 items from each of 8 locations.

In order to interpret eye movements to discern user intent, algorithmic filters must take into account both the physiological constraints (e.g., range of movements, maximum velocities, differences in movements in horizontal and vertical axes) of neuromuscular control of the eye as well as interruptions in the cognitive processing of visual information caused by rapid eye movements and blinks. These interruptions in the cognitive processing of a visual field are a necessary component to view our environment without pervasive motion-blur during saccades or stoppages (i.e., brief periods of darkness) during blinks. Such disruptions are avoided in humans by suppressing the visual processing of retinal signals during saccades and blinks. These neural processes are referred to as saccadic suppression and blink suppression, respectively.

Saccadic suppression (also known as saccadic masking) actually begins before a saccadic movement is initiated. This observation is used as evidence that at least a portion of saccadic suppression is mediated by the central nervous system. Saccadic suppression prevents an awareness of motion blur that would otherwise be present during rapid eye movements, including saccades. A simple demonstration of saccadic suppression (and the first scientific observation of the phenomenon in 1898 by Erdmann and Dodge) is the fact that rapid eye movements cannot be observed in a mirror by an individual making the eye movements, whereas other observers viewing the individual (or mirror) can clearly see such movements.

Saccadic suppression generally lasts 100-150 milliseconds, terminating promptly (i.e., within a few milliseconds) when rapid eye movement stops. Saccadic suppression stops normally at the end of a saccade or, under artificial conditions, when images projected onto the eye shows no further motion. A demonstration of rapidly terminating suppression during the movement of a visual scene is the ability of an individual to view an object when looking outward from within a rapidly moving vehicle by briefly matching the rate of scene movement with a (saccadic) eye movement. Even a few milliseconds of stationary image projection onto the retina allows the perception of such a rapidly moving scene. These observations suggest that neural processing at the level of the retina (i.e., distinct from the central nervous system) is involved in the control or maintenance of saccadic suppression.

For a brief period of about 50-60 milliseconds following saccadic landing at a target location, structures within the eye including the pupil, lens and limbus continue to move in the form of decaying oscillations. If processed by the brain, movement of the lens in particular would continue to cause motion-based blur of images as they reach the retina. In order to avoid such motion blur, saccadic suppression persists into this period of decaying oscillatory movement of structures within the eye.

Blink suppression inhibits the awareness of "darkness" during the time when the upper eyelid covers the pupil, preventing most light from reaching the retina. Blink suppression occurs regardless of whether the blink is voluntary or involuntary (i.e., spontaneous or reflexive), and generally occurs in both eyes simultaneously. Blink suppression occurs even if light is artificially introduced into the retina by bypassing the light-blocking function of the eyelid.

Blink suppression begins prior to a blink and lasts 200-250 milliseconds, ending after the upper eyelid stops covering the pupil. Maximum upper eyelid velocities differ, depending on direction; reaching 700°/second in the down direction and 2,000°/second in the up direction. Factors such as drowsiness can affect maximal eyelid velocities as well as the duration that the eyelid remains closed.

In humans, blinks occur, on average, 15-20 times/minute. Using the range of blink suppression durations just described, this results in an individual being functionally "blind" due to blinks about 5-8% of the time. Along a similar line of reasoning, under typical conditions an individual performs saccadic movements about 40 times per minute. Using the range of saccadic suppression durations just described, this results in an individual being functionally "blind" due to saccadic suppression approximately 7-10% of the time. The aggregate effect of these suppressions results in a typical individual being functionally "blind" about 15% of the time. This value can vary depending on a number of factors including the individual, cognitive load, so-called "day dreaming", fatigue, attentiveness, stress, medications, lighting, and the task (e.g., reading, conversation) being performed. Of particular relevance in some applications is the substantial decrease (up to 5-fold) in blink rate when viewing a display device.

In humans, there also exists an interaction between blinks and saccades. If a blink is followed closely (e.g., up to 200 milliseconds) by a saccade, then the acceleration, peak velocity and deceleration of the saccade are decreased. On the other hand, if a blink follows a saccade, there is no significant influence on blink dynamics. A maximal effect results from a blink that precedes a saccade by approximately 100 milliseconds. The net result is a prolonged saccade duration, approximately one-third greater than the duration calculated based on the saccadic distance traveled. Thus, a threshold velocity for classifying an eye movement as saccadic may be reduced from a typical (i.e., not following a blink) threshold of greater than 30°/second to a post-blink threshold of greater than 20°/second.

Blinks can also affect subsequent vergence movements, although at least some of this effect may be due to an influence on small saccadic movements during vergence. One possibility of the basis for the effects of a blink on a saccade is the suppression of shared, premotor neural circuitry during a blink influencing the process of initiating a saccade. This shared neural circuitry may also play a role in gaze-evoked blinks. In humans and other mammals, large shifts in gaze increase the likelihood of a blink to about 20%.

Within exemplary embodiments during eye-signalling processes, functional blindness may affect anticipated user reaction times. Such interruptions and changes in eye dynamics need to be accounted for in eye-signal selection criteria. This arises because the occurrence of blinks is generally not synchronized with the formation of eye signals. In addition, rapid movements such as corrective saccades may be interspersed during some eye signal sequences and not others. Furthermore, the occurrence of a blink prior to a saccade changes saccade dynamics. Thus, for optimum eye-interaction performance, blinks and other periods of functional blindness must be detected and taken into account when controlling the timing of user perception (if employed by the user), selection processes, and/or the controlled appearance or disappearance of displayed objects.

As a specific example, if an object is to be introduced immediately at the end of a saccade in a manner designed to attract attention during an activation sequence involving a closely timed pair of sequential saccadic eye movements, then the timing of object introduction must take into account the presence of any blinks. If a blink occurs just prior to a saccade, then the additional saccadic duration (i.e., beyond that computed for the distance traveled by the saccade) forces a need to delay the display of the newly introduced object. It is also important, for example, not to mistakenly interpret the increased duration of a saccadic movement following a blink as some form of smooth pursuit, vestibulo-ocular movement or fixation that could be a component of a different activation sequence.

In general, eye signals that are based on the control or measurement of the timing of events must take into account the lack of visual processing during saccadic and blink suppressions. These include briefly revealed menu selections, times to make user decisions, measurements of reaction times, presentation of stimuli to motivate or avoid subconscious eye-movements, timing of elimination of targets to produce a gap effect, timing of the introduction or alteration of imagery to benefit from change blindness, the implementation of tools supporting a storyteller taking advantage of visual suppression to change elements in a scene, etc.

Another consideration related to saccadic movements involves the saccadic suppression of image displacement and/or so-called "blank effect." The saccadic suppression of image displacement is a cognitive process that allows a certain amount of movement at the target location of a saccade to not be perceived by the visual system. The area over which objects can be moved without detection is up to 2°, roughly the size of a typical foveal view. Processes are thought to involve a visual short term memory and/or transsaccadic memory.

It is interesting to note that the ability to detect object movement may be increased by inserting a "blank" field (absent target object) for 50-300 milliseconds prior to re-introduction of objects. It is thought that permitting a small amount of "slop" in the detected locations of objects following a saccade avoids a constant perception of movement resulting from any differences between expected and actual target locations.

In exemplary embodiments during eye signalling, the blank effect may be used to advantage by (when desired) shifting the locations of one or more objects in a target region during a saccade without attracting attention. Conversely, the insertion of a brief blank field may be used to help "guide" the eye of a user to a moving object at a target location. Such a moving object can, for example, be the initial stage of displaying one or more (i.e., N, "N" being a positive integer typically greater than zero (0)) objects to make a 1-of-N selection detected by a smooth pursuit-based, purposeful following of a selected object by the user.

Saccadic Variability

Short-distance saccades tend to overshoot and longer saccades (greater than approximately 5°) tend to undershoot targets. Long-distance saccades typically cover 90% of the target distance followed by a 10% corrective saccade. Centripetal saccades tend to be more accurate than centrifugal saccades. Corrections made after an undershoot or overshoot may have a long or short latency. Corrective saccades can be performed quickly (i.e., dynamic undershoot or overshoot) or require several hundred milliseconds (i.e., glissadic undershoot or overshoot). Target properties, principally luminance, can affect the latency of a corrective saccade. When luminance falls below a foveal threshold, latencies may increase significantly.

Saccades tend to be slower in darkness, when directed toward non-visual targets, or in the presence of certain pathologies. Saccadic duration can also be affected by visual stimuli other than the target and the sequence of other saccades.

Taken together, within exemplary embodiments, algorithmic filters to detect the presence of directed saccadic eye movements must consider such delays and variability. In addition, luminance may be controlled to optimize rates of saccadic (including corrective saccadic) and other forms of eye movements. In situations where overall luminance may not be controlled, algorithmic filters may take into consideration general effects of elevated or reduced luminance when identifying saccadic sequences.

Within descriptions below that reference, for example, "dual" or "single" saccadic movements, such purposeful saccades must be recognized and distinguished within the presence of other eye movements, including other forms of saccades. These intervening eye movements include one or more (generally short-distance) corrective saccades, blinks, tremors, drift and the like.

Additionally, as mentioned above, the pupil and (generally to a somewhat lesser extent) the limbus may exhibit displacements that appear as a damped oscillation as a saccadic eye movement reaches its target destination. The primary oscillatory frequency of these movements is generally about 20 Hertz (i.e., a period of 50 milliseconds). The damped oscillation can typically be detected for about 50-60 milliseconds. This results in the ability to observe 1-3 such damped oscillations. Saccadic suppression persists during this time period. Otherwise, motion blur would be apparent within observed scenes.

Saccadic Sequences in the Absence of Perception

Perception is not possible during saccadic suppression, including during the damped oscillations that occur during saccadic landings. Thus, within exemplary embodiments, during saccadic sequences designed to convey intent where perception of target objects is not a necessary component of conveying intent, the time during which damped oscillations occur are also not a necessary component to convey intent. In other words, if perception were required, then the time for perception (200-250 milliseconds) as well as the time of the damped oscillation during a saccadic landing (50-60 milliseconds) during which the user in functionally blind would limit the rate of purposeful eye movements used to convey intent. Not requiring perception eliminates the need for both of these periods.

In exemplary embodiments within the eye signal language, an experienced user may perform a number of saccades designed to convey intent without fully perceiving each or any of the objects that are targets for the saccadic sequences. If, aided by user experience, perception is not performed, then inter-saccade intervals may be greatly reduced and one or more user intents may be conveyed much more rapidly.

An experienced user generally develops an increasing reliance on memory-guided saccades to convey intent. Although a visual target is still generally required for a memory-guided saccade, the target object need not be fully examined (i.e., requiring full perception). In addition, selection targets are frequently located in parafoveal or peripheral views. As described in the section below entitled "High Resolution Rendering of High-Relevancy Objects", although object details are generally not well-perceived within these views, there remains a strong awareness of object location.

Within exemplary embodiments, it is possible to saccade to a first object without a full perception of the object. It is then possible to perform an action and/or a subsequent saccade to a second object without, at any time, fully perceiving the first object. The action associated with moving toward the first object may be performed as soon as a saccadic landing location is determined based on the ballistic profile of the saccadic eye movement. Thus, one or more actions may be performed prior to a conscious awareness of the next "purposeful" (i.e., conveying intent) eye movement (or other modality of conveying intent).

It is even possible to remove the display of the first object prior to perception, thus producing the so-called "gap effect." As described elsewhere herein, the gap effect may have the effect of "releasing" the eye from viewing (or fully perceiving) the first object, further promoting a rapid saccadic transition toward another object.

Dual-Saccade Selection Sequences (DSSS) of Multiple Choices (e.g., Keyboard)

As disclosed previously, within the eye-signal language, smooth pursuit eye motions may be used to make 1-of-N selections by visually following selected pursuit objects. This mechanism facilitates a certain "flow" of eye movements during the formation of eye signals that may be particularly effective when a relatively small number of sequential selection sequences (typically 1, still referenced herein as a "sequence", but up to a few) are performed with a limited number of selections (typically 2 to 8). Maximum values for these numbers of sequences and/or selections are not meant to limit the use of smooth pursuit-based mechanisms; rather, they are suggestions based on comfortable and efficient use.

When the number of selections, N, becomes large, it becomes more physiologically efficient (i.e., takes less time and effort) to instead use rapid saccadic eye movements to make selections. An iconic and particularly useful example of a large-N selection process is typing. In the English language, this entails selecting from 26 letters, 10 numeric digits and/or a number of other "special" characters (e.g., "$", "@", "#", etc.), punctuation (e.g., ",", ".", "?", etc.) and functions/commands (e.g., capitalize, shift and control keys, end typing, etc.).

Within descriptions below, references to a "keyboard" may include a standard (e.g., so-called QWERTY) keyboard commonly used for typing, alternative typing-layout keyboards, a keypad commonly used for numeric entry, or any other selection matrix that may include, for example, alphanumeric (i.e., alphabetical and/or numeric) characters, punctuation, directional arrows, so-called special characters, images, function keys, drawing functions, text editing functions, short-cuts (i.e., collections of functions) and the like. The keyboard may be adapted to a specific set of possible selections such as the days of the week, months of the year, time of day with predetermined increments (e.g., every 15 minutes), states or provinces within a country, colors, font selections and/or sizes, contacts, software applications, machine control functions and the like. The keyboard or selection matrix may be real (i.e., a physical object) or virtual (i.e., projected as a portion of a display), or a combination of real and virtual keys (keys projected on a central display device with additional physical keys located outside the display area).

Further, individual keys within a "keyboard" (i.e., selection matrix) may represent higher level thoughts and/or concepts. Keyboard selections may represent words, phrases or even complete sentences. Keys may include iconographic pictures or diagrams such as those associated with Chinese language symbols/meanings. Keys may also include static or dynamic (i.e., animated) media glyphs, including those that are universal, not associated with any individual or particular language. Symbols, images and/or glyphs may change over time as a result of previously entered keys, an identified user, time-of-day, only when being viewed, and/or other contextual elements.

An overriding constraint when using the eyes to type is the accuracy that gaze vectors can be determined during rapid eye movements (e.g., without using statistical methods such as averaging over prolonged dwell periods or taking the time to "zoom in" on a gaze region). Gaze accuracy of the system (including in the presence of tremors, microsaccades, drift, and other biological aspects) limits the number of distinct regions or areas that can be pointed to during the selection process using saccadic eye movements. A method to overcome this limitation over highly confined display areas is to use multiple saccadic eye movements to make each selection within a sequence of selections. This may be thought of as a "selection tree" where smaller branches permit selections from smaller subsets of the overall selection group.

It is possible to cascade three (3) or more sequential saccadic eye movements to specify a selection, particularly using a strategy in which selections dynamically change depending on initial saccade(s); however, this is generally required only for very large N's (e.g. >50). Thus, dual-saccade selection sequences (DSSS) are easiest to use, and are described in detail below. The same general principles may be use with three (3) or more saccades to make each selection.

Figure 6:
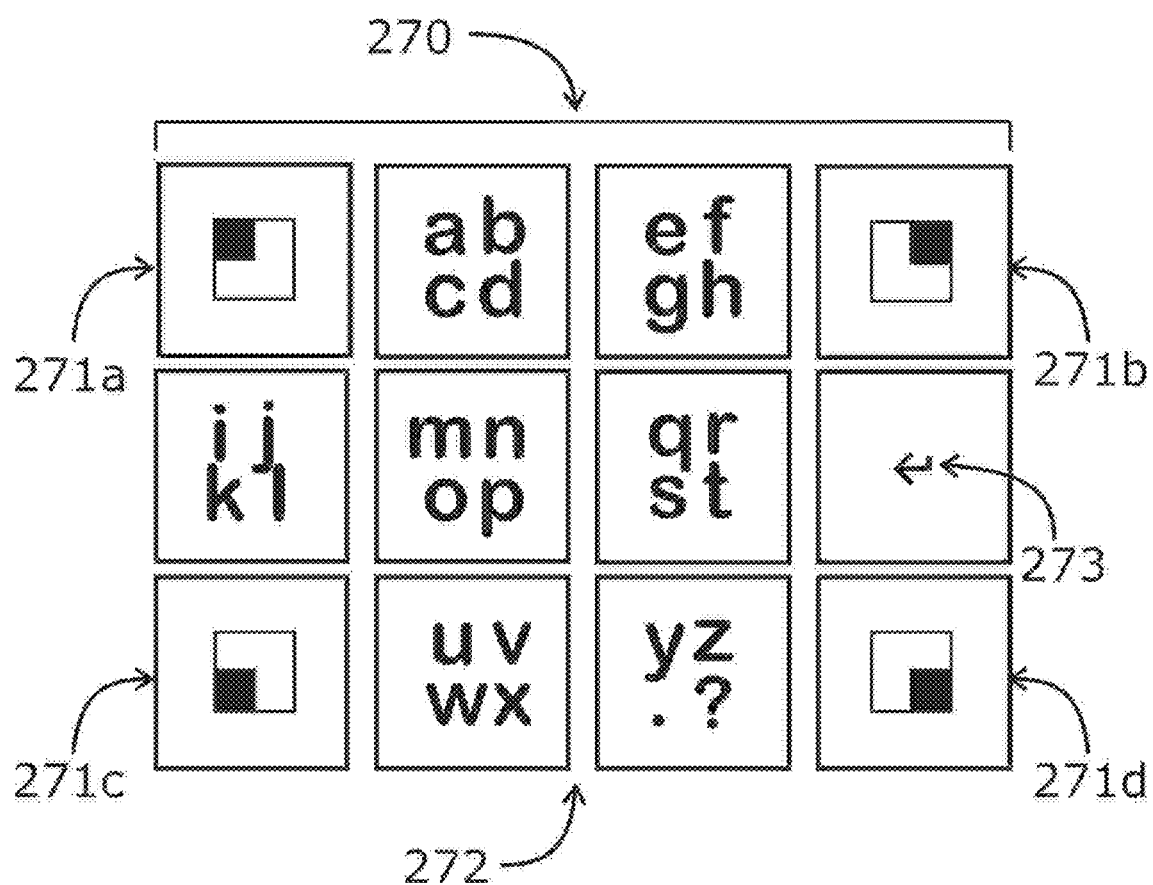
FIG. 6 is an alternative display layout in which 1-of-4 characters/functions are selected by saccading to 1-of-4 corners of the display area.

It is also not necessary to use the same number of layers (or "branches" with the selection tree structure) for all possible selections. Commonly used and/or "important" selections may be setup to require fewer saccades for activation. As described in greater detail below, FIG. 6 is an example of a layout 270 in which most selections are made using a dual saccade sequence, but functions associated with the selection of a so-called "carriage return" 273 are performed using a single saccadic eye movement.

A second constraint that must be considered when developing eye-signal language components is allowing users to search for and find "target" locations. In some cases (i.e., generally involving a small number of selections), an experienced user may be able to know the locations of common selection sequences and execute memory-guided saccades based on such remembered locations. However, in most cases, a user must be allowed to search for potential target choices prior to performing selections. Surveying and searching generally involve saccadic eye movements. Thus, eye-signal components must 1) allow for any number of searching eye movements and 2) be able to distinguish purposeful saccadic movements that perform the selection process.

Furthermore, when saccading to a target location, whether to indicate a "purposeful" eye movement or to simply visually explore the environment, one or more corrective saccades and/or other forms of eye movements (e.g., tremor, oscillation) may occur. These are generally involuntary eye movements that may intervene between saccades and/or other forms of voluntary movements (e.g., smooth pursuit, vestibulo-ocular, vergence). Algorithms designed to determine gaze target locations (as well as the timing and other characteristics of eye movements) must allow for these forms of intervening movements.

For example, when saccading to a target location, an initial saccadic eye movement (either predicted or measured) may not fall within a predetermined threshold distance from the target. However, one or more corrective saccades may cause a user's gaze to progressively approach the target. If, as a result of the one or more corrective saccades, gaze is determined to be within the predetermined threshold distance from the target, then the target is considered to have been selected and an associated action may be initiated.

FIG. 1A is an example of a DSSS English-alphabet keyboard constrained to a 4 (horizontal) by 3 (vertical) eye-gaze selection grid 200. Each grid location contains either 4 characters/functions or a selection specification (203a, 203b, 203c, 203d) that identifies one (1) of the four (4) characters/functions within the character/function grid location. Icons that represent the characters/functions or selection process are generally located in the central region of the grid location, providing a central focus (i.e., away from edges that might spill over into adjacent grid locations) for accurate tracking of eye movements within the grid location.

Any character 201 may be specified by first moving (generally using a saccadic eye movement) to the grid location that contains the desired character/function (along with three (3) other characters/functions) and then saccading to the selection grid location (203a, 203b, 203c, 203d) that corresponds to the position of the character within the character/function grid location. The next character may then be selected by saccading back to a grid location that contains the next character/function and subsequently saccading to the selection location (203a, 203b, 203c, 203d) that corresponds to the position of the character within the grid location. These paired eye movements may be repeated for any number of characters or functions.

Figure 1B:
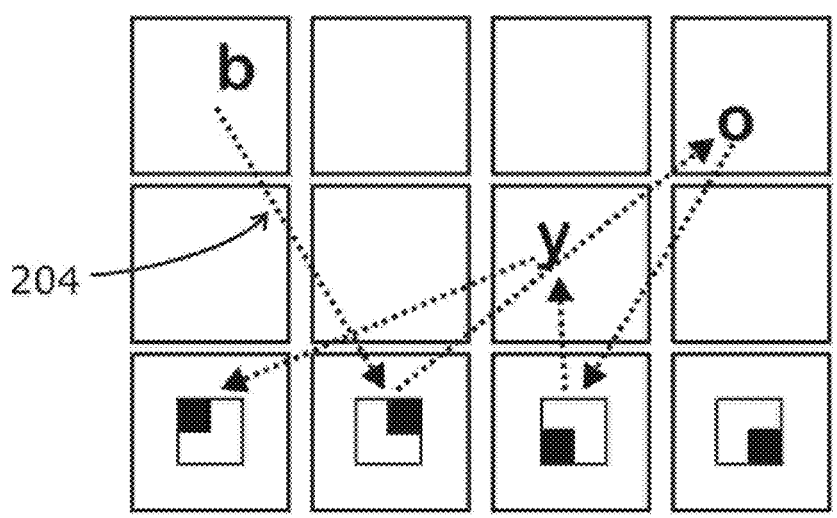
FIG. 1B illustrates eye-signal entry of the word "boy" using a 4 by 3 selection grid.

As an illustrative example, FIG. 1B depicts a sequence of eye movements to type the word "boy" using eye signals and the keyboard layout shown in FIG. 1A. Saccadic eye movements are indicated by dashed lines (e.g., 205). The eye movement sequence begins by selecting the grid location 204a that contains the letter "b." The "b" is then identified by saccading 205 to the selection grid location 203b that corresponds to the upper-right quadrant, since "b" is located within the upper-right quadrant of the character grid location 204a. Next, the letter "o" is specified by saccading to the grid location 204b that contains this letter and then saccading back to the selection grid location 203c that identifies the lower-left quadrants where "o" is located within its grid location 204b. The character "y" is then selected by saccading 206 to the grid location that contains the letter and then to the grid location 203a that identifies upper-left quadrants.

The end of a word may be specified by a "space" 207 or some form of punctuation (e.g., ",", ".", "?", etc.). Optionally, completion of partial words and/or completion of punctuation may also, for example, be augmented by selection of "auto-fill" features, similar to features found on smart phones and other devices. A special character/function (e.g., "←", often associated with a carriage return, 208) may be reserved to perform this function. Access to other functions and alternate keyboard layouts may be triggered by another special character ("^" 202 as illustrated in FIG. 1A) reserved for this feature. This pathway can, for example, provide access to numeric digits, symbols, capitalization and other features.

Figure 2A:
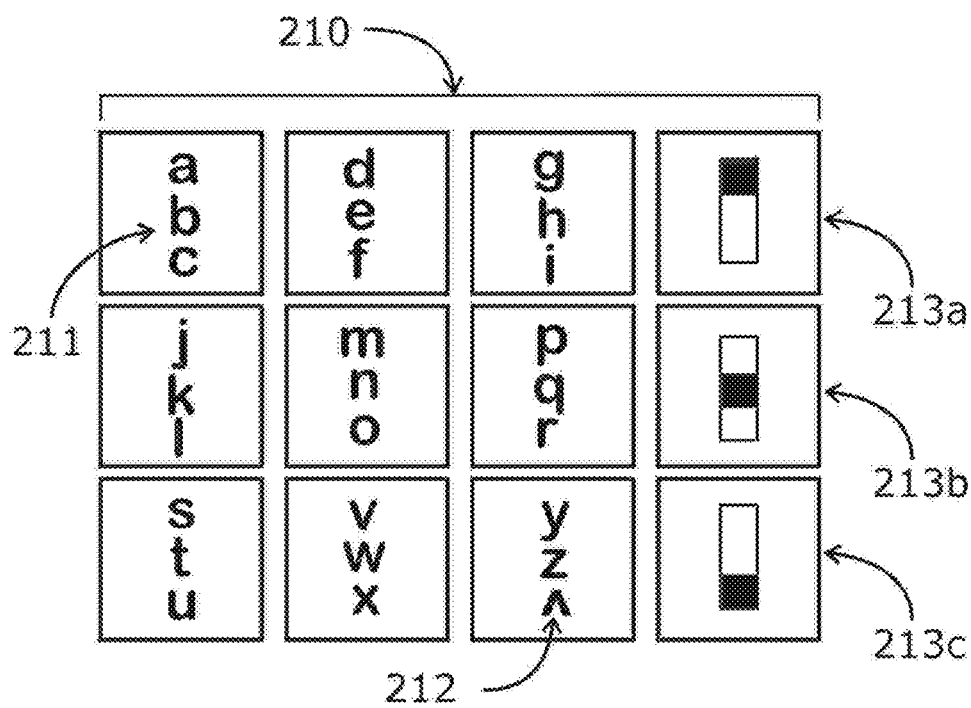
FIG. 2A is an exemplary display that allows English alphabet entry via a selection of 1 of 3 items from each of 9 locations.
Figure 2B:
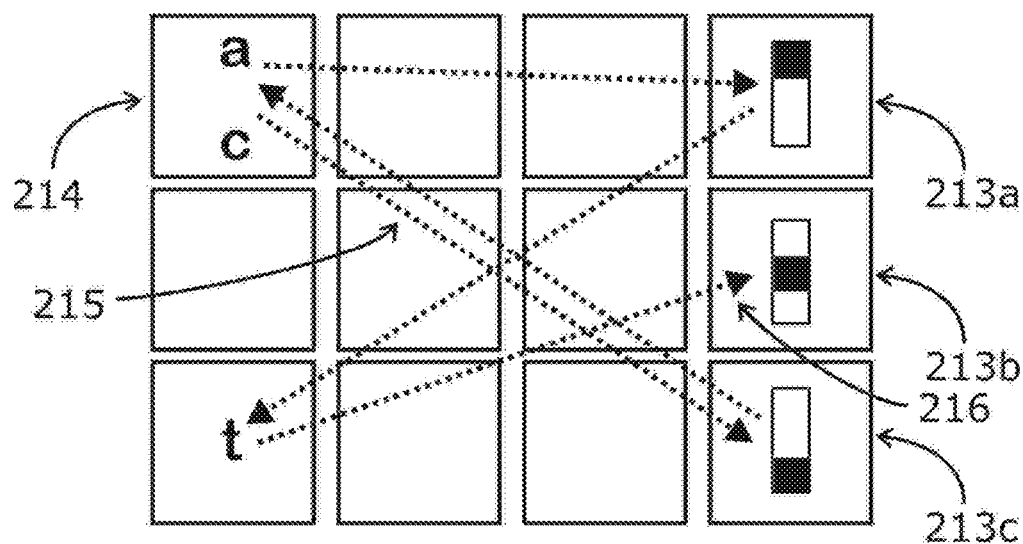
FIG. 2B illustrates eye-signal entry of the word "cat" using a 4 by 3 selection grid.

FIGS. 2A and 2B show another example of a keyboard layout 210 for typing using the eye signal language. In this case, three (3) characters (e.g., 211) are arranged in a column within each eye-selectable grid location. Once an initial character/function grid location has been viewed; the top, middle or bottom character within the grid location may be selected by saccading to the top 213*a*, middle 213*b*, or bottom 213*c* selection location, respectively. In this example, selection grid locations 213*a*, 213*b*, 213*c* are positioned to the far right of the overall display.

The layout shown in FIG. 2A supports preferentially horizontal eye movements that generally have a greater physiological dynamic range and control. In addition, the layout is relatively simple and intuitive, and is particularly suitable for simple word entry by a novice user. The layout includes all twenty six (26) English-language characters and a "^" function character that can, for example, be used to indicate the end of an entry and/or a desire to switch to a different keyboard layout.

FIG. 2B shows another exemplary sequence of eye movements, in this case to type the word "cat" using the keyboard layout shown in FIG. 2A. As in FIG. 1B, saccadic eye movements are indicated by dashed lines (e.g., 215). The eye movement sequence begins by selecting the grid location 214 that contains the letter "c." The "c" is then specifically identified by saccading 215 to the activation grid location 213*c* that corresponds to lower character selections, since "c" is the lower character within grid location 214. Next, the letter "a" is specified by saccading back to grid location 214 since "a" is located within this same grid location, and then saccading to selection grid location 213*a* that identifies upper characters/functions since "a" is the upper character of grid location 214. The character "t" is then selected by saccading to the grid location that contains the letter "t" and finally saccading 216 to the grid location 213*b* that identifies characters located in the middle of grid locations.

In these keyboard layouts, the maximum number of possible character/function selections is the product of the number of character/function grid locations and the number of selection locations. For example, in FIG. 1A there are eight (8) character/function grid locations and four (4) selection locations for a total of up to 8×4=32 character/function selections. In FIG. 2A, there are nine (9) character/function locations and three (3) selection locations for a maximum of possible 9×3=27 selections.

Figure 3:
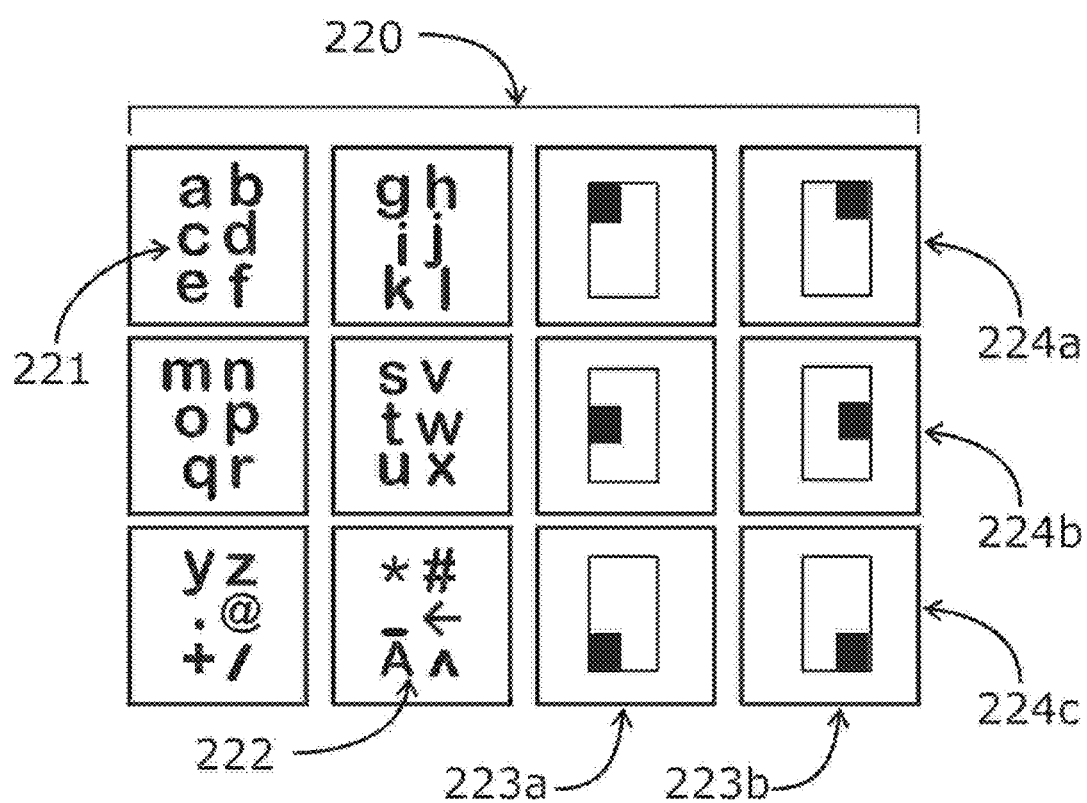
FIG. 3 is an exemplary display that allows the English alphabet and special characters to be entered via a selection of 1 of 6 items from each of 6 locations.

More generally, for a given number of selectable grid keyboard locations, the maximum number of selections can be attained when the number of character/function locations and selection locations are closest to being equal. For example, FIG. 3 shows an example of a 3-row by 4-column grid layout 220 with six (6) character/functions and six (6) selection locations that results in a total of thirty six (36) possible selections. This allows eye-based selections from all letters of the English alphabet and ten (10) other special characters or functions. The six (6) selection locations are arranged as a left column 223*a* and right column 223*b*; as well as an upper row, 224*a*, middle row 224*b* and lower row 224*c*.

In FIG. 3, the icon in the central region of each of the selection grid locations corresponds to relative locations (i.e., left versus right and upper, middle and lower locations) within a character/function selection location. Thus, relative position is used to select a specific character/function. More generally, other mechanisms or visual indications may be used separately or in combination to associate character/function selections. These include matching character/symbol color, font, luminance or size; background color; border characteristics and/or other visual cues.

Figure 4A:
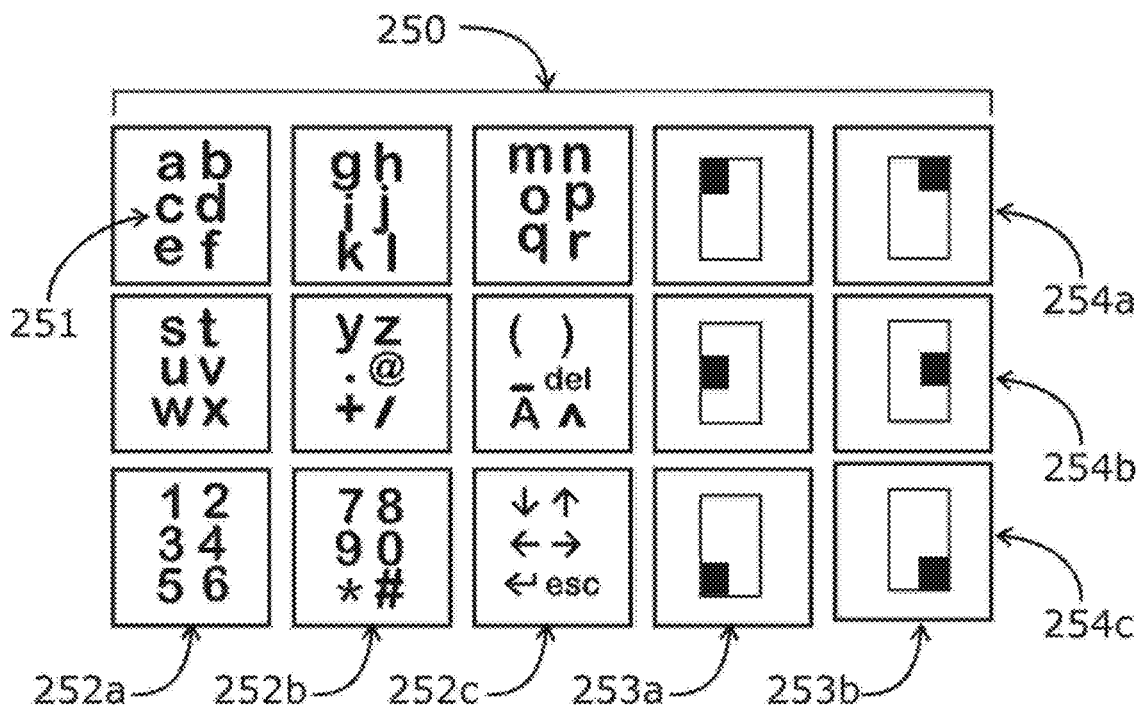
FIG. 4A is an exemplary display that allows the English alphabet, numeric digits and 18 special characters/functions to be entered via a selection of 1 of 6 items from each of 9 locations.

When limited in display/gaze-tracking area, the availability of even a single additional column or row for eye-based choices can greatly expand the repertoire of selections within a single screen. FIG. 4A shows an exemplary layout 250 of a 5-column by 3-row selection grid. As in FIG. 3, six (6) selection locations are arranged as a left column 253*a* and right column 253*b* within upper 254*a*, middle 254*b* and lower 254*c* rows. Character/functions 251 are selected from those specified in the three (3) leftmost columns 252*a*, 252*b*, 252*c*. Using this layout, a total of 9×6=54 character or function selections can be made via a single DSSS. This is sufficient to simultaneously represent the 26-letter English alphabet, ten (10) numeric digits, four (4) navigation keys (i.e. left, right, up and down) and fourteen (14) special characters or functions. This increased selection provides much greater efficiency and flexibility in the eye-signal language to perform functions such as capitalization, numeric entry, screen navigation, punctuation, corrections, access to other screen layouts or functions, etc.

Figure 4B:
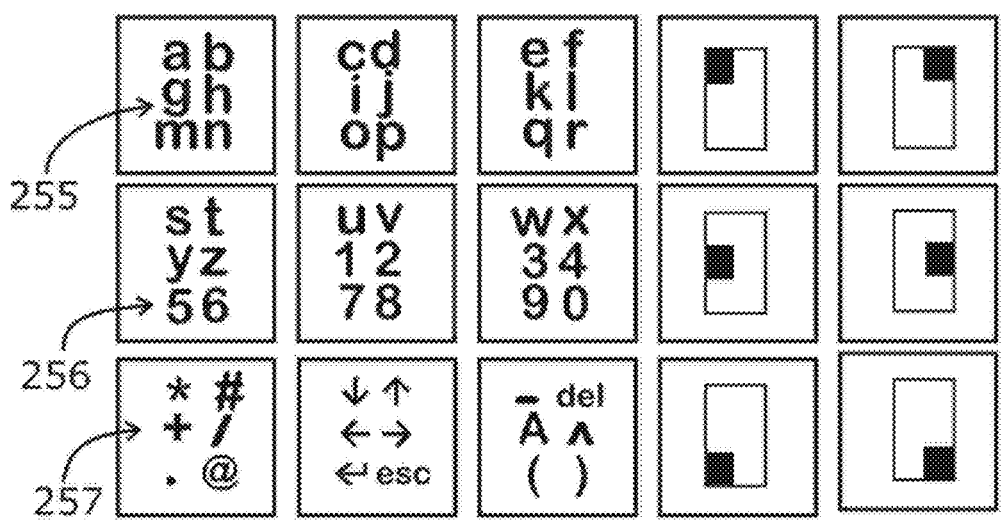
FIG. 4B is an alternative display compared with FIG. 4A where the English alphabet and numeric digits are arranged in more of a typical reading order, left-to-right and top-to-bottom.

Even within the same eye-gaze grid format, different keyboard layouts are possible since characters/functions are virtually displayed and switching layouts simply entails switching sets of displayed symbols. For example, FIG. 4B is an alternative exemplary layout for a 5-column by 3-row selection grid. In this example, alphabetic characters 255, numeric digits 256 and special characters and functions 257 are grouped within more distinct regions of the display. There are an essentially limitless number of potential keyboard layouts that, for example, may be optimized for prose-writing, numeric entry (e.g., where digits may be arranged to minimize eye movements to and from selection locations), web navigation and entry, specific tasks (e.g., checklist entry), drawing and/or simple personal preference.

Figure 5:
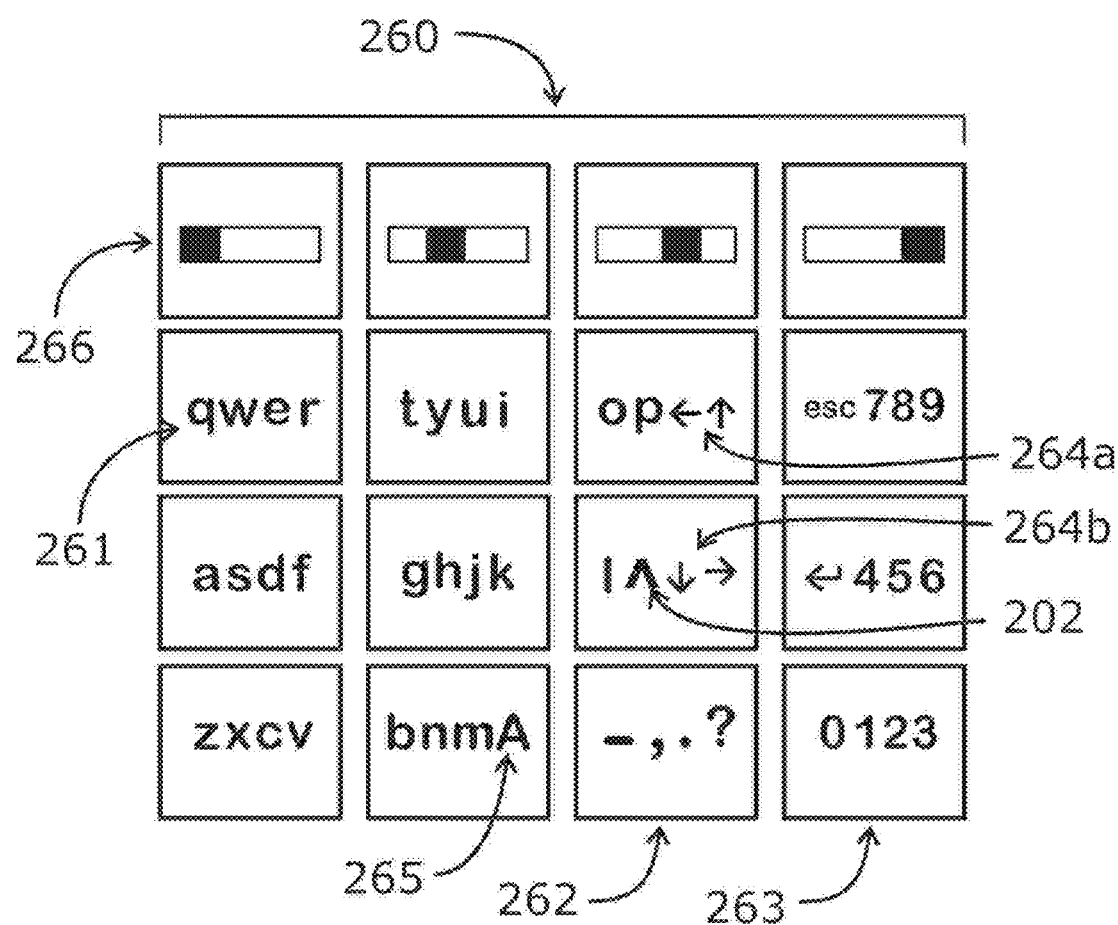
FIG. 5 is an exemplary display of the sequence of a typical QWERTY keyboard that allows eye-signal entry via a selection of 1 of 4 items from each of 12 locations.

FIG. 5 is another example of an eye-signal "virtual keyboard" layout 260. In this case, a 4-column by 4-row eye-selection grid is arranged to closely match the well-known "QWERTY" keyboard used ubiquitously for manual human-machine interface (HMI) entry. In this exemplary case, characters 261 are arranged in a similar sequence to the layout of a standard "QWERTY" English-language keyboard. Since this layout was originally designed to position more commonly used characters along upper rows, selection locations are positioned along the top row 266 of the virtual keyboard in order to minimize eye-movement distances when selecting these more commonly used characters.

The four (4) selection grid locations 266 correspond to the four (4) possible left-to-right character locations within each of the twelve (12) character/function grid locations (for a total of forty eight (48) possible characters/functions). In addition to alphabetic characters, this exemplary layout contains a navigation keys (i.e., left, right, up and down) cluster 264*a*, 264*b*; a capitalize function represented by the capitalized character "A" 265; spacing and punctuation functions within a single block 262; a numeric keypad in the rightmost column 263 using a layout similar to those found on most standard keyboards; other special characters and a function keys 202 that lead to additional menu selections.

Similar strategies may be used to construct eye-signal keyboard layouts of any size and shape. It is not necessary to use all possible DSSS combinations (i.e., some locations may be blank). Selection locations do not need to be positioned on any particular side or even within a contiguous region (e.g., they may be split among leftmost and rightmost borders). The keyboard may also be incorporated within a more multifaceted display system that may, for example, include text that is being typed and/or alphanumeric representations and images of items that best meet search criteria for keyboard entries being made. Such text and images may be located around the keyboard (i.e., along any or all sides) or even within central regions of a keyboard layout itself.

FIG. 6 is an exemplary layout 270 of a DSSS English-alphabet keyboard constrained to a four (4) (horizontal) by three (3) (vertical) grid demonstrating an alternative selection layout with non-contiguous selection regions. Similar to FIG. 1A, a cluster of four (4) characters or functions is initially selected from more central regions 272 of the display 270. Selection of one of the dour (4) characters/functions is then performed by a saccadic movement to one of the four (4) corners of the display area 271*a*, 271*b*, 271*c*, 271*d*. The 1-of-4 corners selection process facilitates intuitive, distinct (i.e., different directions) and algorithmically discernable saccadic eye movements.

The layout 270 in FIG. 6 also illustrates the situation of a selection tree in which not all selections are made in the same selection mode. Most selection within the layout 270 are made using a dual saccade sequence. Any functionality that is associated with the so-called "carriage return" character 273, right-most in the display, may be performed immediately upon a selection (i.e., with a single saccade).

Feedback while typing using eye signals or during any other selection process is not limited to visual displays. Characters, words, phases (e.g., when the device "guesses" user intent) or other indications may be provided in an audio format (i.e., using a synthesized or spoken voice). Tactile feedback such as brief periods of device vibration (e.g., when the user makes an entry "mistake") may also be incorporated. All feedback modalities may be used separately, or in combinations. Different modalities may be used during different applications.

Off-Display Targets

Methods to maximize the number of selectable targets within a display area by including target locations near display edges are described in Systems and Methods for Biomechanically-based Eye Signals for Interacting with Real and Virtual Objects, application Ser. No. 14/708,234, filed May 9, 2015, the entire disclosure of which is expressly incorporated by reference herein. This general approach may be extended by including target locations that are completely, or at least partially, outside any display area(s).

In order to provide a user with a viewable, off-display target (i.e., giving the user "something to look toward"), target locations may include indications (e.g., icons, images, alphanumerics, symbols, viewable edges of a display area) that are generally within the field-of-view of a device user. Such indicators may also include dynamic components (independent of the main display) such as one or more light-emitting diodes (LEDs), secondary display or projected light that may be turned on, turned off or modulated under device control.

Targets (e.g., icons, symbols, LEDs) may be affixed on a viewable surface. Projected targets, or portions of targets, may include one or more remote light sources that include reflections off of one or more surfaces, steering projections using so-called wave-guides, light directed using one or more optical fibers, refractive optics, shutters, and/or other light-control mechanisms.

Off-display targets are also not restricted to the image plane of a particular display. For example, off-display targets may appear in front of, or behind, the image plane of a display. This allows vergence (and possibly changes in lens shape within the eyes of younger users) to be taken into account when determining if an eye movement to an off-display target is a deliberate activation sequence. If off-display targets are presented at various depths, then the degree of vergence (i.e., perception of depth) may be used within selection criteria for particular targets.

Off-display targets may also be a part of the user (e.g., thumb, finger, hand) that may move (relative to the overall environment) as the user moves about. Additionally, an off-display target may be carried about by the user (e.g., glove, ring, portion of clothing). Virtual off-display targets might be displayed on a separate display device such as a nearby cell phone or tablet.

If mechanistically available, off-display targets may (optionally) provide some form of user feedback (e.g., LED turned on or off, change in light color) when selected. In cases when the off-display target is not changeable (e.g., a "sticker" icon or image affixed to a surface), feedback may be provided elsewhere on the display, including within parafoveal or peripheral views.

In many cases, no specific off-display feedback is necessary, especially for experienced users. Dual-saccade selection sequences (DSSSs) are a particularly useful example of saccadic eye-signal language components in which off-display target feedback is not generally necessary. If during DSSS, a saccade to an off-display target is used for activation, then the resultant action (e.g., the display of a selected character or image, voice generation of a character or word) is generally sufficient to notify the user that an activation selection has occurred.

Figure 7:
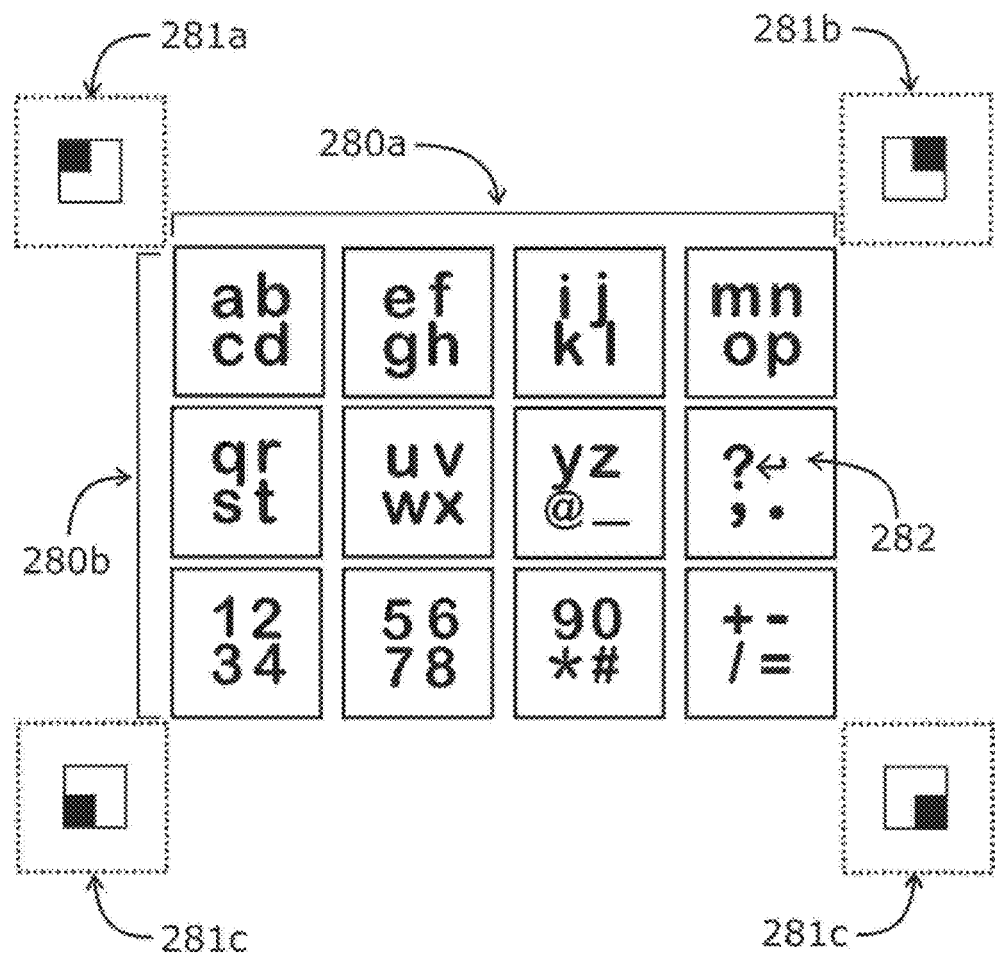
FIG. 7 is another exemplary display layout in which 1-of-4 characters/functions are selected by saccading to 1-of-4 targets away from the display area.

FIG. 7 is an example of a 4-column 280*a* by 3-row 280*b* displayed selection matrix with four (4) additional target locations 281*a*, 281*b*, 281*c*, 281*d* beyond the four (4) corners of the display area. In FIG. 7, spatial regions for off-display targets 281*a*, 281*b*, 281*c*, 281*d* are show with dashed lines. The combination of displayed selections and off-display targets 281*a*, 281*b*, 281*c*, 281*d* may be used, for example, to select from the entire English alphabet, numeric digits and a number of special characters (including one reserved to indicate the termination of a sequence 282) using DSSSs. When compared with FIG. 6, it can be seen that off-display targets at the four (4) corners 281*a*, 281*b*, 281*c*, 281*d* allow 16 additional possible selections within the 4-column 280*a* by 3-row 280*b* selection matrix (i.e., four (4) selections within each of four (4) additional displayed matrix positions).

Figure 8:
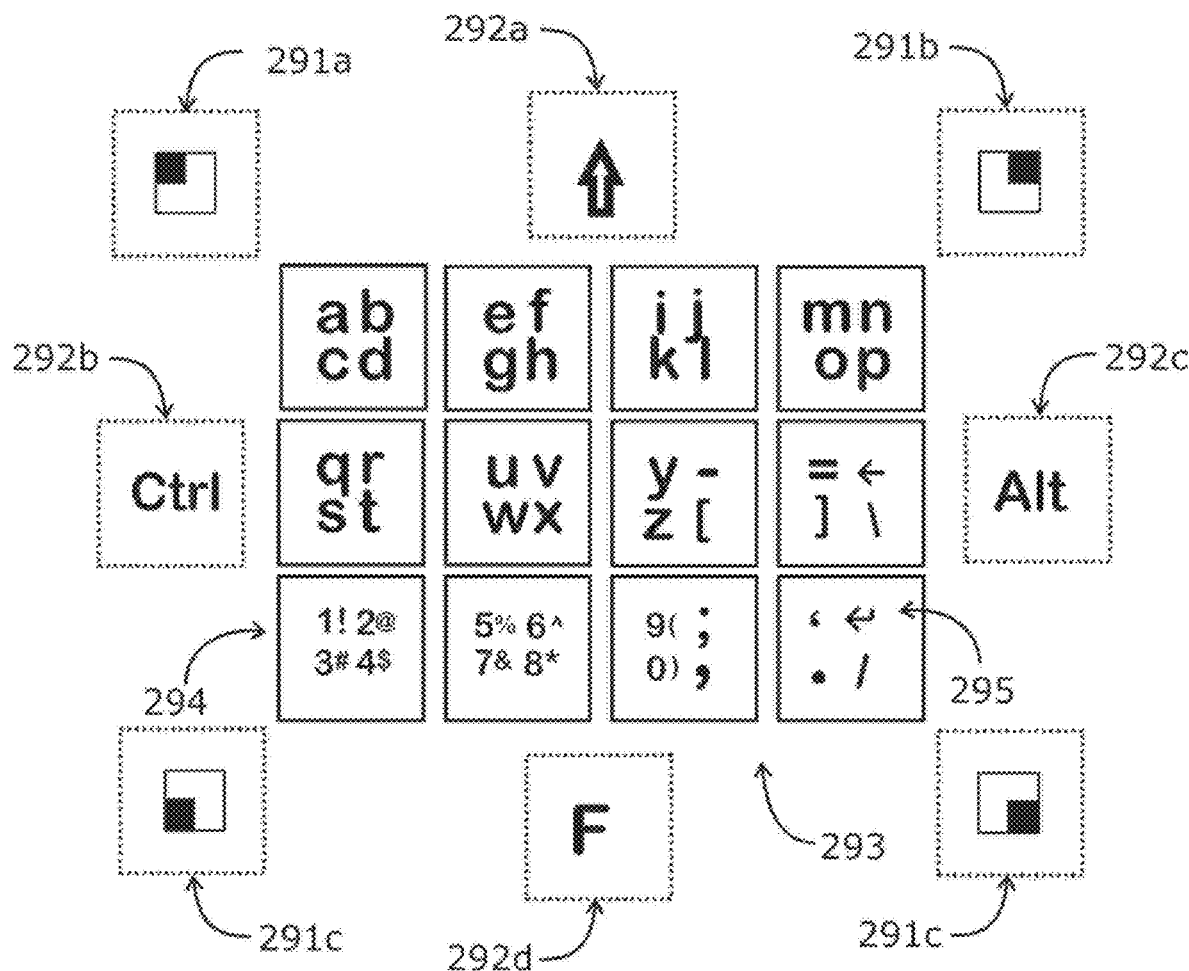
FIG. 8 is exemplary display layout in which 12 character and function matrix locations are selected by saccading to 1-of-8 off-display target areas.

FIG. 8 shows another exemplary layout that employs eight (8) off-display target locations 291*a*, 291*b*, 291*c*, 291*d*, 292*a*, 292*b*, 292*c*, 292*d*. Similar to FIG. 7, displayed targets include a 4-column by 3-row selection matrix and off-display target locations 291*a*, 291*b*, 291*c*, 291*d*, 292*a*, 292*b*, 292*c*, 292*d* are shows with dashed lines. Displayed selectable items include all letters of the English alphabet, ten (10) digits, and special characters and functions including the so-called "return" (or "carriage return") 295 key often used to signify the completion of an entry.

Using the layout in FIG. 8, data entry includes first specifying a group of up to four (4) possible selections within the central, displayed 4-column by 3-row matrix, and then saccading to one of the four (4) corner off-display targets 291*a*, 291*b*, 291*c*, 291*d* to indicate a 1-of-4 selection. Similar to the process illustrated in FIG. 7, this is sufficient to identify any of the characters or functions within the displayed selection matrix.

The user may then optionally further modify a selection by subsequently saccading to one of the off-display "modifier" targets 292*a*, 292*b*, 292*c*, 292*d*. Similar to a typical keyboard, these modifier targets may perform supplementary functions such as "SHIFT" (often displayed as an up-arrow and frequently used to capitalize) 292*a*, "control" (abbreviated Ctrl) 292*b*, alternate (abbreviated Alt) 292*c* or "function key" (abbreviated "F") 292*d* generally associated with a numeric digit. Similar to a standard keyboard, possible selections available via modification, such as those associated with SHIFT numeric digit keys 294, may be indicated within the displayed selection matrix to aid a novice user.

A selection is completed by a return saccade anywhere within the central, displayed selection matrix. If the user saccades to the selection matrix without saccading to a modifier target location 292*a*, 292*b*, 292*c*, 292*d*, no modification is made to an initial character/function selection. Sequential saccades to modifiers targets may be used to specify multiple modifiers (e.g., Ctrl and SHIFT). If desired, modifier targets 292*a*, 292*b*, 292*c*, 292*d* can equivalently be selected prior to (versus after) positional targets 291*a*, 291*b*, 291*c*, 291*d*.

The scheme shown in FIG. 8 allows almost every possible combination of characters and special functions available on a standard keyboard to be selected using eye signals. Special characters available on the right side of a standard QWERTY keyboard are available within the lower-right region 293 of the displayed selection matrix. This flexibility allows standard keyboard entry to be conveniently substituted using eye signals (e.g., when browsing and responding within web pages).

Combinations of on-display and off-display target locations may dramatically increase the number of possible selections, particularly within wearable displays that occupy a relatively small portion of a visual field. For example, using the 4-column by 3 row displayed selection matrix depicted in FIG. 8 with four (4) off-display 1-of-4 corner targets and four (4) off-display modifier targets, a total of 12×4×4=192 possible selections are available when confined to a single (optional) modifier. The availability of a second (i.e., 1-of-4) optional modifier further increases the number of possible selections to 768.

Thus, this general strategy is particularly valuable when making selections from a large pool of possibilities. This may occur when typing (one character at a time as illustrated in FIGS. 7 and 8), selecting words or phrases, entering alphanumeric data, selecting from a large number of images or data sets (particularly those that may be arranged and presented in a selection tree structure), selecting from lists of items and so on.

More generally, the number of off-display targets may be as small a single selectable region to as many targets as can reliably be resolvable within the field-of-view of the device wearer. Off-display targets may overlap with peripheral regions of the display, be adjacent to display regions or be well away from one or more displayed region. The size of target regions may vary including, for example, saccading anywhere past one side of a display region. The shapes of both on-display and off-display target regions may also vary including, for example, any of the following forms: square, rectangular, hexagonal and circular.

Another significant advantage of the peripheral and/or off-display locations of activation targets is the avoidance of inadvertent activations within the display area. When selecting a particular character or function, a user may employ as many searching eye movements as needed to find a desired selection. Since "activation" occurs only as a result of eye movements toward the periphery (i.e., away from the display area), there is little chance of activation while searching. Once activation occurs in the periphery, a new selection is initiated only by returning to the central region. This spatially and directionally separates searching and initial selection processes from activation tasks, significantly reduces the potential for inadvertent activations.

If a user tends to produce an excessive number of inadvertent activations (e.g., as a result of poor eye tracking due to obstructions), activation 291*a*, 291*b*, 291*c*, 291*d* and modifier targets 292*a*, 292*b*, 292*c*, 292*d* may be positioned to be more distant from the display region. As a user, for example, gains experience and reduces the number of inadvertent activations, such targets may be brought closer to display regions, reducing distances traveled by the eye and consequently reducing selection times and eye fatigue.

Single-Saccade Selection Sequences (SSSS) of Multiple Choices

When an expanded field-of-view is available for display and eye-signalling, it is possible to arrange 1-of-N selections in manners that requires only one (1) eye movement (i.e., single saccade) per selection. SSSSs utilize selection sets arranged in clusters such that both:

a specific item with a cluster can be selected, and the act of selection is indicated by saccading away from a selection to a new cluster where a subsequent selection may be performed.

Figure 9A:
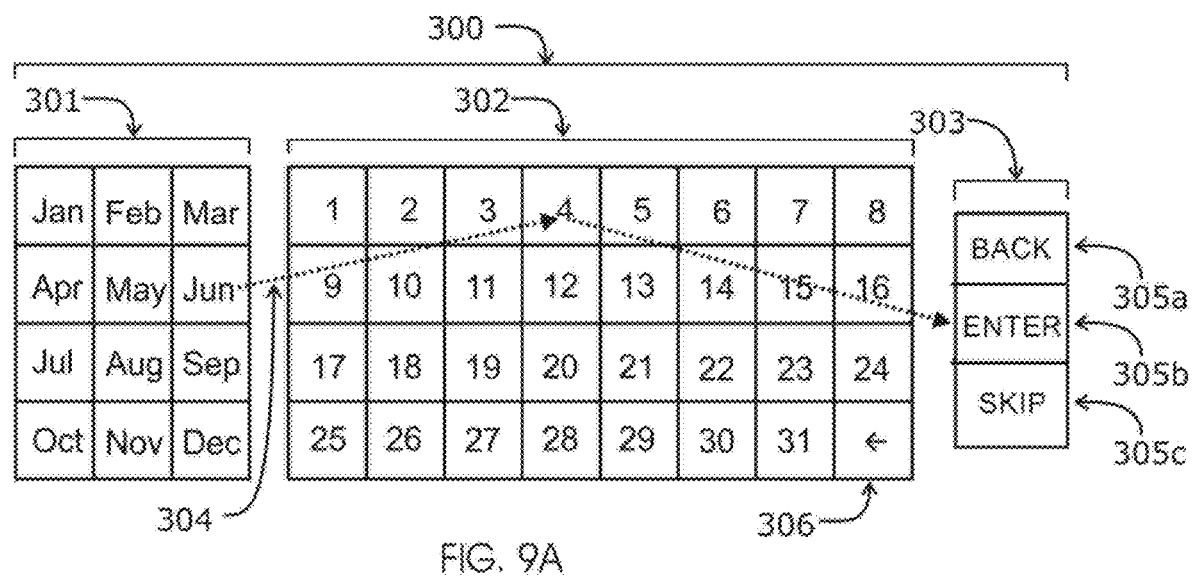
FIG. 9A is an exemplary display that allows the month and day of a date to be entered via a series of saccadic eye movements producing one selection per saccade.

FIG. 9A is an example of a display layout 300 to select a date in which each selection (i.e., month, day) may be performed with a single saccade. The leftmost cluster 301 is used to specify a month. The middle cluster 302 is used to specify a day within the month. The rightmost cluster 303 specifies an action. Any date may be specified by saccading away from a month within the left cluster 301 followed by a saccade away from a day within the middle cluster 302 toward an action within the rightmost cluster 303.

In FIG. 9A, an exemplary sequence of eye movements is shown to enter the date "June 4." Saccadic eye movements are shown as dashed lines. A saccade away from the month "June" 304 selects the month. A subsequent saccade away from the number "4" selects the day. Saccading toward the action "ENTER" 305*b* allows the selected date to be applied toward the data entry sequence of an application where the application may, for example, then change the display to allow entry of additional information.

In FIG. 9A, alternative action items that may be selected include "BACK" 305*a* to go backwards in the data entry sequence allowing, for example, the answer to a previous question to be re-entered. In this example, saccading at any time to the "SKIP" 305*c* location forces the application to move on with no date entry. Since a selection is made only upon saccading away from a cluster, any number of exploratory eye movements may easily be made within a cluster to choose a desired selection. Correcting an improperly selected month may be performed by simply saccading back to the date cluster. The "←" symbol within the numeric cluster 306 may be reserved, for example, for special functions such as requesting a different keyboard layout.

Figure 9B:
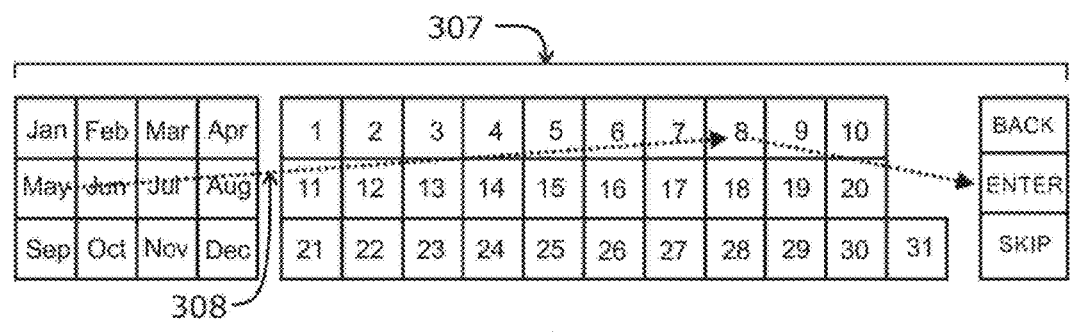
FIG. 9B is an alternative date-entry layout (compared with FIG. 9A) in which the vertical dimension is reduced to 3 rows.

FIG. 9B illustrates another keyboard layout 307 for the entry of dates. This layout may be used when vertical eye movements are more confined (e.g., to facilitate display along the top or bottom region of a visor) and/or if it is desired to have numeric entries representing days aligned according to the units digit (somewhat more intuitive for some users). The exemplary SSSS of eye movements in FIG. 9B specifies the date May 8.

Figure 10A:
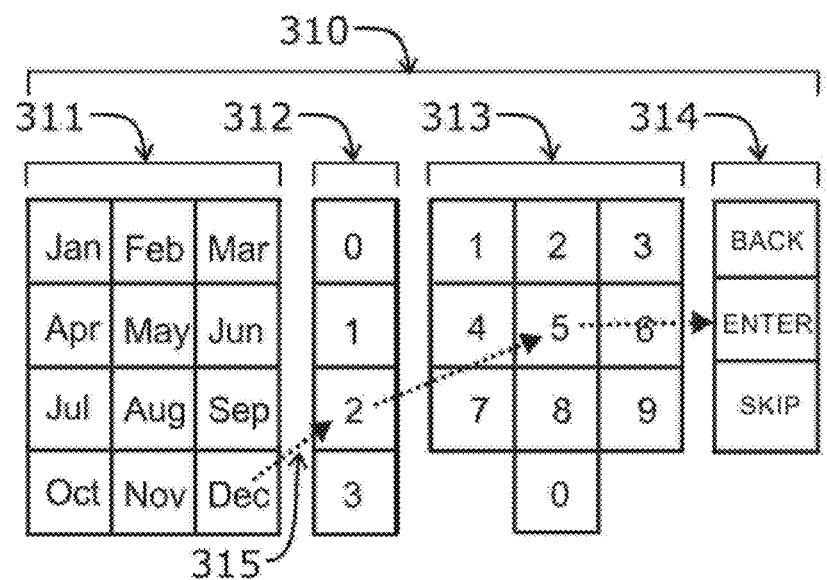
FIG. 10A shows yet another date-entry layout (compared with FIG. 9A) with a confined horizontal dimension of 8 columns.

FIG. 10A illustrates yet another keyboard layout 310 that may be used, for example, when the horizontal range of eye motions is confined. In this case, one (1) extra saccade is required to select a date where the day is specified as two (2) separate digits 312, 313. From left-to-right, clusters allow selections of the month 311, tens digit of the day 312, units digit of the day 313, and an action 314. The exemplary eye movement sequence 315 shows selection of the date "December 25" using a SSSS.

Figure 10B:
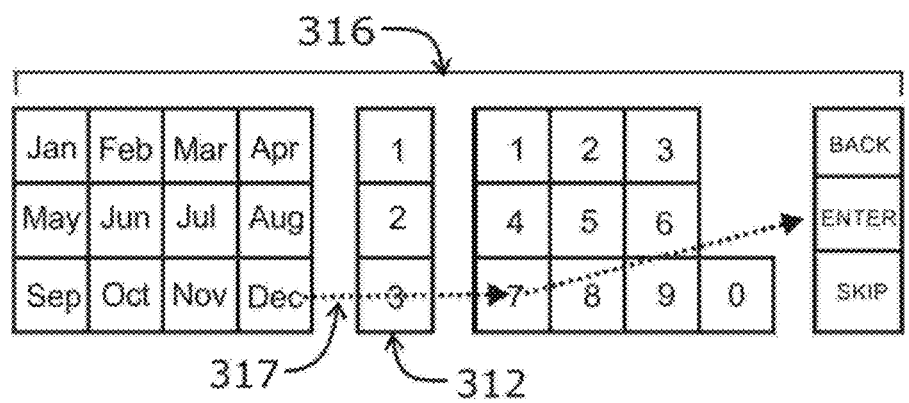
FIG. 10B is another date-entry layout (compared with FIG. 9A) in which the vertical dimension is confined to 3 rows.

FIG. 10B is a variant layout 316 of a keyboard similar to that shown in FIG. 10A except the vertical range of motion is more confined (i.e., with only three (3) rows). In this layout 316, a "0" is not included in the tens digit for selection of a day since simply bypassing the tens cluster 312 may be interpreted as an implied leading zero. The illustrated eye-movement SSSS 317 specifying "December 7" is an example of such a case.

SSSSs in which the selection set is repeatedly the same (e.g., letters, digits, functions) may be handled by displaying duplicate sets of a portion or all of a selections set. A sequence of any length may be selected by alternating back-and-forth between clusters or transitioning among clusters.

Figure 11A:
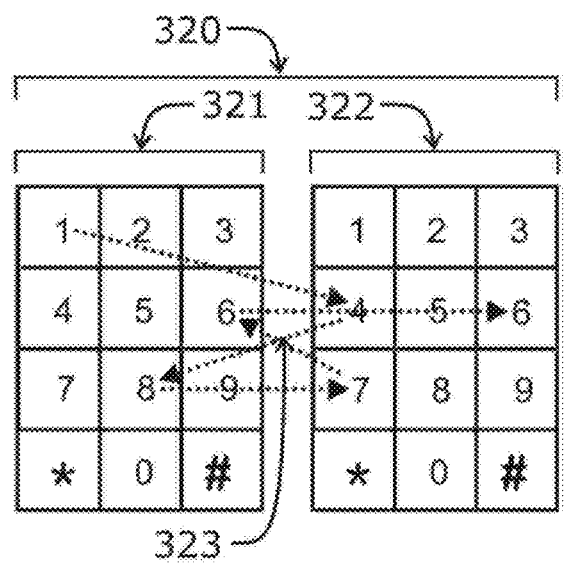
FIG. 11A is a phone-style keypad layout that allows the entry of numbers using a single saccadic eye movement per digit.

FIG. 11A shows a side-by-side standard numeric keypad layout 320 that may be used, for example, to dial a phone number. The layouts of the keypads illustrated 321, 322 in FIG. 11A are as found on a typical telephone. Alternatively, interchanging the rows containing "789" with rows containing "123", transforms layouts to those of typical computer keyboards and calculators.

A number of any length may be specified by saccading back and forth between keypads. Either keypad may be used as a starting point for numeric entry. Entry may stop when a sufficient number of digits have been entered for a particular application (e.g., phone number, passcode) or when a special character (e.g. "*" or "#") is entered. The SSSS eye movement pathway 323 illustrated in FIG. 11A is an example of entering the number "148766."

Figure 11B:
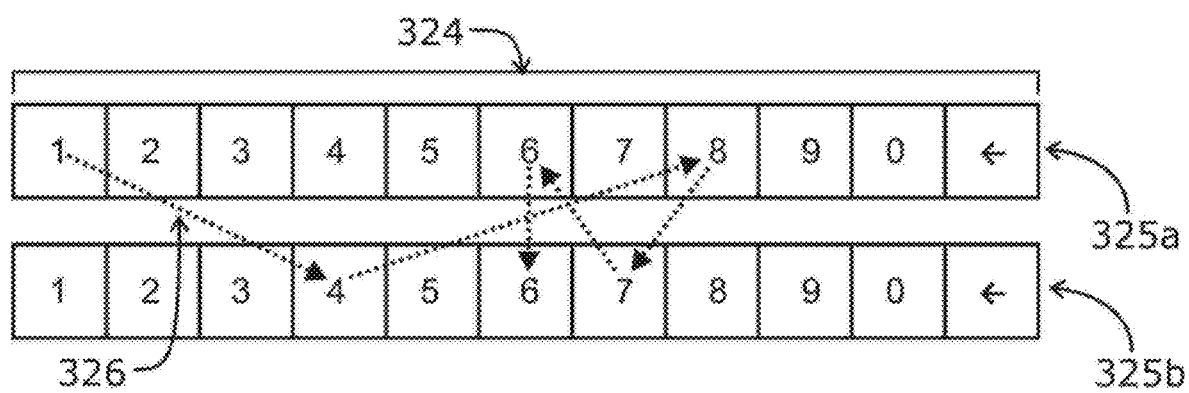
FIG. 11B is an alternative layout (compared with FIG. 11A) for numeric data entry with a reduced vertical dimension.

FIG. 11B illustrates an alternate layout 324 for numeric entry. This layout 324 is both simple and intuitive to use. A number is entered by saccading back and forth between 2 linear rows 325a, 325b of digits and a special "←" character/function. The confined vertical dimension allows this layout 324 to be strategically placed to reduce obstruction, for example, along the upper or lower edge of a display. The SSSS eye movement pathway 326 in FIG. 11B is an example of entering the same number (i.e., "148766") as in FIG. 11A.

Figure 12A:
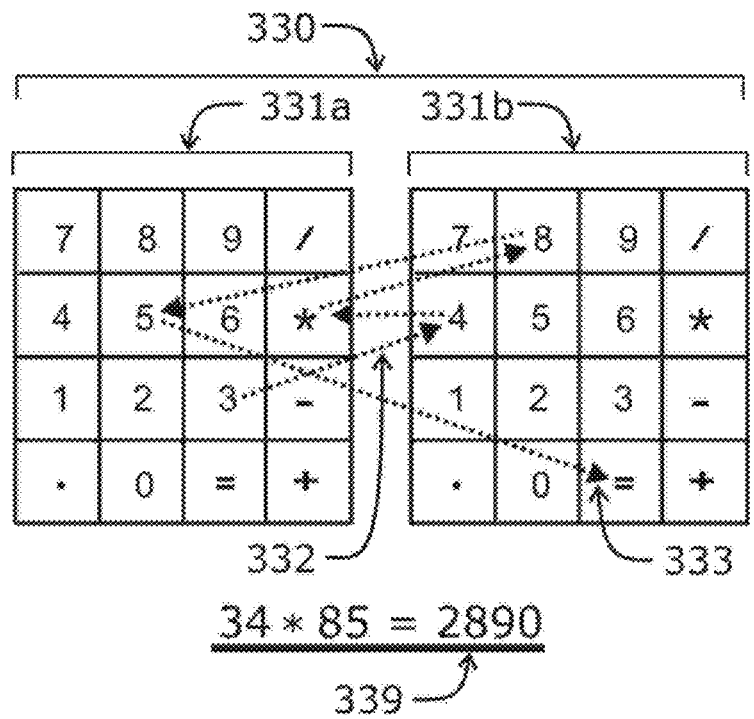
FIG. 12A is a numeric keypad and simple calculator layout that allows the entry of numbers using a single saccadic eye movement per digit.

FIG. 12A shows a SSSS layout 330 for a calculator. In this example, duplicate calculator layouts 331a, 331b are placed side-by-side. Both numbers and functions may be selected with alternating eye movements back-and-forth between the duplicate displays 331a, 331b. The dashed lines 332 show eye movements used to calculate the result of multiplying 34 and 85. The result of this calculation (i.e., 2890) is displayed 339 immediately upon a final saccade to a "=" symbol 333.

Figure 12B:
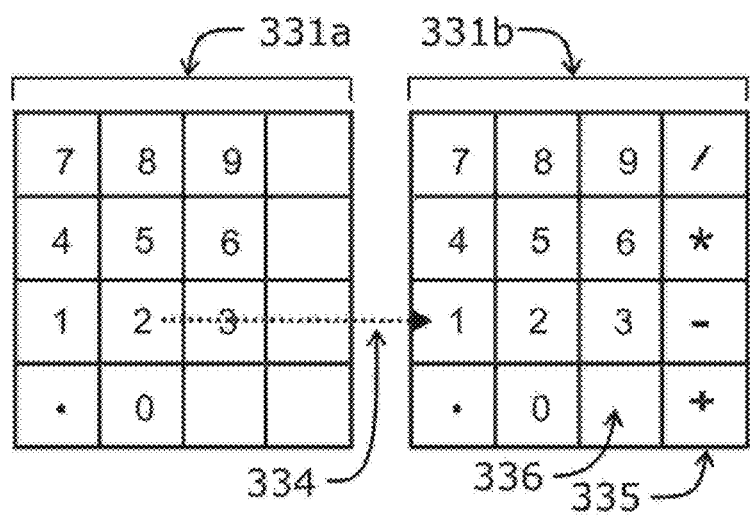
FIG. 12B illustrates the dynamic control of calculator functions by changing selections displayed on an "as needed" basis.

FIG. 12B illustrates a simple situation in which dynamic control of displays may aid the user input process. Using the same calculator layout 330 as in FIG. 12A, both left 331a and right 331b calculator displays may be initially absent symbols for "/", "*", "−", "+" and "=" (as illustrated in panel 331a). This is because these symbols cannot be used to perform a function absent a numeric value. When the first numeric value is selected (e.g., a "2" in panel 331a) arithmetic operators may immediately be displayed 335 (e.g., during a saccadic eye movement 334) in the contralateral panel 331b. At this time, an equal sign (i.e., "=") is not yet displayed 336 since its function cannot be performed until an arithmetic operation and additional numeric information are supplied.

Figure 13:
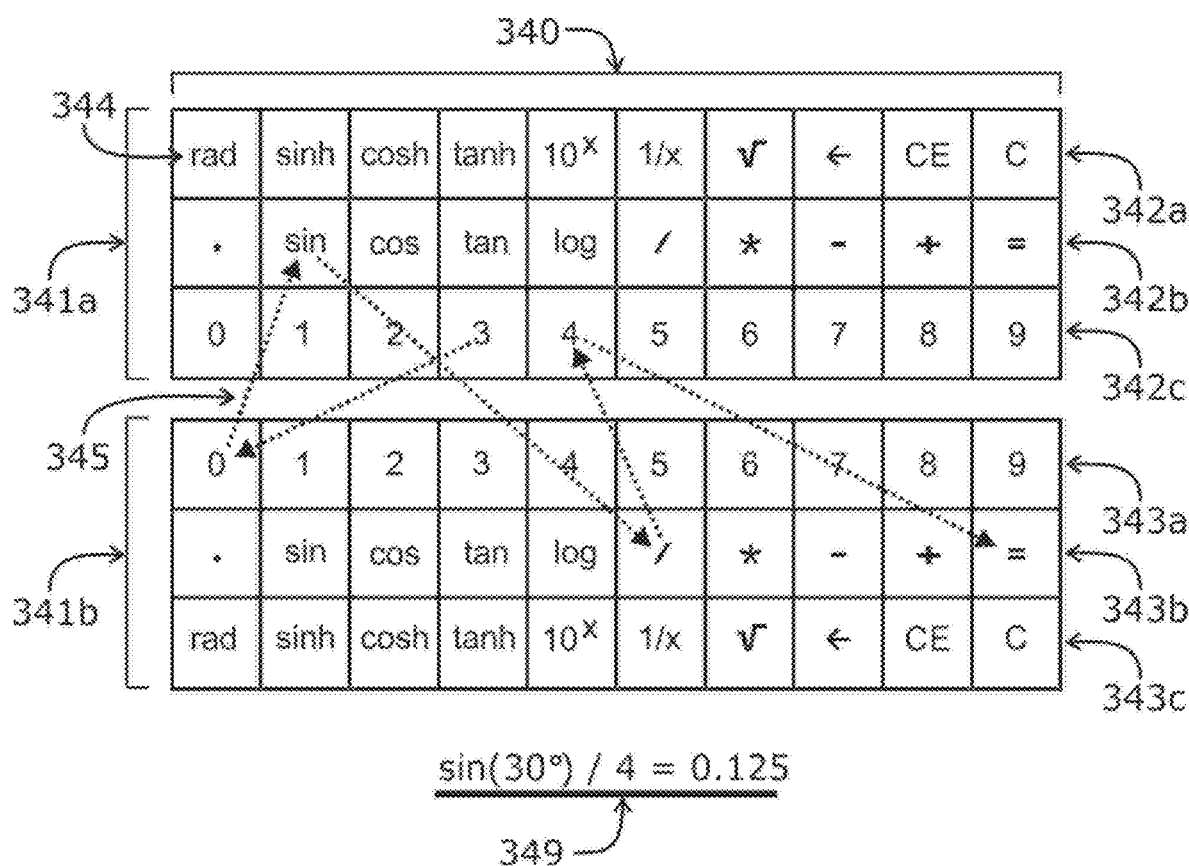
FIG. 13 shows the display layout of a scientific calculator and sample calculation using a series of saccadic eye movements involving a single saccade per selection.

It is not a necessity that SSSS displays be identical even when sequential inputs are of the same form. FIG. 13 shows an example layout of a scientific calculator that is optimized for the rapid entry of numeric digits. In the vertical direction, the contents of grid locations within upper 341a and lower 341b displays are mirror images of each other. Frequently used digits are close to each other, occupying central, inner rows 342c, 343c of upper 341a and lower 341b displays. Common functions populate middle rows 342b, 343b. Lesser used functions and other operations are located in rows 342a, 242b furthest from central display regions. This configuration supports shorter, more rapid eye movements to make more common selections (particularly in the vertical direction). Lesser used features in outer rows generally require longer eye movements.

The exemplary calculation 349 using eye signals 345 shown in FIG. 13 computes: sin (30°)/4. In addition to arithmetic functions and other operations commonly seen on scientific calculators (e.g., clear display, clear entry), flags and other setup conditions, such as whether trigonometric functions assume degrees or radians as units, may be established by eye signalling to appropriate locations 344.

FIG. 13 is also an illustration of the notion that a layout that has been optimized for manual (or some other form of) input is not necessary optimum for eye signalling. Thus, design layouts based on movements of one or more fingers (e.g., numeric keypads) may not be optimal for eye signalling based on rates of eye-signal generation, ease of use and/or eye fatigue.

Figure 14:
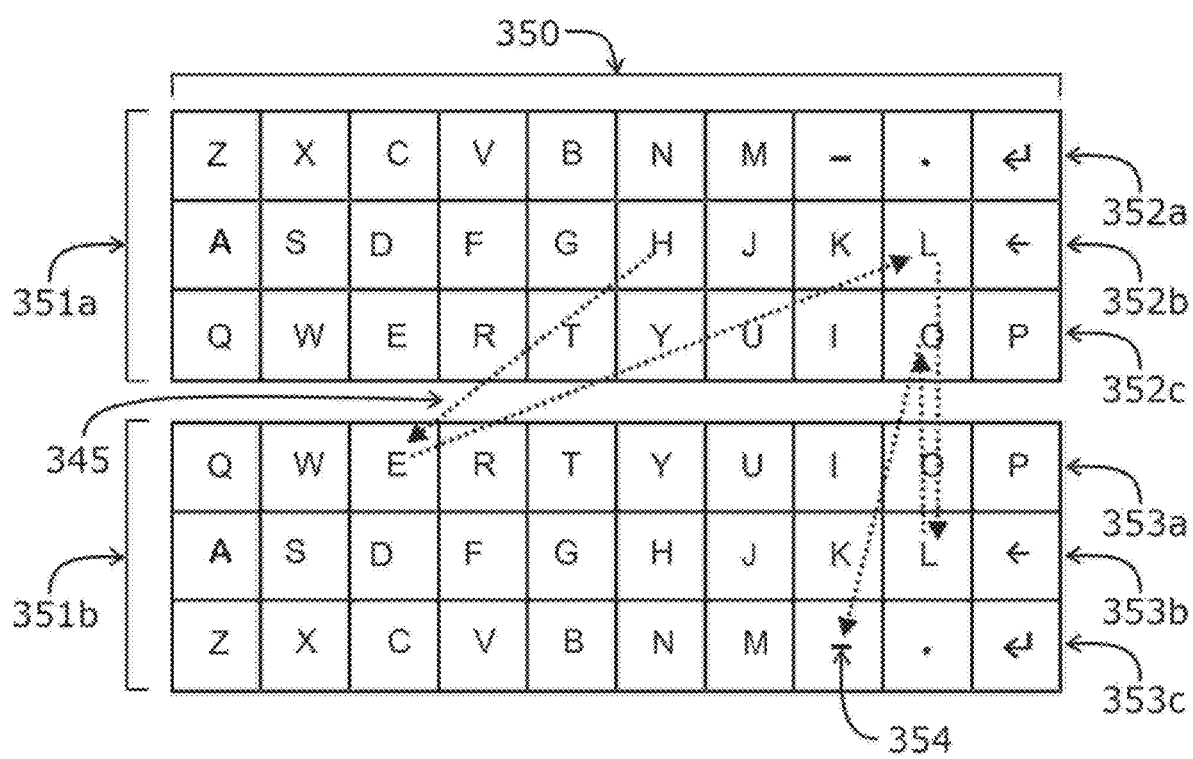
FIG. 14 is an exemplary display of a common QWERTY keyboard that allows "typing" via a single saccadic eye movement per character/function.

FIG. 14 illustrates an example of a SSSS layout 350 for a QWERTY keyboard. In this example, the top 351a and bottom 351b sections of the overall layout 350 are mirror images of each other in the vertical direction. This allows duplicate rows 352c, 253a of frequently used characters found along the top of a standard QWERTY keyboard to be located closest to each other. The middle row of a standard keyboard is placed in the middle 352b, 353b of upper 351a and lower 351b sections of the duplicate keyboard. The row of generally lesser used characters is located in rows 352a, 353c furthest apart. Eye signals 345 in FIG. 14 illustrate typing the word "HELLO" followed by a space character (i.e., "___") 354 in preparation for the next word.

An experienced device user may know the positions of selections (i.e., based on memory) within a layout. In this case, spatial memory may be used to further speed selections by eliminating searching eye movements and simply saccading through a sequence of selections. Small corrective saccades that may occur at the end of larger selective saccades may be algorithmically identified (e.g., saccadic movements that travel less than a threshold distance) and not considered as a distinct selection. Such memory-guided selection sequences may be particularly useful for shorter, well-known series such as telephone numbers, passcodes, common names, and the like.

Figure 15A:
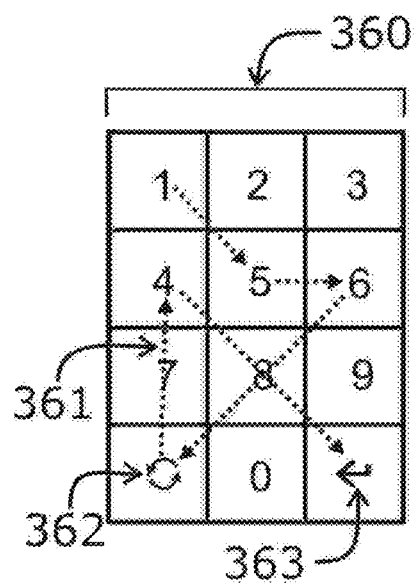
FIG. 15A is an exemplary 4-row by 3-column display layout for the entry of simple numeric sequences using single saccadic eye movements per digit.

FIG. 15A is a 4-row by 3-column example of a numeric keypad layout 360 that may be used for the entry of number sequences with a single saccadic (generally memory-guided) eye movement per digit. Since the eye signal language does not generally rely on dwell (e.g., to perform "repeat" operations) an issue arises when a repeated entry (e.g., repeated digits) is required. This is resolved by supplying a "repeat" selection 362. The entry of a repeated value or function may be performed by saccading from the entry to the repeat selection 362 location. If the value or function needs to be further repeated, a saccade may be made back to the original location of the entry or function. This back-and-forth process may be repeated any number of times for prolonged repetitions.

In an alternative embodiment, the image displayed at the location of the "repeat" function 362 may be the digit (or other character/function) that may be repeated. This is an example of a dynamic control display in which potential selections change, depending on previous entries. Once a selection is made, the repeat location 362 displays a duplicate image of the selection so that its selection causes a repeated entry. Dynamic changes to the repeat location 362 may be made in an "invisibly visible" fashion (e.g., as described elsewhere herein) so as not to attract attention and associated involuntary eye movement(s).

FIG. 15A illustrates an exemplary eye movement sequence shown as dashed lines 361 to enter the number "15664." This example includes the entry of a repeated digit (i.e., "6") that is entered using the "repeat" location 362. Numeric entry may be concluded using a specified location 363 (commonly designated as "return" in many operating systems). Mistaken entries during such short sequences may be dealt with, for example, by simply terminating 363 and re-entering the sequence. While specifying a known number of selections such as a telephone number (using country/area code recognition to determine the number of digits), the "return" location 363 may be used to initiate dialing or alternatively to terminate any sequence without dialing the entered number in order to avoid misdialing. In the latter case, dialing may occur automatically upon entering the final digit.

Figure 15B:
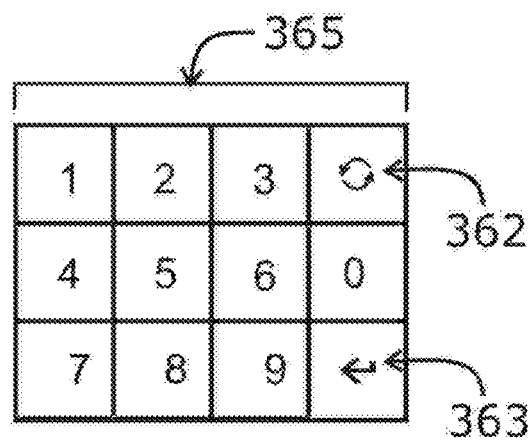
FIG. 15B is an alternative display layout (compared with FIG. 15A) consisting of 3-rows by 4-columns for the entry of simple numeric sequences using single saccadic eye movements per digit.

FIG. 15B is an alternative, 3-row by 4-column display layout 365 of a numeric keypad for the entry of number sequences with a single saccadic (generally memory-guided) eye movement per digit. This layout may be used, for example, to take advantage of the generally greater precision and range available to measure horizontal (versus vertical) eye movements.

Simple display layouts that facilitate memory-guided eye movements may be used to select from numeric digits, subsets of alphanumeric characters, icons that may represent functions, common menu sequences, faces or other graphical representations of people allowing groups of individuals to be selected, and the like.

Interactive displays may have no background (e.g., in the case of augmented reality displays), a distinct background, or overlaid (e.g., by controlling transparency, luminance, color, etc.) on other images or video. Display components can, for example, be positioned to be central within a user's field of view or completely peripheral, for use only as needed.

Displays may also be static or dynamic. Dynamic displays may both hasten and aid user input. For example, as just described, when using a calculator (if the normal sequence is to enter a number followed by an operation), symbols for operations (e.g., _, −, *, /) may be withheld until at least one number is entered and a result symbol/selection (e.g., equal sign) may be withheld until there is sufficient information for a result to be calculated. When entering a phone number, the display may change (color, luminance, etc.) when the last digit is about to be entered and a phone connection is automatically made upon entry. At different stages during a data entry process, most frequently used and/or important selections may be highlighted in one or more ways (e.g., controlling brightness, color, transparency, background, border, etc.) to attract attention.

Multiple and/or Movable Activations Targets

In additional exemplary embodiments, it may be desirable to move an activation target away from its usual (i.e., typically selected by a memory-guided saccade) location, to another location on a display to indicate some feature or characteristic about a selection being made. In addition or alternatively, multiple activation targets may also be displayed where the selection of a specific target (among two or more) not only indicates an activation, but also a 1-of-N selection.

Figure 16A:
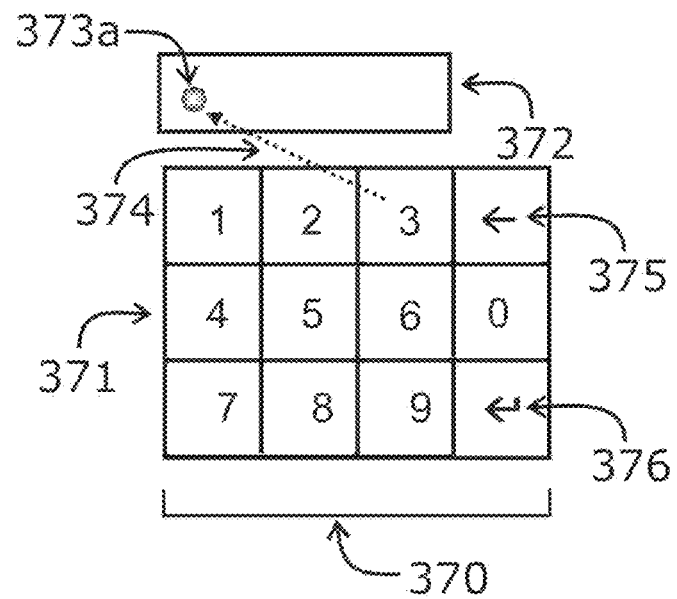
FIG. 16A illustrates the entry of the first numeric digit within a sequence of digits where the activation target is positioned within a display of the selected numeric sequence.
Figure 16B:
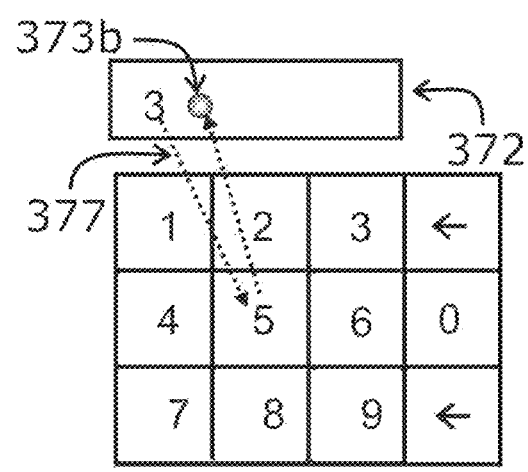
FIG. 16B illustrates the entry of a subsequent digit (compared with FIG. 16A) within a sequence of digits where the activation target shifts upon entering each digit.

FIGS. 16A and 16B illustrate a moveable activation target where target activation locations 373a, 373b indicate the position of the insertion of individual numeric digits within a panel 372 of selected digits. The sequence of selected digits 272 can, for example, be used to specify a telephone number, personal identification number, credit card number, and the like. Digits are selected within the eye-signal language from a numeric keypad 370 that contains ten (10) decimal digits 371, as well as a "back space" character 375 that may be used to make corrections, and a "carriage return" character 376 that may be used to indicate the end of a numeric entry sequence.

In FIG. 16A, a series of numbers is entered starting with the selection of the first digit (i.e., a "3" in this example). By performing a saccadic eye movement 374 from the "3" within the selection array of digits 370 to the activation location 373a within the number display region 372, a "3" is registered as the first digit. At this time, as illustrated in FIG. 16B, the activation location 373b shifts rightward by the width of one digit and the just-entered "3" is displayed. This provides a visual feedback to the user that the digit has been registered and that the system is ready for the next digit at the location on the display and position within the numeric panel 372 indicated by the new activation target 373b.

The next digit to be entered in the exemplary sequence illustrated in FIG. 16B is a "5." The device user may explore the numeric keypad region for the next digit using any number of eye movements, browse the environment outside of the numeric keypad, or saccade 377 directly to the desired digit. Activation of the next digit occurs when there is a saccadic eye movement from the desired digit back to the new activation target location 373b.

The process of accepting entries and shifting the location of the activation target accordingly may be repeated for numeric entries of any length. The end of a sequence may be determined from the input of a pre-determined number of entries or the input of a specific sequence (e.g., a "carriage return" character 376). The same strategy may be used to enter alphanumeric data, answers to multiple choice (e.g., examination) questions, series of words or phrases, selections from a set of symbols or images, and the like.

FIGS. 1 through 8 inclusive are illustrative of the situation where there are multiple activation targets. In these examples, a 1-of-N selection is made to specify which character within a group of characters is to be selected upon activation. A similar strategy (i.e., selection from 1-of-N possibilities and activation) may be made when selecting from among groups of characters, syllables, words, phrases, numbers, images, filenames, data sets, symbols, icons, glyphs, machine functions, menu selections, applied parameters or characteristics, software applications, and the like.

Furthermore, groups may be clustered to facilitate the finding of an initial selection and/or the direction of the activation target to make HMI more intuitive. For example, when specifying a state or province from those that might be within a country, selections may be arranged spatially within the selection matrix according to their geographic locations within the country (versus, for example, alphabetically). As a further example, when selecting from a range of software applications, those that involve the display of video may all be positioned such that they are chosen using saccadic signalling in the downward direction to activation targets (i.e., on the lower part of the display).

Assigned Activation or "Go" Objects

In the most general case, the eye-signal language may use tracked eye movements to discern the intent of a user with any combination of real-world objects and virtual objects on one or more displays. Characteristics including locations of virtual objects on the one or more displays may be known to the device or system of which the device is a part, as in operations with a remote processor, server or storage facility connected via a network. Thus, the device may readily assign meanings to eye movements directed at the one or more virtual objects.

However, the characteristics (including locations) of real-world objects in the environment of the device wearer are not generally controlled by the device. For example, objects viewed by a device user within a conference room setting differ substantially from those viewed while driving an automobile. Thus, the eye-signal language must be able to accommodate for such real-world variations. This includes accommodating for situations in which no device-controlled display is used to discern the intent of the user.

As described above, it is possible to provide auditory or other feedback to identify possible selections or when making a specific selection of real-world objects. An aspect that is important to include in this scenario is the identified eye movement(s) to make or activate the selected action. In other words, absent a display, what serves the role of an activation or "go" icon?

In exemplary embodiments, this leads to the notion of one or more assignable "go" objects. In other words, one or more objects in the real world environment can, on a permanent or temporary basis, be used as one or more "go" icons. When using a display, the assigning of functionality to an identified real-world object fits conveniently within the grammar of the eye-signal language comprising a user viewing real-world objects with or without visual augmentation, signals, activations or display-generated transition graphics.

In exemplary embodiments, a real-world object may be assigned a "go" function by first looking at the object, saccading to a "reveal" icon on a display and then saccading to a newly revealed "assign" icon that performs the action of coupling the real-world object to a "go" or activation function. Other exemplary sequences of coupling eye movements include a saccade from the object to a displayed "go" or other available activation spot, or a sequence of saccades and/or pursuits incorporating the object with displayed objects and even other real-world objects. Tracked movements of real-world moving objects, as observed by the scene camera, as well as eye-tracked objects moved by a user, such as the eyes tracking the user's finger(s) pointing towards an object, or fingers following a moving object also add to the language available for assignment of function and/or selection or activation of objects.

One example of this embodiment is the tracking of a finger pointing at an object such as a written word, image or page in a book that is real, virtual or screen-based to:

1) invoke the speaking of the word or its associated sentence, paragraph or page, upon touch or pointing;
2) invoke sound(s) to be played, or other action(s) to occur, based upon the touch or pointing to any object. For instance, sounds may be played when a user gazes at, points to, and/or touches, images or pictures in a book, or an animatronic character may respond upon gaze, touch, or a gaze-touch combination; or
3) assign functionality to the object, such that subsequent interactions (e.g., touch, squeeze or other interaction, pointing, tickling, gaze) cause an action such as sound, movement, or other change of the object.

In exemplary embodiments, it is possible to assign the "go" or activation functionality using eye movements in situations without a display. This involves viewing a desired real-world object and subsequently making a recognizable, distinctive eye movement. As examples, multiple eye movements (e.g., with a prescribed minimum number of movements) may be made in a roughly circular pattern around the real world object, or the user may perform a so-called cross-eyed signal to assign the activation functionality.

Alternatively, and as additional exemplary embodiments, the user may combine gaze location with body movements that are under voluntary control to assign activation control. If the user saccades from a real-world object to a specific body part (e.g., finger, thumb, hand, foot) then the viewing and/or pre-determined movement of such a body part may be used to signify that the user desires the real-world object to be an activation or "go" target. Alternatively, if the user is viewed as pointing (e.g., with a specified finger or pointing device) to an object, then the pointed-at object may subsequently be assigned to be an activation target. Along similar lines, if the user picks up an object and views it for a pre-determined time and/or during a movement pattern, then the held object (placed anywhere) may be considered an activation or "go" target.

A real-world activation or go object may be anything in the environment including, for example, a mark on a wall, sign, number, word, door, light, and the like. Objects may also be printed items, toys, or other objects, which might be inanimate or enabled active in some manner. Activation or "go" may be coupled with a portion of a real-world object such as the edge of television, corner of a window frame, handle of a door, and the like. Functionality may be assigned to a uniquely identifiable, specific object (i.e., with one or more identifiable, distinguishing characteristics) or to a general class of objects such as light switches, electrical outlets, pens, books, shoes and the like, that may be classified using object recognition algorithms know in the art.

Once one or more real-world objects are assigned a "go" or activation functionality, other components of the eye-signal language may subsequently be used. For example, a user that might want to toggle a remotely controlled light switch on or off may first look at the switch and then saccade to the "go" object. In general, since real-world activation targets cannot display (real-world) selection menus when activated, there is a much greater dependence on the context (including identity) of one or more viewed real-world objects. For example, a switch may cause a light to be toggled whereas looking at a door may cause the door to open (assuming the user is authenticated to open the particular door). Context may also include other factors such as time of day (e.g., a light may be turned on only at night), history of activities (only turn a light on that has previously been turned off by the user), whether the environment is light or dark, the presence of sound or identifiable speech in the environment, and so on.

Multiple Activation or "Go" Objects

The eye-signal language is not confined to a single "go" or activation location. In further embodiments, multiple "go" icons or activation objects at different locations may be assigned differing actions. Foundationally, this allows the user to rapidly make a 1-of-N selection, where N is the number of activation objects, in addition to the activation when saccading to a "go" location.

As outlined above, multiple objects within the real-world environment may be coupled with the same or differing functionalities (taking into account context). Since the real world is rich with different objects in the environment, a user may increase signalling efficiency by assigning functionality to a large number of such objects. This is particularly true in stable, well-known environments, such as an office or family room.

Even within the more confined environment of a user display, for some applications, it may be more efficacious to employ multiple activation locations. Examples of this general concept are shown in FIGS. 1 to 8 inclusive, where multiple activation targets are used to further specify from a group of possible selections of characters, numbers and other functions. The placing of four activation targets in the four corners or, alternatively along the four sides of a display is particularly effective and easy to use. Wide spatial separation of activation targets in well-defined directions makes the differentiation of selections on the part of the user more intuitive and avoids inadvertent activations (due to spatially separated targets) by the device.

Using Saccades to Select from a Continuous Range

As previously described, smooth pursuit eye movements may be used to follow an object over a user selectable time and/or distance in order to specify a user input based on a "continuous" range of inputs (e.g., to control speaker volume). In additional exemplary embodiments, it is possible to use saccadic eye movements to select from a continuous range or "scale". A scale is any form of graphical representation that allows a user to specify an input based on specifying a specific position (from any number of, or an infinite number of, possible positions) using eye gaze relative to the full range of the displayed scale. In particular, the viewed position may be determined relative to the positions of the lower-most value and the upper-most value of the displayed scale to specify a selection.

A key challenge when using saccadic eye movements to make a selection from a continuous range arises from the fact that saccadic eye movements are inherently discontinuous, jumping from one target location to another. Thus, a key consideration when using saccadic movements to make a continuous selection is the filtering (generally using some form of temporal and spatial averaging) of measured locations within clusters of saccadic movements that are directed at specific targets.

Figure 17A:
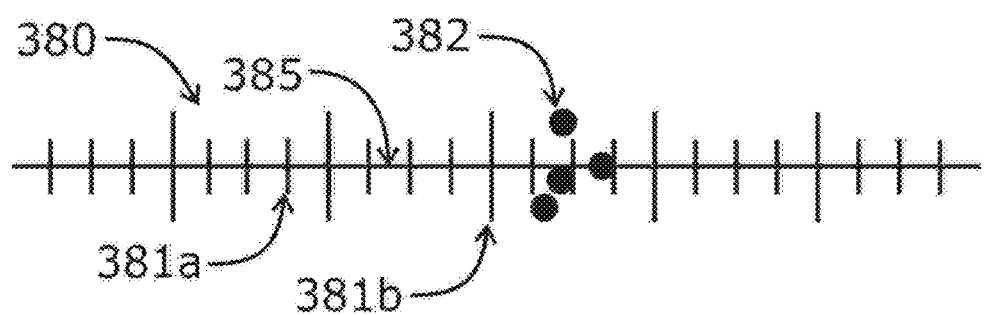
FIG. 17A illustrates exemplary eye movements during a user selection from a continuous scale.

As described previously, it is physiologically difficult to make saccadic eye movements within regions where there is "nothing to see." Thus, even when making a continuous selection using saccades, it is important to provide discrete focal locations as targets for saccadic movements. FIG. 17A illustrates an example of a graphic or scale 380 with focal (i.e., saccadic target) locations that may be used to make a continuous selection based on saccadic eye movements.

Focal locations are formed using evenly spaced tick marks 381*a*, 381*b* that cross a central axis 385, resembling a ruler. The intersections of the axis 385 with the tick marks 381*a*, 381*b* generate focal points. In order to break up the repetitive nature of the tick marks, longer tick marks 381*b* are interspersed at regular intervals among the smaller tic marks 381*a*, much like the markings of a tape measure. Other graphical representations of a continuous selection may also be used such as a dial, schematic representation of a mechanical (i.e., liquid filled) thermometer, needle indicator, and the like; with focal points along the respective scales generated using indications such as tic marks, dots, arrows, changes in color, etc. Saccadic eye movements may be made in any direction (including horizontal, vertical, radial and/or rotational) to indicate a selection.

Figure 17B:
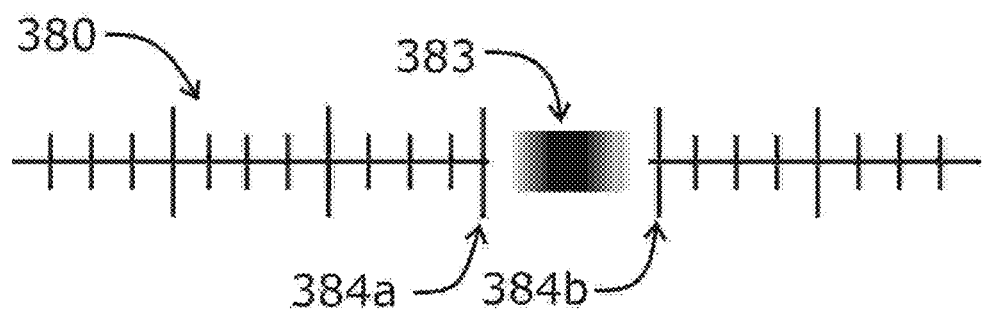
FIG. 17B shows visual feedback indicating a selection made from a continuous scale using eye movements.

Exemplary measured saccadic locations are represented as filled circles 382 in FIG. 17A. As illustrated in FIG. 17B, based on a running average of these measured locations 382, an initial graphical representation 383 of the selection relative to the overall selection range represented by the scale 380 is provided to the user. At this point, the user may make saccadic eye movements to focal locations to the left 384*a* or to the right 384*b* to decrease or increase the selected value, respectively. Optionally, the rate at which the selection follows the left or right saccadic movements of the eye may be based on how far left or right the user looks relatively away from an initial selection. Once the user is satisfied with a selection, a saccadic eye movement may be made away from the region of the scale, or to an activation target, indicating that the selection process is complete.

Multi-Modal Feedback

In additional exemplary embodiments, feedback during user selections may be made using modalities other than those associated with a displayed scale or other scale representation. For example, when adjusting audio volume, sounds may be made during the selection process (i.e., at the designated level) to help make the volume selection. As additional examples, the brightness, color, hue, transparency, contrast, size, level of detail, and/or shape of displayed images may be changed in manners that are proportional, inversely proportional, or coupled in a non-linear fashion to selections being made by a user during a selection process.

Feedback may also be provided on devices that are remote to (but that communicate with) a user device. Examples of remote modalities include altering remote display screens and lighting, remote sound generation including sounds generated by mobile devices, the control of environmental temperature, indicators such as digital read-outs, and so on.

The use of other, non-display based modalities may also help to reduce inadvertent eye movements during the selection process by avoiding changes to the display that attract the eye of the user. In additional exemplary embodiments, multimodal feedback in one form may be used to represent changes to another. For example, a degree of magnification or "zoom" of an image may be represented as an auditory signal where pitch (i.e., the frequency of sound oscillations) may be used to indicate a degree of zoom. Along similar lines and as another example, the repetition rate of a clicking (or any other) sound may be increased and/or decreased during the selection of a control associated with any sort of "rate," such as the frame rate during the display of video, scrolling rate for text, "page turn" rate during the display of still images, and the like.

In additional exemplary embodiments, subtle changes to a representative image, may be made in such a way as to be "invisibly visible.". In other words, an object may be visible when a user is cognitively aware of the presence of some visual element, that can be sensed or seen in the user's parafoveal or peripheral field of view from their current gaze point, but "invisible" or not sensed when a user is not cognitively aware of the possible presence of the visual element. This may be performed so as not to draw the user's gaze to the target, icon, or indication of a controlled state change.

These strategies avoid making dramatic changes to the display as feedback such as having to dynamically zoom an image (i.e., generating distractions) that may easily produce inadvertent eye movements while making a saccadic selection. A user may quickly learn that a certain (i.e., remembered) pitch or click-frequency represents a certain degree of zoom or a certain repetition rate. Similar strategies may be applied to other continuous input selections.

Auditory feedback, in particular, is useful when making selections involving real-world objects. For example, if the user views an object such as a light switch that is recognized by the device (e.g., using the scene camera in conjunction with gaze location), then an indication that the object has been recognized and is available for an action may be indicated by an auditory cue (e.g., ping, ding, ring, click, chime). Subsequently saccading from the object to an activation icon or "go" may cause an action such as turning on the light.

In additional embodiments, auditory and/or other (e.g., vibrational, olfactory, tactile) feedback may also be tuned to indicate some aspect of the real-world object. For example, if the object is a face and the face is identified (using object recognition algorithms) from a database of faces, then one form of auditory cue may be provided (e.g., a double tone where the second tone increases in frequency). If, on the other hand, a face is recognized as a face but is not identified as being within a database of faces, then a different auditory modulation, amplitude, and/or cue (e.g., a double tone where the second tone decreases in frequency) may be provided as feedback to the user. In either case, the user may perform an activation saccade; however, the action that results from the activation may differ, depending on the device-based recognition and/or identification of the object.

Haptic feedback may also be provided in these instances, or in respond to any eye-related interchange involving vibration, temperature, voltage, pressure, any one or combination of which might vary corresponding to a desired communication of information. Such haptic feedback could be delivered via a variety of coupled wearable devices including gloves, rings, bracelets, necklaces, headwear, underclothing, and the like.

In additional embodiments, the binaural nature and/or the ability to acoustically localize the source(s) of sound provides another opportunity for user feedback. This may be achieved generally using two or more speakers, but is particularly effective using a pair of earplugs or headphones as a component of the user's device feedback system. Foundationally, the perception of the direction of a source of sound is perceived due primarily to phase differences of sounds heard between each ear. The perception of the distance also considers differences in amplitude heard within each ear. This general phenomenon is known in the art as the head related transfer function (HRTF).

Both perceived 1) direction, and 2) distance may be used separately or together to provide feedback to a user. Changes in direction and/or distance may be used in a discrete event mode (e.g., individual clicks or other sounds) or a continuous mode (e.g., a continuous siren). Sound direction may be coupled in some fashion to the action being performed (e.g., nudging an object to the left on a display producing a sound that appears to originate from the left), or may be completely unrelated to an action (e.g., a sound originating from the right indicating "yes" and a sound from the left indicating "no").

Similarly, perceived distance may be related in some fashion to the action being performed (e.g., a sound made to appear closer when zooming in on an image, a sound that appears closer when the user closes in on a correct answer, or a perceived distant sound indicating that a setting has been set on a remote device), or may be completely unrelated (e.g., a sound made to appear nearby the user indicating the urgency of a message).

The Gap Effect Applied to Physical Objects

The gap effect is employed as a foundational tool to speed user interactions within the eye-signal language. As described previously, an object that is about to be viewed as a result of a saccadic eye movement may be removed from view, "releasing" the visual attention of the user to more rapidly move on (compared with an object remaining within the view of the user) to view another object. Removing the virtual object on a display at an appropriate time can produce the gap effect.

When viewing physical or real-world objects, it is generally not possible to remove the actual object from the view of a user during a saccade. However, using an augmented reality (AR) or mixed reality (MR) device, it is possible to remove the view of such an object. In this exemplary embodiment, real-world objects may initially be viewed through an AR or MR device by making one or more regions of the device substantially transparent. If the user saccades toward an activation object, then the object may be removed from the view of the user by decreasing or eliminating the transparency of the AR or MR device in the direction toward the real-world activation object.

If desired, the partially or fully opaque region may be filled with a neutral area that does not attract user attention. This may, for example, consist of a solid color, spatial gradient of color(s), pseudo-random noise, familiar image, or an estimate of the background behind the activation object based on the viewable region around the object. In order to further reduce attention, the region around the edges of the reduced-transparency region may be gradually transitioned from less transparent (i.e., blocking the user's view of the object) to fully transparent (i.e., away for the object being blocked from view) gradually. This reduces the likelihood that a user detects and/or views the edge of a reduced-transparency region.

Fully or partially blocking the view of a target object during and/or following a saccade using AR techniques can produce a gap effect using real-world activation targets. Transparency within the AR device to re-reveal the object may then be returned using previously described techniques that are design not to attract the attention of the user. For example, if sufficient time is available, the transparency may be returned slowly, or when the user is functionally "blind" (e.g., during saccades and/or blinks).

Courtesy Considerations

Courtesy is a common concern with all interactive and/or so-called "smart" devices. In many cases, for example, in business and social settings, a user may wish to limit incoming calls or data streams, by temporarily turning off all except emergency communications. However, it is easy to forget to place a device in a "courtesy" or "silence" mode before entering such situations while going about daily activities. It is equally easy to forget to return a device to normal operations when these situations have ended.

Based on pre-defined sets of preferences, a headset and/or display(s) may temporarily "filter" incoming notifications and information when the device recognizes situations (e.g., high-relevancy objects and/or individuals) that call for a "courtesy mode." For example, a device may recognize that the device wearer is engaged in conversation. This situation may be determined from the recognition of the wearer's voice recorded using a microphone and/or images of people speaking in the direction of the device wearer recorded using scene camera(s) viewing the environment. Particular attention may be paid to the directions of the eyes of people in scene camera images (e.g., directed toward the device wearer or near enough to the device wearer to suggest intimate or personal contact that should not be interrupted) and whether the mouths of nearby individuals are moving. Other information that may be used to automatically determine whether "courtesy mode" should be invoked includes the time-of-day, day of the week (e.g., work day versus weekend), geolocation, indoor versus outdoor environments, and other patterns.

Courtesy mode may also be invoked when a specific person, environment, or location is recognized. For example, interruptions may be inappropriate when speaking with a specific person (e.g., boss, clergy). Courtesy mode (and even a "no transmit" mode) may be invoked when the interior of an airplane is recognized. Areas within schools, hospitals, cinema or movie theaters, and other facilities may be identified as "courtesy mode" zones based on geolocation and/or identification using a scene camera. An interior of an automobile may be recognized (based on a data base of templates of automotive interiors) along with any controls (i.e., automobile or any other machine) that may require priority user attention.

In the most general sense, any context for which a distraction of the wearer should be disallowed or where the distraction can be perceived by another person or entity, can be managed using "courtesy mode" functionality. Image analysis based on a neural net trained to recognize "courtesy" or uninterruptable situations may be used to implement one or more courtesy modes.

Different levels of data filtering may be pre-set, based on user preferences. As an exemplary scenario, in some situations, texts and alerts may be allowed while blocking e-mails and other notifications. Display or retention (i.e., to be displayed at a later time) of information may be dependent of the source of the information and/or current activities. For example, physiological monitoring (e.g., heart rate, respiratory rate) and navigational information may be displayed while biking or hiking, but not displayed further once the activity has been completed. In other situations, all transmissions may be blocked or buffered (i.e., collected but not displayed) except those declared as emergency.

Along similar lines, notification modalities may be modified, depending on situations. During different courtesy mode situations, notifications that would typically involve an audible sound may be converted to a "silence" mode that simple displays a screen message and/or an inaudible vibration.

In other exemplary embodiments, notifications may be delayed until a courtesy mode has transpired. Delays can be a matter of just a few seconds or minutes so as to not interrupt a conversation. Delays can also be much more extended, lasting several hours, in order, for example, not to interrupt an important conference. Indications of a "courtesy mode" state may be presented to the user visually, aurally, or by other stimulation (e.g., via haptic mechanisms). Control and/or acknowledgement of courtesy mode may also be performed with eyes, voice, hands, head, EEG, or other input methods.

Attracting User Attention During Urgent Notifications

In some cases, it may be necessary to draw a user's attention to a specific body of information or event regardless of other activities. For example, if there is an immediate potential for harm to the device user or others (e.g., a so-called "active shooter" situation in the user's environment, a building-specific fire alarm, and the like) then there may be an urgent need to alert a device user. Knowledge of a device user's gaze may aid in the process of attracting a user's attention and providing information relevant to the situation.

In exemplary embodiments, upon receipt of information deemed urgent, an indication is placed within the visual field (e.g., within augmented reality, virtual reality, or mixed reality headsets) in the general direction of the user's gaze. The indication may be explicitly placed within a user's foveal gaze area, parafoveal region, or peripheral region. Optionally, the system may dynamically track a user's gaze until the user acknowledges the notification, and/or takes action. This visual indication may be in the form of an icon, symbol, word or words, thumbnail image related to the situation, portion of an image, and the like. The visual indication is presented in a manner that is designed to attract attention (e.g., introduced rapidly, not during periods of user blindness including saccadic suppression or blink suppression, with high contrast, etc.). The visual indication may be accompanied by other alert mechanisms such as auditory or haptic stimuli.

Once the initial notification has been made, the visual indication may be moved or "swept" in a manner such that it can be visually followed by the device wearer. This allows the device wearer to track and subsequently remember a spatial path of the symbolic representation of the information or event to a specific region and, in some cases, to a specific subset within a region. For example, an urgent incoming text message may be swept to a region where text messages may be retrieved. Within the region where text messages are retrieved, the sweep may visually indicate a location that is associated with a particular sender of the urgent text message. An urgent e-mail may similarly be shown to sweep to a particular sender within a region reserved for retrieving e-mails. Urgent images or links to video may be swept to locations where such content may be retrieved. Urgent content in various forms may also be swept to a dedicated region for such information (i.e., regardless of format) and/or copied to other regions.

The gaze behavior of a user may be monitored during such a sweep, to verify that a user follows the stimulus using a smooth pursuit or saccadic eye signal. If the user does not perform such a signal within a predetermined time, the sweep may be repeated in a manner to assure that a user's attention is captured, and the notification is acknowledged and/or acted upon. The ability of the system to track a user's gaze provides a powerful means of direction a user's attention in critical situations.

Upon visually following the swept indication, the user may subsequently activate the indication immediately (using the eye-signaling language) to retrieve further details regarding the urgent notification. Alternatively, the user may simply "remember" the spatial location of the notification so that the information may be retrieved at a later time. This overall scheme ensures that a user is alerted to urgent notifications without distracting or forcing the user to performed unwanted visual activities for an extended period (e.g., while driving a vehicle or operating other machinery).

In additional embodiments, the handling of urgent notifications by the device may also be context-sensitive. A user may pre-determine which notifications are sufficiently urgent to precipitate the visual alerting process. Pre-determinations may be based on the source of the information, the form (e.g., text, image) of the notification, a classification related to urgency, historical frequency, time of day, location, user activity, proximity of other people, user history, whether the user has disregarded or acted upon such notification in the past, and other factors. Whether the visual alerting process is executed may also depend on the apparent activities being performed by the device user. For example, only the highest priority notifications may be presented while driving a vehicle whereas less-urgent notifications (e.g., text messaging) may be presented during periods of relative inactivity.

Online Mobile Status and Privacy Controls

When making initial connections enabled by wearable computing devices (i.e., without any prior identification or knowledge), an issue arises in linking a viewed person and wearable hardware with an associated network address (e.g., URL [universal record locator], MAC [media access control] address, IP [internet protocol] address) or some other form and/or protocol for electronic communication. If the viewed person can be identified by methods such as facial recognition, then an associated device or "address" of the individual may (if allowed based on privacy settings) be retrieved from a database. However, without any form of user or hardware recognition, there is no automatic way to initiate a definitive connection or linkage between users' devices in proximity to one another.

If very close, an affixed identification (e.g., barcode, Q-R code) on one device user could be viewed by another device user and interpreted to gain access to a network address. However, this is difficult over any distance and also prohibits the ability of a user to enter a "privacy mode" when external contacts are not desired (without physically removing the identifying code).

A simple and power-conserving way to be able to associate a device and the wearer of the device with another device (and device wearer) is the use of one or more sources of electromagnetic radiation (i.e., beacons) affixed to a device that can then be viewed by scene cameras of other device wearers. A pulsed (e.g., flashing, on-off), infrared LED beacon is a convenient, exemplary embodiment for this application. Near infrared wavelengths (e.g., 800-1300 nm) may be chosen that are invisible and non-distracting to users, but that can be detected by scene cameras (e.g., using complementary metal oxide semiconductor [CMOS] or charge-couple device [CCD] sensor technologies) of other device wearers.

Figure 18A:
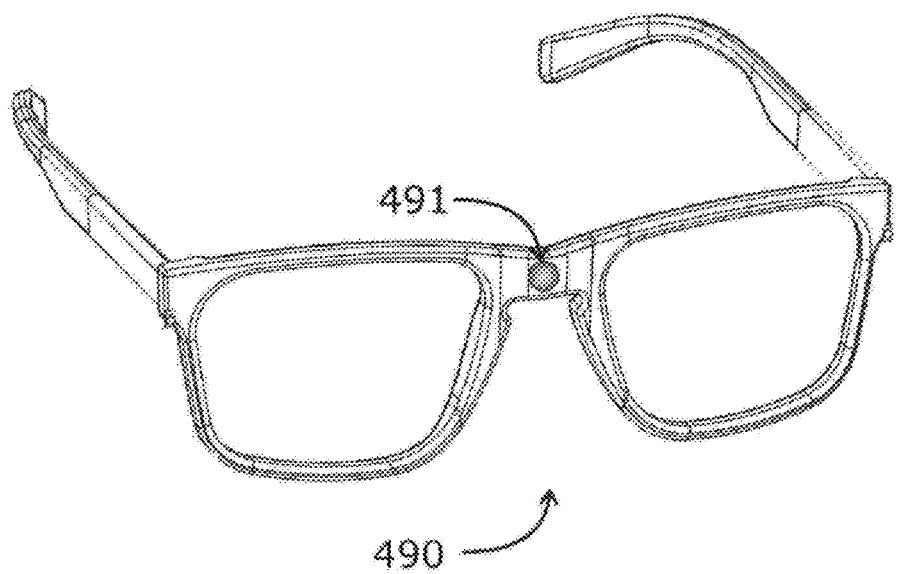
FIG. 18A shows an exemplary location of a single status beacon on the nose-bridge of a wearable device.

An IR LED with a wide angle projection (close to 180 degrees) is most useful, mounted, for example, on the bridge above the nose. FIG. 18A shows an example of a headset 490 and the location of a single beacon mounted within the nose bridge 491. Any device wearer who can see the face of a device wearer with such a beacon should generally (unless the beacon is obstructed for some reason) be able to detect beacon broadcasts.

Figure 18B:
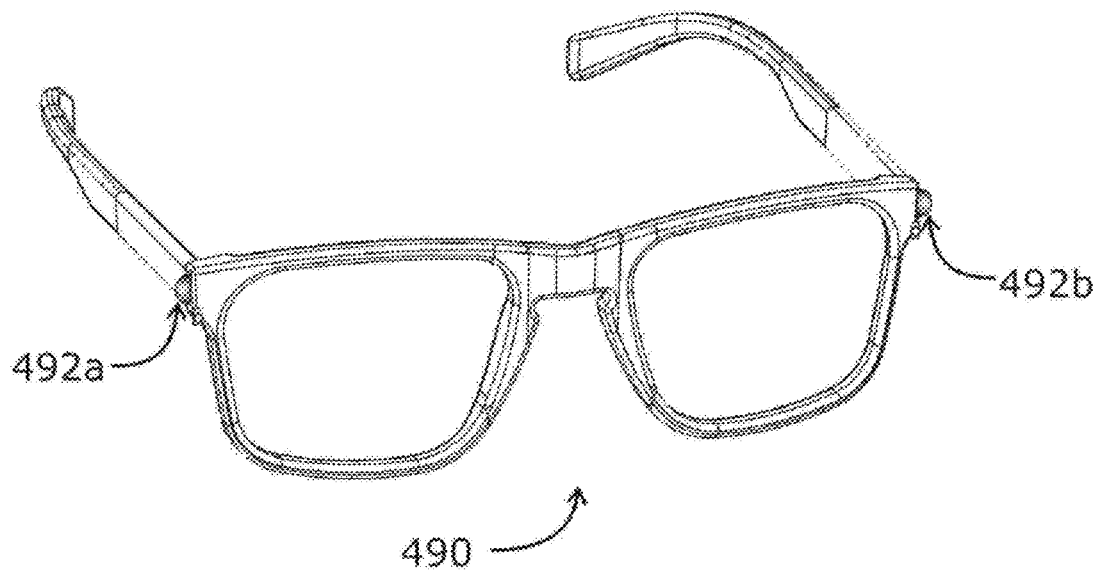
FIG. 18B shows exemplary locations of two (2) status beacons along left and right sides of a head-mounted, wearable device.

Two (or more) LEDs mounted on the sides of the device give an even wider ability to be detected from all angles, although at the cost of additional power consumption. FIG. 18B shows an example of a dual beacon 492a, 492b arrangement in the hinge region of ear supports. In alternative embodiments, in the case of a helmet or headwear with supports on the upper portion of the head, a wide-angle projection beacon may be place near the top of the head. Multiple beacons placed around the head can assure the ability to detect from all viewing angles.

The pulsed beacon can, not only be used for initial detection (using image process) of devices and their users, but also to indicate the status of device wearer. Indications of contact status can, for example, be similar to status indications used in typical tele-conferencing situations where an exemplary status might be: "available," "momentarily off-line," "group available," "contacts-only" or "not available." This gives privacy control to a device-wearer and may be changed in real-time by the user and/or automatically by the device. Automated status changes may be based on location, the viewed environment of the device wearer (e.g., whether engaged in conversation), time of day, electronic calendar(s), eye-signal activity, etc.

A convenient method to locate another headset and identification beacon within the environment of a device wearer includes subtracting spatially aligned images with the beacon on (i.e., broadcasting an active signal) versus with the beacon off. Differences between two (or more) such images arise primarily in the region of the beacon and such "difference images" may be used to isolate the location of the beacon, as well as to help ensure (e.g., by measure beacon frequency characteristics) that the source of the beacon is another device.

If the pulsing of a beacon is not synchronized with the frame rate of an observing camera, then an issue arises to determine the maximum frequency the beacon may be modulated on/off while assuring that camera images contain at least one frame during maximum and minimum brightness levels (to easily track/identify the beacon by subtracting successive images). Within successive images, if the frame rate is at least four (4) times the modulation rate of pulsed beacon, then images gathered by a non-synchronized camera are assured to contain frames with maximum and minimum brightness levels (assuming the beacon radiates with equal "on" and "off" times). Maximum and minimum brightness levels may be used as references to determine if pulse width or amplitude modulation is occurring to encode information as described below. As an example, if the acquisition rate of a camera is sixty (60) frames/second, then modulating a beacon at fifteen Hertz (15 Hz) assures maximum and minimum beacon levels detected within camera images.

Figure 19A:
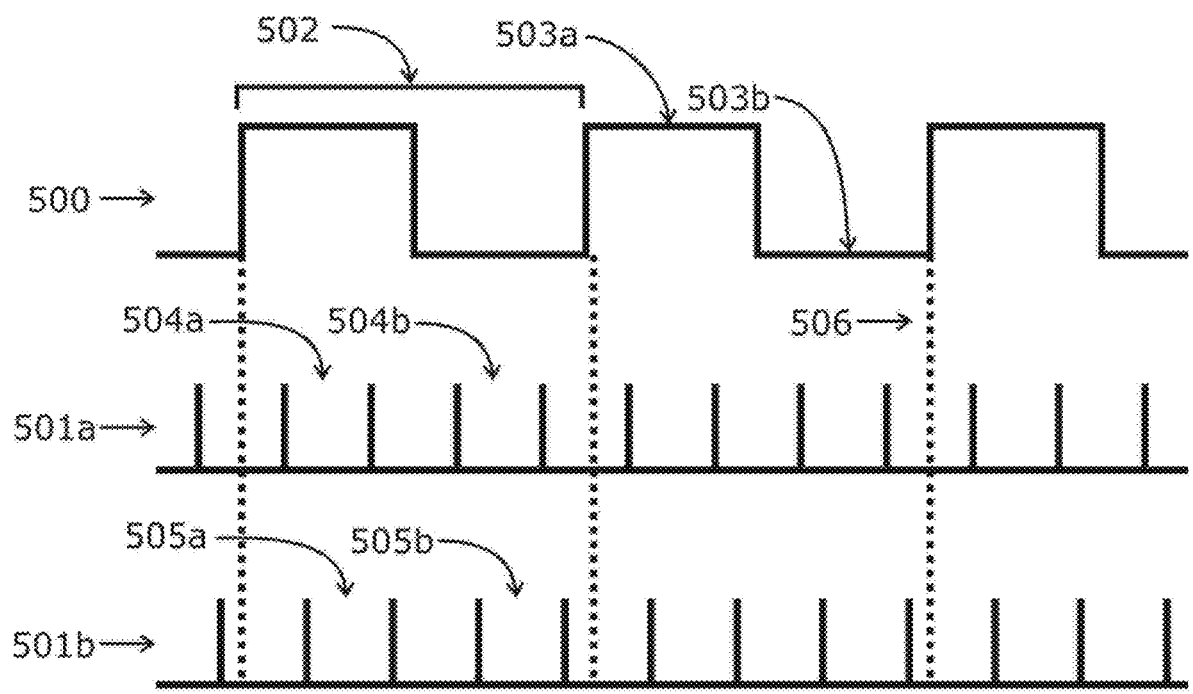
FIG. 19A is a timing diagram that shows possible temporal relations between a broadcasting status beacon and image acquisition by an unsynchronized camera or detector.

FIG. 19A is a timing diagram that illustrates the relation between a pulsed beacon 500 and the frame rates of unsynchronized cameras 501a, 501b where the frame rate of the camera is four (4) times the cycle rate of the beacon. The "on" state of a beacon 503a is represented by a high level in the timing diagram 500. Conversely, the beacon "off" state is represented by a low state 503b. A full beacon cycle 502 includes both on 502a and off 503b states. In FIG. 19A, dashed lines 506 are shown as reference times during the low-to-high transition of each cycle of the beacon.

Camera timing 501a, 501b is represented by a vertical stroke at the end of each image frame acquisition period which is also when a new frame acquisition is initiated. In the upper camera timing diagram 501a, a full frame 504a is acquired during the time when the beacon 500 is "on." Another frame 504b is acquired when the beacon 500 is off. If camera timing is shifted 501b, there remains at least one full frame acquired when the beacon is "on" 505a and another full frame when the beacon is "off" 505b. Full-on and full-off images are available, regardless of camera versus beacon synchronization.

Although slow by today's telecommunications standards, the status of a device (and the associated individual) may be encoded within such a beacon. Beacon characteristics may be dynamically changed to reflect this information. Examples of this encoding include pulse-width modulation (i.e., controlling the duration of the on versus off phase), phase shifting or amplitude modulation analogous to asynchronous communication standards used during serial communication (e.g., RS-232 protocols), and the like. With a limited number of status options (typically encoded as a numeric value), status information may be broadcast and determined, for example, within less than one (1) second even at slow camera frame rates.

If a device wearer is set to allow external connections, then network "addresses" or other linkage information must be exchanged to enable the connections. If there is only one device-wearer in a local region, then this could be performed by a device "discovery" process in which addresses are simply broadcast without restriction (e.g., using Bluetooth or Wi-Fi) and exchanged. However, for a more secure exchange of addresses and credentials, particularly when there is a possibility of more than one other device user in the vicinity, a signalling process that is isolated to a specific device (i.e., being viewed) is required.

If contact or a "connection" is a potential, then a viewing camera may be briefly switched to a very small region-of-interest around the beacon source and acquisition rates increased to a range of hundreds or even thousands of frames per second. Micro-bursts of encoded information within the beacon may include network location information such as a URL, IP address, MAC identification, or other pointer that may be used in a look-up table within a central data base. Encoding may use the same or different techniques than those used during the low-frame-rate status determination. For example, common serial protocols (e.g., RS-232) may be used. The key difference is the increase in the rate of exchange of information enabled by the higher frame rate, allowing more complex information, such as a URL, to be specified.

Figure 19B:
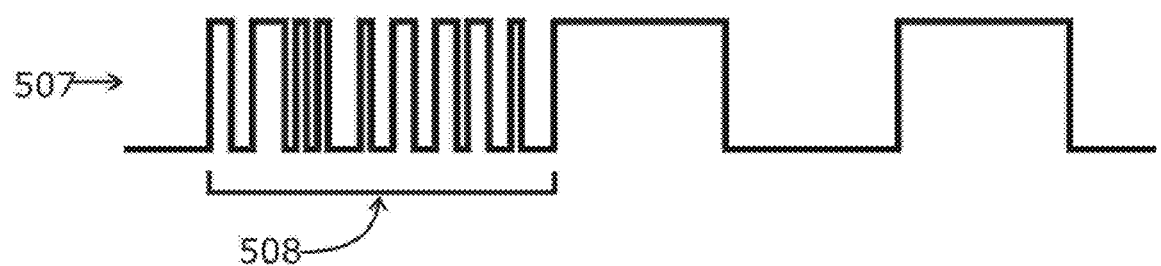
FIG. 19B is an example of a "micro-burst" that encodes connection information within the signal of a broadcast status beacon.

FIG. 19B is a timing diagram that illustrates a microburst 508 in which a network location information is encoded during one cycle of a beacon's pulsing. Such microbursts may be interspersed periodically during the normal cycling of a beacon 507 whenever the device user is available for a connection.

By analogy, the beacon electronically performs the identity functions of a QR or barcode, but that may 1) operate over a large distances and 2) be controlled by a headset wearer. The exchange of credentials of a specifically viewed individual may be performed unobtrusively, typically in less than a second, while maintaining privacy whenever desired.

Alternative embodiments to a high-frame rate camera include using a plurality of broadcasting beacons substantially simultaneously to encode and transmit more information. Information encoding may include phase differences between two or more such beacons. In lieu of switching to high frame rates within one or more cameras, one or more single-pixel detectors (e.g., photo-diodes) may be used within a receiving device. Such a detector may then be sampled at high rates to decode micro-bursts that encode, for example "contact pathways". The transmission of such information would be functionally similar to IR remote control devices commonly used to communicate with televisions, speaker systems, and the like. Such a detector would need to be directionally sensitive to avoid cross-talk in crowded situations.

Identification and Applications of Mutual Gaze

Face-to-face conversations among individuals are ubiquitous components of everyday life. Mutual gaze plays an essential role in such communications in terms of initiating and maintaining conversations, as well as identifying and registering "who said what".

Within exemplary embodiments, gaze tracking combined with scene camera images (i.e., device-user gaze superimposed onto the environment) may be used to identify an individual being viewed by a device wearer. If another device wearer is looking back at the individual (i.e., identified via the same methods), then the two device users may exchange credentials, and any exchange of information and conversation may be registered as being between the two individuals as long as the mutual gaze status is maintained. The exchange of credentials may involve an initial identification via device beacon(s), e.g., as described above.

Based on predetermined user preferences, the system may optionally allow the exchange of gaze to occur at different times. For example, if a first individual views a second person for a period of time and then turns away, for a user-selected predetermined period, the system may allow the exchange of credentials if the second person gazes back, even though the first individual has turned away. As a further example, a pair of individual may wish to re-connect at a later time, as long as both individuals observed each other at some time during a conference or other meeting.

If one of the persons involved in the conversation is not wearing a device, then the presence of mutual gaze may still be identified using the scene camera of the device wearer. Based on scene camera video of a device wearer, image recognition may be used to determine if an individual in the environment is looking back toward the device wearer. The identification as to whether someone is looking in a particular direction is known in the art as "gaze lock." Gaze lock directed at the device wearer may be identified based on facial orientation, facial expression, and/or eye(s) direction. In some embodiments, algorithmic approaches may include machine learning (neural network) approaches based on camera images. Most individuals can identify gaze lock (i.e., when they are being watched) naturally, to the degree that it is often unavoidable to notice when someone is looking at them.

The identification of gaze lock may also be applied in the virtual world to an avatar. In situations such as teleconferencing, simulations, and game play, avatars may be enabled to look at specific individuals, for example, to enable more realistic conversation. Gaze lock may be communicated directly (generally via a telecommunications link) by the avatar or detected based on scene camera images of the avatar.

Whether mutual gaze is based on 1) images from two separate device wearers, 2) gaze tracking by a single device wearer along with detection of gaze lock within scene camera images, or 3) gaze lock by an avatar; the presence of mutual gaze may be utilized in a number of ways:

1. If the individuals have never met, then (assuming privacy considerations, described elsewhere herein, have been taken into account) information regarding the other person may be displayed to device wearer(s), enabling connections.
2. If the individuals have met previously, then information essential for re-connecting (e.g., name, time of previous contact, etc.) may be displayed to enable a re-connection.
3. If conversation or other information is exchanged during mutual gaze, then any information (e.g., audio, images, text) stored about the exchange may be tagged as having occurred during mutual gaze. This can help provide context during information retrieval.
4. In conversations or interactions with multiple individuals, mutual gazes may be recorded and/or used to tag information (e.g., audio, images, text) throughout the interaction. These data may help address the issue of "who said what" within data sets as well as discerning the topics of interest of individuals, as well as topics of interest to groups of individuals.

Multi-Modal Controls Including Wearable Devices

Although eye signals are a powerful form of human-machine interface (HMI) interaction, particularly during wearable and/or mobile computing situations, their utility can be substantially extended when coupled with one or more other modalities of HMI interaction. For example, it generally feels "comfortable" to interlace eye signals with voice commands and/or supplementary methods such as head nods to signal and/or emphasize purposeful eye movements. Purposeful eye movement may include a saccade, a series of saccades, a vergence movement, a vestibulo-ocular movement, or a smooth pursuit.

An issue that arises during such multi-modal control is to address which form of input is given overarching control at any given time. Ambiguities may arise if two activation sequences originating from different sources are received at roughly the same time (e.g., which sequence to executed first?) and/or if two or more sequences are received that are not logistically consistent (e.g., a request to show a full-screen display of an image and a full-screen display of an e-mail at the same time).

Priorities for such inputs can depend on a particular application and/or can change on a moment-by-moment basis. For example, when there is a need for specification that includes letters, numbers, words, phrases, or sentences; it is often easier and quicker to speak a desired input. Within exemplary embodiments, applications may pay particular attention to "listen" for audio input at such times. Audio inputs may be further refined, for example, to identify the voice input as being specific to the device wearer.

Many forms of HMI inputs make use of changes or movements that can be a part of going about daily activities, not associated with device control. Different inputs have different susceptibilities to interpreting whether a change is "purposeful" for HMI interaction (i.e., a component of a signal) or is not associated with such control. This can play a role in determining the priorities of different inputs. At one end of this spectrum, moving a computer mouse and clicking one of its buttons is invariably intended to indicate machine control. At the other end of the spectrum, eye movements are an essential part of daily activities where the eye signal language is specifically designed to facilitate and distinguish purposeful from exploratory and other forms of eye movements.

Table 1 show a number of exemplary input sources along with an initial or inherent confidence that a change in state is purposeful (i.e., directed at HMI interaction). The approximately upper half of the table includes input modalities with devices where intentional interaction contact (or near-contact in the case of proximity sensing) is made. In the middle column of Table 1, an increased number of asterisks indicates an increased confidence that an initially detected change in state (without follow-on analyses) is purposeful.

TABLE 1

Characteristics of Different Input Modalities

| detection of change in state | initial confidence of purposeful movements | exemplary priority |
|---|---|---|
| Mouse, joystick, pen or other pointing device | ********** | |
| Keyboard | ********** | |
| touch screen, ball or pad | ********** | 1 |
| finger tap or other proximity detection | ********** | |
| rapid portable device movement (shake) | ** | 2 |
| switches and other assistive technology sensors | ********** | |
| head nod | ******** | 3 |
| hand gesture | ******* | |
| movements of other body parts including arm and leg | ***** | |
| voice command | **** | 5 |
| eye signal | ** | 4 |
| electroencephalogram (EEG) | * | |

Pressing a mouse or keyboard button is, almost without exception, associated with purposeful HMI intent. Touching a switch, screen, pad, or other proximity-sensitive device is also usually purposeful, although accidental touches, taps, or swipes can occur occasionally. Many devices have embedded accelerometers that can detect movement and thus react when moved or shaken. Wearable devices, in particular, are under constant movement. Thus, characteristics of movements (e.g., amplitude, primary frequencies and/or duration) must be considered to determine if movements are purposeful.

The lower portion of Table 1 includes input modalities that are generally sensed more indirectly. Head nods, hand gestures, and defined movements made by other body parts generally require a specific pattern and/or sequence of movements to be interpreted as a HMI signal. Otherwise the movement may be associated with other activities. Unless blind or mute, speech and eye movements are ubiquitous components of daily activities. Thus, the degree of "purposefulness" of such potential inputs must be assessed carefully.

The inherent confidence and "purposefulness score" may play a role in determining the priority of a given input. A "purposefulness score" may be computed based on the degree to which a particular movement, gesture, or eye signal matches the pattern of a selection or activation sequence. Patterns that are more well-matched are most likely purposeful on the part of the device user. The inherent confidence of a modality, a "purposefulness score," and the context of a particular application (e.g., whether one or more modalities are expected or convenient for a particular modality of input) may all be used to filter and prioritize inputs.

The right-most column in Table 1 lists an exemplary "hierarchy" or priority list for an exemplary application. Not all input modalities are generally available at all times and, even if available, some modalities might not be used during some applications. If, for example, eye signals are used during an interaction with a mobile phone device, then input modalities associated with the mobile device, and modalities sensed by the headwear used to track eye movement (including a microphone) may be used to convey intent. For this form on interaction, exemplary priorities of inputs modalities might be (as listed in Table 1):

1. Touch control using the screen of the mobile device is based on voluntary movements and is generally purposeful. Thus, all touch commands are executed immediately.
2. Shaking of the mobile device can be unintentional or deliberate. Thus, a high stringency may be placed on the determination of device shaking and, if thresholds (e.g., amplitudes, frequency, duration, direction) are exceeded, detection is used as a form of input.

3. Along similar lines, head movements are generally ubiquitous. However, if large amplitude head movements matching pre-defined patterns (e.g., shaking the head "yes" or "no"), then such inputs may be acted upon immediately.
4. Next in priority are eye signals that can be selected and executed either independently of higher priority modalities or fully interspersed where, for example, a selection may be made using eye signals and an action or activation may be specified using touch control on the mobile device.
5. In this example, the lowest priority modality is audio input. In this case, voice recognition is only employed when activated by eye signals or other higher-priority interactions. In this way, the recording of voice or transcribing of voice to text can, for example, be limited to times when signaled by other modalities (e.g., during times when text messaging or e-mails are being composed).

In the example just described, the priorities of different modalities may be made dynamic. For example, if a key word or phrase is detected, then voice control priority may be raised to supersede eye signaling and/or other modalities. In this case, voice commands are executed as long as there is an audio stream. Eye signals may be interspersed during periods of silence, when considered a more convenient form of data entry and/or when voice control is turned off or reduced in priority via one or more identified key words or phrases, or by some other indication.

When more than one input modality is sensed at substantially the same time, the action that is associated with the modality that is lower in hierarchy may be delayed or not performed at all. Whether the lower priority action is eventually performed may also depend on the "purposefulness score" or measured confidence that the input was intended by the device user as describe above. This score may, for example, depend on how closely an eye movement saccades toward or follows an activation target.

Another consideration when using a multi-modal HMI is the difference in precision of locations specified by eye signals versus other modalities. Although eye movements can be extremely fast, there is a foundational limit on the angular resolution that a gaze location can be determined from eye tracking based on the sizes of the pupil entrance and fovea, as well as other optical considerations. This is in contrast to the controlled movements of, for example, a computer mouse where, although it may take some time to move one's arm, hand, and mouse over large distances, fine motor skills within a hand (along with appropriate scaling of mouse versus cursor movements) can be used to precisely specify locations on a display or within views of virtual- or real-world scenes.

Eye-Signal Augmented Multi-Modal Control ("Transport")

Recognizing such differences in precision and control, the eye-signalling user interface takes advantage of the multi-modal inputs by allowing eyes to "do what they do best" and taking into account the capabilities of other modalities. For example, scene exploration involving movements of the eye(s) that cover large areas of a display are best done by the eyes. If subsequently signalled by eye movements or if there is movement detected on a higher-precision device (e.g., computer mouse, trackball, digital pen), then input from the higher-precision device may assume control.

In fact, the movement sensitivity of the multi-modal device(s) may be set for high precision (versus range) since long range movements and searching are best performed by the eyes. Movement sensitivity of such devices may even be altered dynamically to maximize precision following the "transport" of attention to a specific region with one's eye(s).

The advantages of including eye signals with other multi-modal forms of control include:

1. speed, where the eyes can traverse large arc-distances faster than fingers, hands, arms or other body parts;
2. simplicity, where viewing or focusing on an object involved in enacting the intent of a device wearer is a natural part of most processes;
3. combating fatigue, where the movements of the eyes are essentially tireless compared with the biomechanics involved with moving finger joints, wrists, elbows, or other body parts; and
4. special functions such as when viewing feedback is an essential component of performing operations (e.g., drive simulator, high-resolution foveated rendering, etc.) and/or combining 2-dimensional (or 3-dimensional if vergence is included) locations viewed by the eye with multi-dimensional inputs from other devices.

As a specific example that embodies these advantages, consider the viewing of a display during a wide range of typical applications such as reading, browsing, directing the movement of information, editing, viewing images or video, drawing, composing, and so on. A purposeful movement of the eye(s) may be used to rapidly "transport" a pointer or other indicator (e.g., cursor) to a region-of-interest.

In addition to ease and rapidity, another advantage of this process is the lack of a need to "find" (i.e., visually search for) the current location of a pointer or cursor. In current day applications, visually "finding" a cursor can be time-consuming and distracting, particularly when hidden within a large body of text or images. Yet, when using, for example, a computer mouse, it is necessary to find the cursor in order to determine which directions movement should be made to steer toward a target location.

In exemplary embodiments, a pointer may be transported upon initiating a movement of a pointer in the general direction (i.e., within a predetermined directional range) toward the target location being viewed by the device wearer. This initial movement may be performed using a pointing device such as a cursor, joystick, trackball, digital pen, and the like. Once initiated, transport of the pointer to a new location (i.e., the target location indicated by user gaze) may occur rapidly (e.g., rapidly displaying video frames at intermediate locations) or instantaneously (e.g., with no intervening video frames). Alternatively, or in addition, a target location may be initiated within the eye signal language via a purposeful saccadic eye movement to, or away from, the target location.

Feedback indicating the new focal region may (if desired) be provided to the device wearer. This may be in the form of a visible cursor, pointer, highlighting of selectable object(s) within the region, change in background, addition of borders, and the like. Optionally, visual feedback may also involve the display of an object "slowing down" as it approaches the target location following a rapid transport.

Upon "transporting" to a focal region, another HMI device may seamlessly (i.e., without any specific command sequence) be used to control and activate selections. Devices such as touch pads, computer mice, joy sticks, and the like offer greater precision (compared with eye signals). This precision can be used to make selection over spatial ranges down to the visual acuity of the device wearer. In fact, the sensitivity of such devices may be tuned to favor small, precise movements since the devices are no longer required to cover large ranges. This tuning might be static or dynamic and adaptive. For instance, the sensitivity of a pointing device might become temporarily reduced (requiring larger physical movement to move a pointer a shorter distance) at the end of an eye-signal driven transport (such as a saccade) that might deposit a pointer near the desired target.

"Transport" may involve a wide range of displays including virtual reality, augmented reality, tablets, mobile phones, smart devices, projected images, display monitors, signage, and the like. "Transport" may be within a single display or across two or more display devices. Such displays may be controlled by one or more processing devices. The eye-tracking supporting "transport" of a pointer also might be enabled by one or more eye-tracking mechanisms positioned to support one or more displays on adjacent or non-adjacent display-enabled objects. Displays may even be "virtual" in the form of 3-D or holographic projections of objects in space. Transport within a visual field is not restricted to devices that operate in the same display mode. For example, transport of a pointer or other indication may appear seamless across the screen of a smart phone to a holographic projection or to a smart watch, TV, medical device screen, and/or other screens.

The ability to perform functions with simultaneous visual feedback (i.e., part of the fourth point above) is of particular value when using the eyes in combination with another input (e.g., computer mouse, touchpad, digital pen, etc.) to visualize and control 3-dimensional virtual objects within a 3-dimensional space. The 2-dimensional control found in most common computer input devices (e.g., mice, track balls, etc.) provides an insufficient number of degrees of freedom to control the viewing perspective and other aspects of control of a 3-dimensional object in space. This often leads to separating the various dimensions of control into specific controls such as pan horizontal, pan vertical, zoom, rotate horizontal, rotate vertical, and rotate axially.

It is much more natural (i.e., intuitive and rapid) to view a location on the surface of an object or a 3-dimensional position in space (by including vergence) using one's eyes and then manipulate a scene with the viewed point as a pivotal reference. For example, when viewing a pivot point and using a touch pad, a viewed object may be rotated horizontally (by sweeping a finger left or right), rotated vertically (by sweeping a finger up or down) or rotated axially (by a circular motion of 2 fingers). Purposefulness and subsequent activations may be unmistakably indicated by voluntary actions such as mouse clicks, screen touches, etc. Since the eyes are a central part (figuratively and literally) of the control mechanism, feedback within the region-of-interest to the eyes is instantaneous.

Not only can objects be viewed within a 3-dimensional world more naturally, objects may also be "edited" more naturally, quickly, and intuitively if the eyes are included as an input. If components are to be added, subtracted, or properties modified (e.g., color, surface texture, material(s) making up the region), then it is comfortable to simply look at the region and simultaneously make changes using other input modalities. Once again, changes in the size, shape, or properties of the region may then be visualized instantaneously and without looking away (e.g., using other visualization cues, screens or perspectives).

These multi-modal strategies may overcome ergonomic and HMI limitations that are often referred to as "Fitts' Law." This principle suggests that the time required to move to a target region is a function of the ratio between the distance to the target and the size of the target, where the size of the target is dictated by the accuracy of the target selection process. Eye movements can rapidly cover large distances. Multi-modal input with higher spatial resolution allows for smaller (and a greater number of) targets. Thus, the rate of selection (i.e., usually described in information theory in terms of bits per second) may be increased by multi-modal inputs that include eye signals.

An example that demonstrates the power of multi-modal input within the eye-signal language is the process of drawing (i.e., painting) an object or scene. In this case, eye movements may be used to specify the locations of objects to be acted upon. Such objects may even be moving or may appear only briefly. Rapidly saccading among different objects may be used to apply similar actions to a range of objects. Voice commands may be used to specify actions such as "copy," "paste," "erase," or "fill color." Head movements may be used to "nudge" the locations and/or rotation of virtual objects. A touch screen or a virtual screen (e.g., when using an augmented reality device) with a color palette displayed may be used with finger gestures to select colors.

Different input modes may be applied in different ways at different times. Multi-modal input combinations allow even complex functions such as drawing to be performed completely using wearable and/or mobile devices.

Eye-Signal Modulated Multi-Modal Control

In the embodiments described above, eye signals are used in conjunction with other forms of machine control by switching among two or more input mechanisms based on, for example, perceived purposefulness. In additional embodiments, multi-modal control may be greatly extended in a pleasing, sensual, and intuitive manner by allowing eye signals to "modulate" or enhance the functionality of other inputs. In this way, the strengths of different forms of multi-modal control may be exploited simultaneously.

Figure 20A:
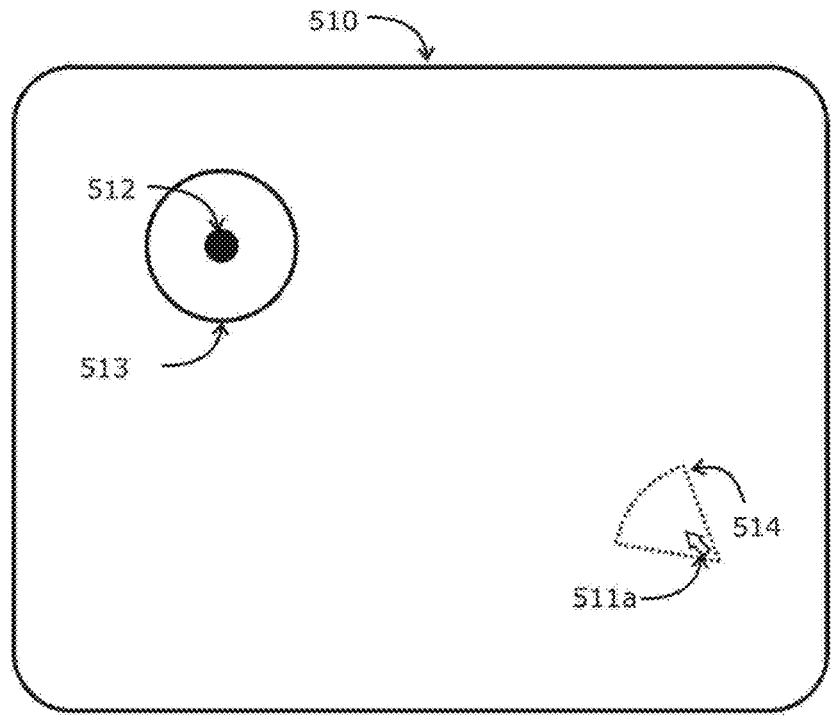
FIG. 20A illustrates the setup for rapid movement or "transport" of a pointer, cursor or selected location across a display using one's eyes.
Figure 20B:
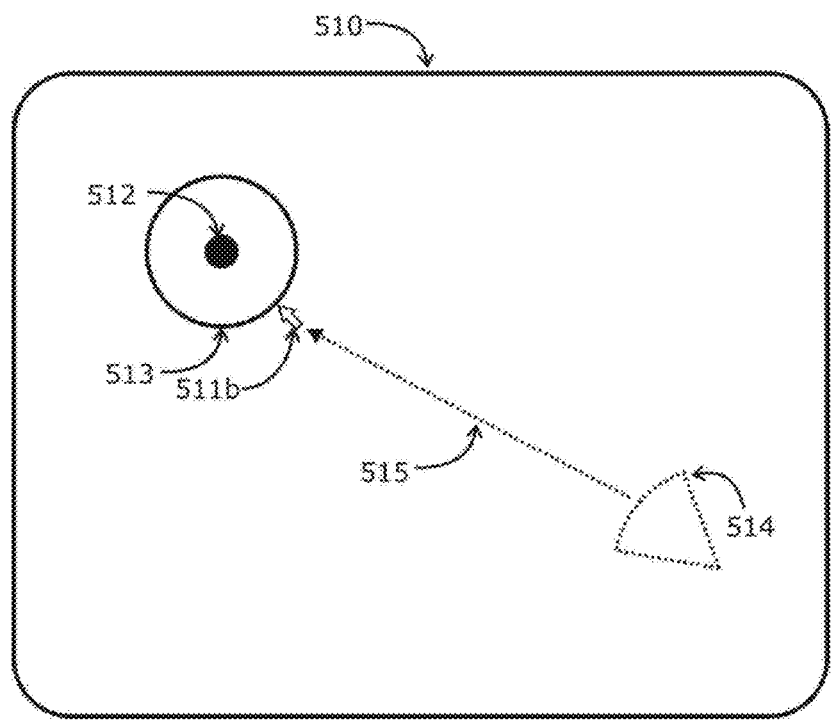
FIG. 20B illustrates the result of rapid movement or "transport" of a pointer, cursor or selected location across a display using one's eyes.

FIGS. 20A and 20B illustrate the steps included in a particularly useful example of eye signal-based modulation of multi-nodal movement of a cursor, pointer or other tracked location 511a (herein referred to as "pointer" for simplicity). The pointer (cursor, tracked location, etc.) may include a moveable symbolic representation (arrow, crosshair, icon, circle, etc.), be invisible at times, or provide visual feedback in other ways such as highlighting, changes in background, the appearance of borders, differences in color, changes in object size, and the like. In FIG. 20A, a user looks at a location 512 on a display depicted as a solid circle 510. Due to the uncertainty of gaze measurements, gaze location may be determined within a region 513 around the viewed object. A cursor or pointer 511a may be located elsewhere on the display.

A mouse, trackball, joystick, or other control device may be used to control the location of the cursor 511a. However, during modulated multi-modal control, when the pointer is moved generally in the direction of gaze 513, upon reaching a threshold distance within a continuous movement, the cursor 511a is made to move essentially instantaneously or "jump" 515 to the region of the gaze 513. This rapid relocation 515 of the pointer or other tracked location illustrated in FIG. 20B saves substantial time, and combats fatigue and/or other consequences of repeated manual manipulations of a mouse, trackball, joystick or other control device. In some cases, multiple hand movements including lifting the hand or device would have been required to traverse such large distances.

Modulated, multi-modal control of a pointer is herein referred to as a "transport" of the pointer. As shown in FIG. 20B, following an instantaneous transport, the pointer 511*b* falls generally within the foveal view of the user. In one embodiment, the pointer may re-appear moving along a general vector from the pointer's original location moving towards the user's gaze point, where movement of the pointing device controls the movement of the pointer upon reappearance. As noted earlier, the sensitivity of the pointing device might be reduced (for easier control) upon reappearance of the pointer, until the user directs the pointer to arrive at the desired location, and then acts by clicking or activating the pointing device. Thus, with little or no eye movement, the user sees the pointer that may subsequently be manipulated with high precision using one or more control devices. The net result is precision control of a pointer that moves and may be viewed generally in the control direction, but that skips past large areas within the display 510 with seemingly minimal effort.

This scheme simultaneously takes advantage of the ability of the eyes to move rapidly while accepting command inputs from other control devices that have greater precision. Transport may occur when threshold distances have been traversed, taking into account the direction of eye gaze relative to the pointer and/or the velocity of control device movement. Alternatively, the user may "gesture" with the control device that rapid movement toward a gaze location is desired. Gestures may include a rapid movement (i.e., exceeding a threshold velocity), shaking the device (e.g., back-and-forth), one or more patterns of movement (e.g., circular, movement in a fixed direction, etc.), and the like. Alternatively, a button press (or some other switch mechanism, including proximity sensing, sound or voice recognition, shaking one's head, blinking, etc.) may be used to indicate that a rapid movement of a pointer toward the gaze location is desired.

A device user may establish a set of preferences to establish which modes (i.e., gestures, movements, sound activation, etc.), thresholds (e.g., range of direction, distance traveled, etc.) and other variables (e.g., specific words uttered, blink duration, etc.) that cause the transport process to be performed. Additionally, if the pointer is in the vicinity of eye gaze (i.e., within a pre-defined separation between pointer and gaze locations), then transport is generally not advantageous and may automatically be disabled.

Alternatives to one or more instantaneous jumps in pointer position include altering the sensitivity or spatial "gain" of control devices. "Gain" refers to the relation between movement or signalling on the control device versus the (generally proportional) distance covered by a pointer. For example, the "gain" of a control device may be proportional to the separation between cursor location and gaze location. A higher gain (i.e., greater velocity of cursor movement for a given control movement or other input) allows larger distances within a display to be traversed more rapidly. Rapid movements of a pointer may also be shaped or profiled. For example, pointer movement may have acceleration and deceleration phases at each end of rapid movement with high velocity in between. These schemes smoothen pointer movements, reducing chances for distraction during transport.

Transport is not limited to a single display or even type of display. For example, a pointer may be "transported" from a location on a virtual reality headset to the display on a smart phone. Cross-platform transport is particularly valuable in applications that utilize wearable computing. For example, a display area might be limited on one device but available on another. Transporting allows rapid transitions to another device or even back-and-forth among devices. Since "transport" rapidly skips over spatial regions, the fact that there may be a physical gap separating one device from another does not affect the "transport" process. In fact, transport across such gaps feels intuitive.

Cross-platform transport may include augmented reality or virtual reality displays, smart phones, watches, tablet surfaces, laptop displays, display monitors, arrays of display monitors, signage, and the like. Such displays may be fixed or moveable. Pointer control is performed using processor platforms within the devices and cross-device communications protocols such as Bluetooth, Wi-Fi, and/or other forms of mobile communications. High rate telecommunications are essential to facilitate seamless (i.e., without significant delays) transport among devices.

Associations assigned to one or more pointers may also be transported with the pointer. For example, if a pointer is associated or "pinned" to an image or section of text, the information associated with that image or text may be transported to both the display and the processing capabilities of the additional device(s). Examples of associations that may be transported include images, video, text, numbers, files, applications, specific functions (i.e., that are performed by applications) and the like. This form of transport is foundational to many functions within the eye-signal language.

Figure 21A:
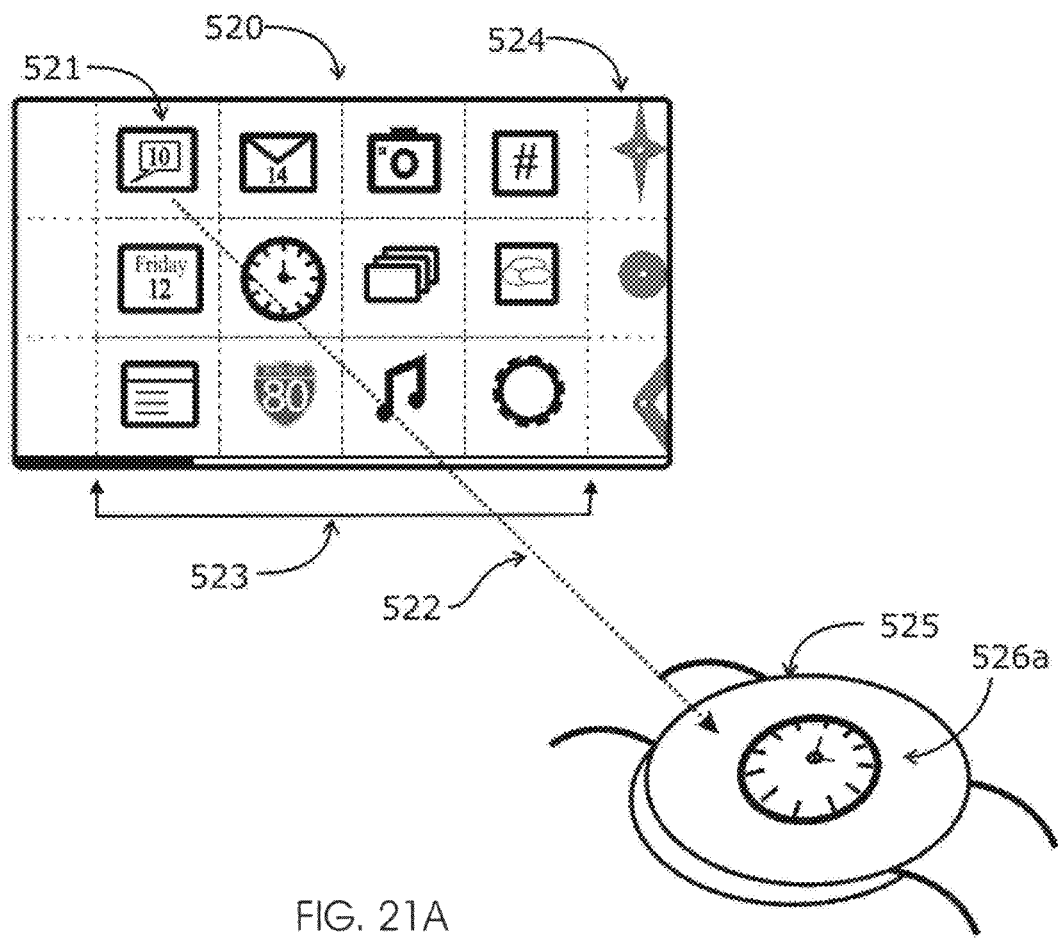
FIG. 21A illustrates the transport of a pointer and associated text function across separate display devices.
Figure 21B:
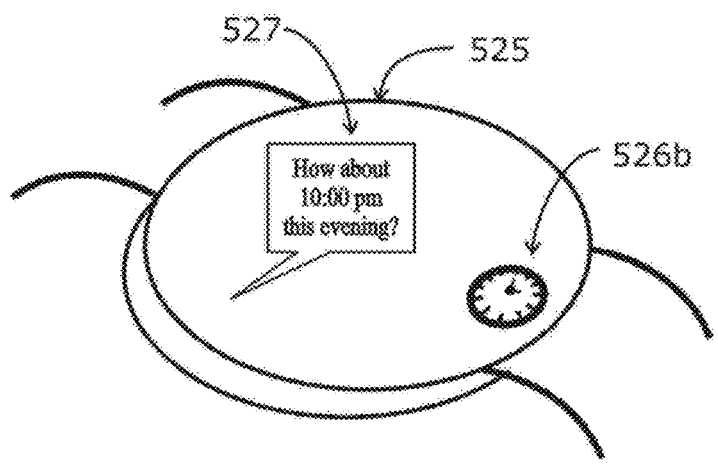
FIG. 21B illustrates the display of a smart watch following the transport of a text function.

FIGS. 21A and 21B illustrate the process of cross-platform eye-signalling that includes the "transport" of an associated function. FIG. 21A shows the display region 520 of a mobile device, such as a smart phone or tablet. The display region 520 contains icons 523 that represent various executable functions as well as a column 524 of activation icons that may be selected as a part of the eye-signal language. The display 520 may be manipulated using any combination of touch, eye signals, voice commands, and the like to perform desired actions.

If, for example, the user wishes to acquire text messages on a smart watch 525, then this process may be initiated by "transporting" an icon representing text messages 521 to the region of the watch 525. Any setup leading to the transport operation may be performed by any combination of eye signaling, touch screen, voice, or other input modalities. Transport is performed by one or more eye movements 522 (generally saccadic) that may traverse a spatial gap between devices. If desired, graphical feedback on the receiving device (i.e., the watch 525 in this case) may include an image or animated sequence of the transport process. This could, for example, be an icon sweeping in the direction of the eye movement(s) toward the center of the device 525 display, a thumbnail, or other graphic display.

As illustrated in FIG. 21B, once a function is "transported," eye signals and/or any other control mechanisms including touch and voice may be used to further perform desired actions. For example, existing displays (i.e., an easily readable clock 526*a* in the case of FIG. 21A) may be minimized 526*b*. Eye signals and/or other multi-modal inputs may also be used to manipulate the transported function. For example, as illustrated in FIG. 21B, text messages may be read.

Cross-platform transport allows the strengths of each device to be utilized. In the case illustrated in FIGS. 21A and 21B, the tablet 520 may have a much larger selection array (i.e., due to display space) to choose from. The smart watch is a more convenient reading device when on the go. In the case of multi-platform transport across a large array of displays (e.g., a grid of 5×5 displays arranged as a "wall), the transport process may even be used just to determine the location of a pointer.

Figure 22A:
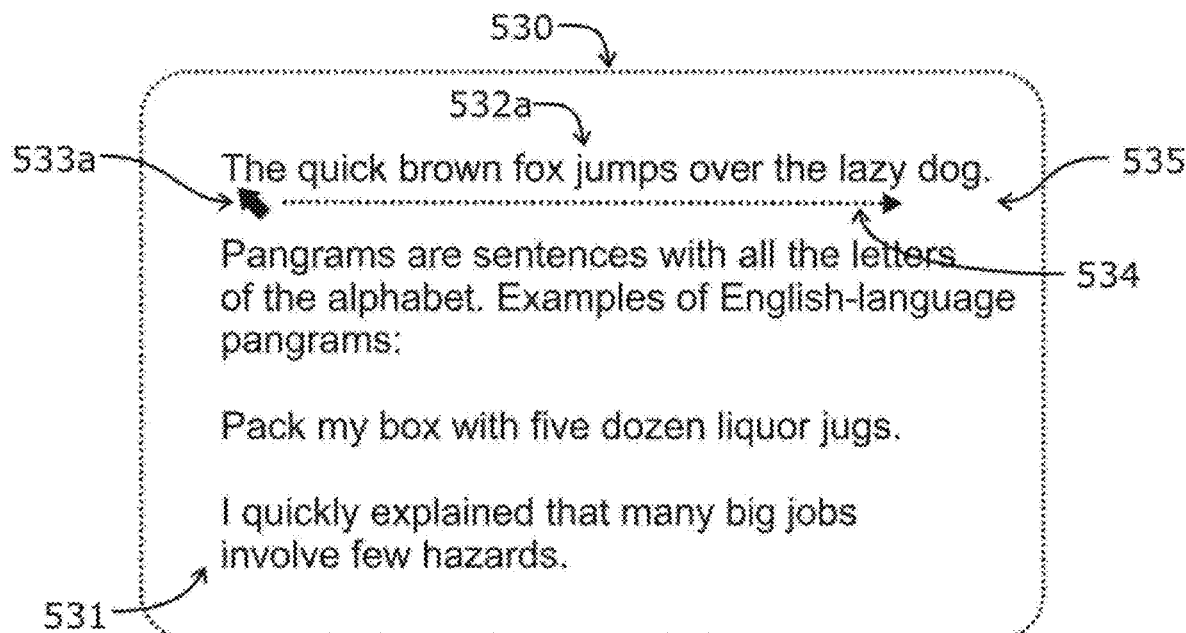
FIG. 22A shows an example of text during a "cut-and-paste" operation using eye transport and multi-modal inputs.
Figure 22B:
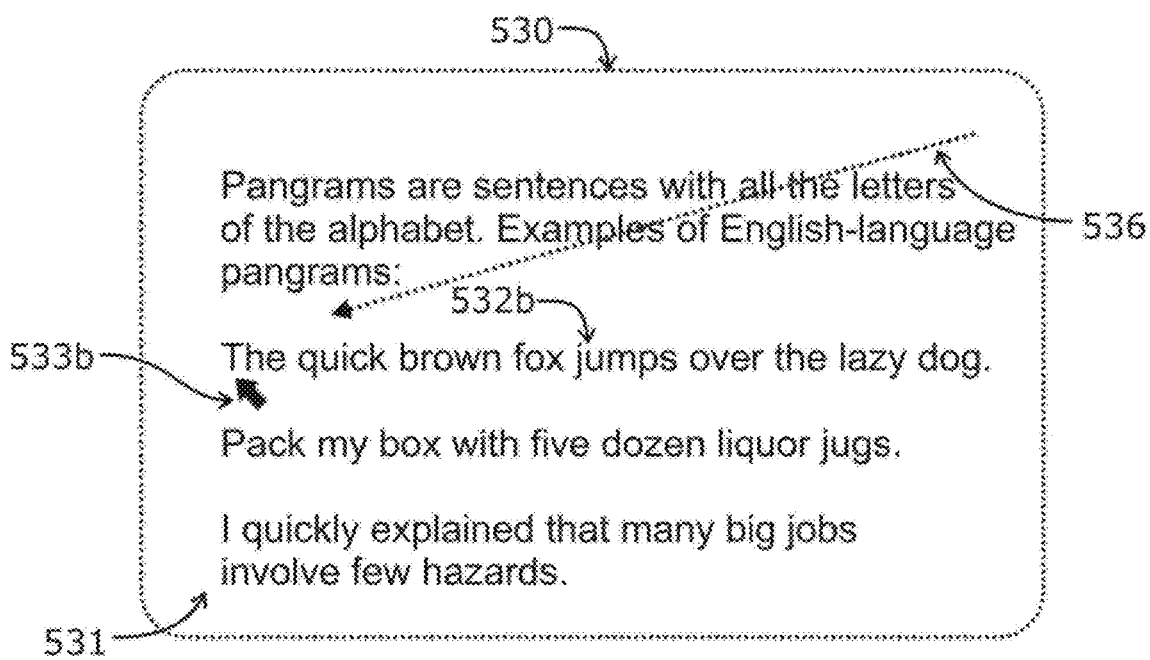
FIG. 22B shows an example of text following a "cut-and-paste" operation that includes eye-guided transport of a pointer.

FIGS. 22A and 22B further illustrate the advantages of "transporting" a pointer to specify a subset of text within a document using multi-modal techniques, and subsequently to "cut-and-paste" the specified subset into a different location within the document. As described above, in some applications, the selected text could be pasted to the display of a different device. FIG. 22A shows a display 530 containing a body of text 531. In this case, the user wishes to move the first sentence of text 532a to be included as a part of a list of pangram sentences further down in the document 531.

Using any combination of eye signals and multi-modal (e.g., mouse, track pad) inputs, a pointer 533a is first moved to the beginning of the sentence where the beginning of the selected text is specified (e.g., by a button press using a mouse). By next looking at the region near the end of the sentence 535 and continuing the process of using multi-modal (e.g., mouse, track pad) control, the position of the pointer is "transported" 534 toward the end of the sentence. Movement toward the gaze direction (i.e., end of the sentence 535) may be instantaneous or at a high velocity.

The pointer may (optionally) be shown to slow down as it approaches the gaze location. This produces a comfortable feeling that the pointer is responding seamlessly to input controls while dynamically changing its response characteristics. The net effect is the ability to precisely specify the end of the sentence (i.e., the end of the cut-and-paste region) with high precision while rapidly traversing large portions of the screen(s), saving considerable time and effort.

Once the end of the selected text 535 is specified, the user may then saccade 536 to the region where the text is to be moved, as shown in FIG. 22B. Once again, the "paste" portion of the operation may benefit from a "transport" process. A saccade with multi-modal input causes the pointer to rapidly be transported to the gaze region where it may subsequently be guided more precisely using multi-modal control(s) to specify the location 533b where the sentence 532b is to be inserted. A button press on the mouse or trackball, or some other user indication (e.g., voice command), completes the operation.

Within exemplary embodiments, the acquisition of eye-signals to implement a transport mechanism may be via detectors positioned on or near remote or wearable objects or devices (including head-mounted devices) or they may be implemented using one or more scene cameras in which one or more users' eyes may be visible.

Eye-Signal Feedback During Multi-Modal Control

Multi-modal control requires special considerations when providing visual selections and/or feedback to a device user. Providing all possible multi-modal selections at all times generates a confusing user interface experience.

An exemplary method to overcome such confusion involves foveal highlighting. In this embodiment, when gaze is directed toward a region, selectable items within this region (i.e., generally within the foveal view) may be indicated to the user. Indications may be in the form of color or intensity highlighting, foreground color variations, differing background, including a halo, outlining a region, modification of font(s), varying object size or some other form of signaling. Dynamic indication of selectable items within a foveal view avoids the situation of a display screen cluttered with a large number of selection items. It also provides a feedback to the user regarding the region being viewed and (to a novice user) which items are selectable.

It is also important to carefully control and sequence the removal of selection indications. For terminal selections (i.e., one in which no further selection is necessary to perform an action), the highlighting (or other indications) of non-selected items may be removed immediately in order to proceed with the selected action.

Using multi-modal controls, the initial movement of an inherently purposeful input (see Table 1) such as a mouse or trackball, may be used as a signal that eye signals are not to be used for a particular selection, allowing eye-signal menus to be withdrawn. Algorithmically, one method to conveniently implement the inclusion and withdrawal of eye-signal display components involves devoting an image "layer" to such components where the transparency of such a layer may be controlled. When needed, the display-sized layer (or region(s) within the layer) may be made less transparent (i.e., more opaque) to reveal eye-signal elements. Optionally, the reveal of eye-signal elements may be performed gradually as a "fade-on" in order reduce the tendency to attract attention. When not needed, one or more regions of the eye-signal layer may be removed by making one or more regions within the layer more transparent.

Eye-Signal Based Reading Music

A specific application of the eye-signalling language involves the reading, playing, and/or viewing of music. In the physical or touch-screen world, a musician must stop playing at the end of a page of music for a brief moment to turn the page, either with a physical turn or a screen swipe. This may cause undesirable pauses during the playing, disrupting the continuity and flow of the music.

One embodiment integrates eye signalling and tracking information to determine a musician's place in the music and enables smart scrolling through the music to avoid those disruptions. With full-length pages of music including many lines on a single page, a page turn is executed once the musician reaches the end of a page, optionally including a gradual transition based on eye-speed to ensure that the musician is able to finish the page completely and move onto the next page.

Figure 23:
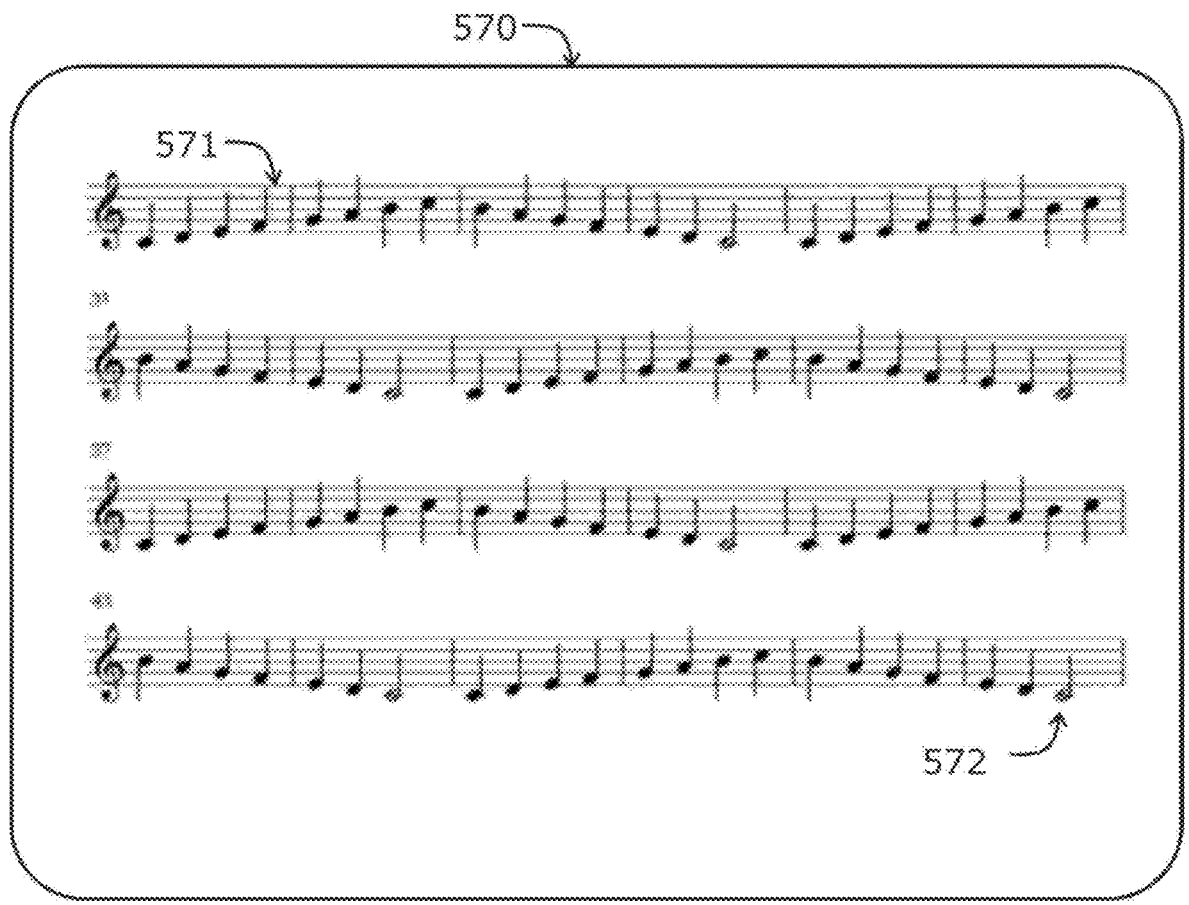
FIG. 23 illustrates the controlled display of a musical score based on eye signalling.

FIG. 23 shows an example of a musical score 571 within a display 570. When the gaze (not necessarily the playing position) of the musician reaches the region of the final note on the page 572, a page-turn occurs. Based on user preference, page-turn functionality may be in a "continuous" line scrolling mode, a more traditional page-turning mode or by scrolling or flipping some portion or all of a page or display.

Advantages of this latter method include the fact that existing sheet music may simply be scanned and easily ported to an approach that includes eye-tracking. Present-day musicians are also familiar with this format. Using this approach, it is important to control the timing of the scroll to make sure that no information is lost during play.

A data base that contains the musical score may contain preferred break points (i.e., locations within a score where display changes are preferred) where modifications in the display may occur. Alternatively or in addition, one or more break points may be assigned within a predetermined distance from the end (or any other reference location) of the displayed score.

Figure 24:
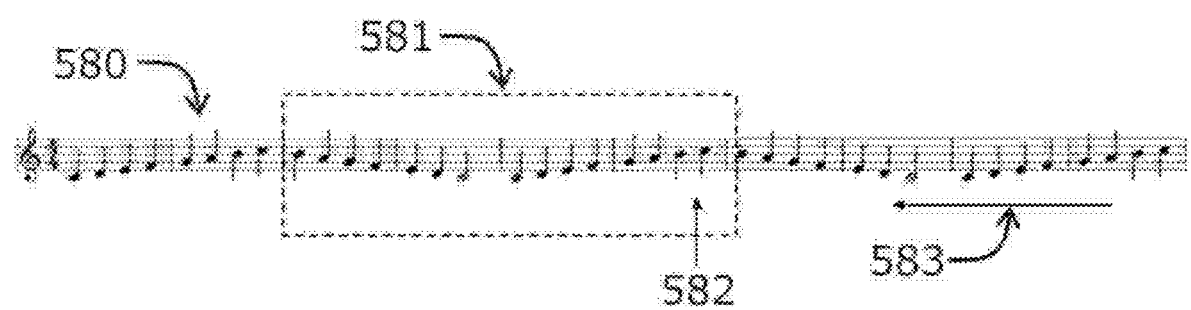
FIG. 24 shows an example in which a musical score is displayed as an eye-signal controlled, single strip.

In an alternative scrolling method, the musical score is formatted into lines that are concatenated into a single horizontal "strip." FIG. 24 shows an example of a portion of a musical score strip 580 in which a segment or "window" 581 is displayed to the musician. When the user's gaze position 582 nears the end of the displayed region of the score, the score is advanced 583 (i.e., left-to-right) within the viewing window. A musician may then continuously scroll through the entire piece on a single line across a screen with scrolling speed determined by the user's gaze, potentially with additional feedback based on the tempo of the piece, eye signals, and/or auditory feedback. Despite the effort that may be required to reformat existing sheet music scans, this method may be preferred by some, particularly in situations where small displays (including virtual, mixed or augmented reality displays) are desired. For some users, continuously-paced scrolling of a single line may be more comfortable and/or intuitive.

Intelligent page scrolling may also depend on eye behaviors, often reflective of the skill level of a musician. A musician's eye typically scans a few measures ahead of the notes being playing. This varies by skill level, where a novice musician may only look at the notes that are immediately going to be played, while an expert musician may read several measures ahead of what is being played as a form of advance preparation. This is also related to a musician's skill level in what is known as "sight-reading," the ability to play a piece accurately the first time reading it without any practice. An expert musician is able to read many measures ahead, giving enough time to process what is about to occur and move lips, arms, fingers, chest, and/or other body parts in the proper rhythm to accurately play the music.

Figure 25A:
FIG. 25A shows a musical score in which the difference between playing location and viewing locations is measured.
Figure 25B:
FIG. 25B illustrates a musical score in which the difference between playing location and viewing location is extended following feedback and/or training.

In exemplary embodiments, eye-signal based control of the display of a score may be used to grade and/or train a musician to sight-read increasingly complicated music based on audio and gaze position. As illustrated in FIGS. 25A and 25B, grading and feedback compare the differences between the note(s) being played and the notes being read by the musician.

FIG. 25A shows a score 590 in which differences between the playing location 591a and gaze location 592a (ahead of the playing location) are measured. Playing location may be based on sensing notes played on the instrument itself or by audio recognition of the sounds generated by the instrument sensed using a microphone. FIG. 25B shows the same score as in FIG. 25A following training and/or feedback in which the separation between the playing location 591b and gaze location 592b is extended.

During a performance, the general eye-signal language may also be used to control a variety of functions including selection of scores (e.g., from an archive of different scores), set user preferences, communicate silently with other musicians or a conductor, respond to requests from others or indicate (i.e., in real time) sections of play that might need to be re-recorded. In the case of electronically controlled instruments, eye signals may be used to partially (e.g., setup parameters) or fully control one or more instruments. Such actions may be performed discretely using the general structure and selection sequences of the eye-signal language.

Eye-Signal Language Scratchpad

A ubiquitous function or task utilized in many computing device operating systems is the transfer of blocks of information from one location or application to another location or application. Forms of information may include characters, words or groups of words, numbers or groups of numbers, pictures, drawings, audio files, video, icons representing functions or applications, folders or other representations of clusters of information, and the like. An exemplary method that enables the eye-signal language to direct and transfer such information is the use of a "scratchpad." A "scratchpad" serves multiple functions during eye-signalling processes. A scratchpad:

1. allows data to be assembled for transfer or storage,
2. allows subsets of data to be isolated,
3. if needed, converts data from one form to another (e.g., speech to text),
4. operates as an archival repository for storage and retrieval of deposited data sets, and
5. serves as a central location to indicate and activate transfer processes.

Sources of information may include data generated by applications such as word processors, spreadsheets, picture and video viewers, text receivers, mail receivers, web browsers, and the like. Sources may also include the outputs of devices such as cameras, microphones, GPS, clocks, accelerometers, sensors, and the like. Destinations of information may include word processors, spreadsheet elements, picture and video editors, text senders, mail servers, selections and/or responses within web pages, and the like.

Figure 26:
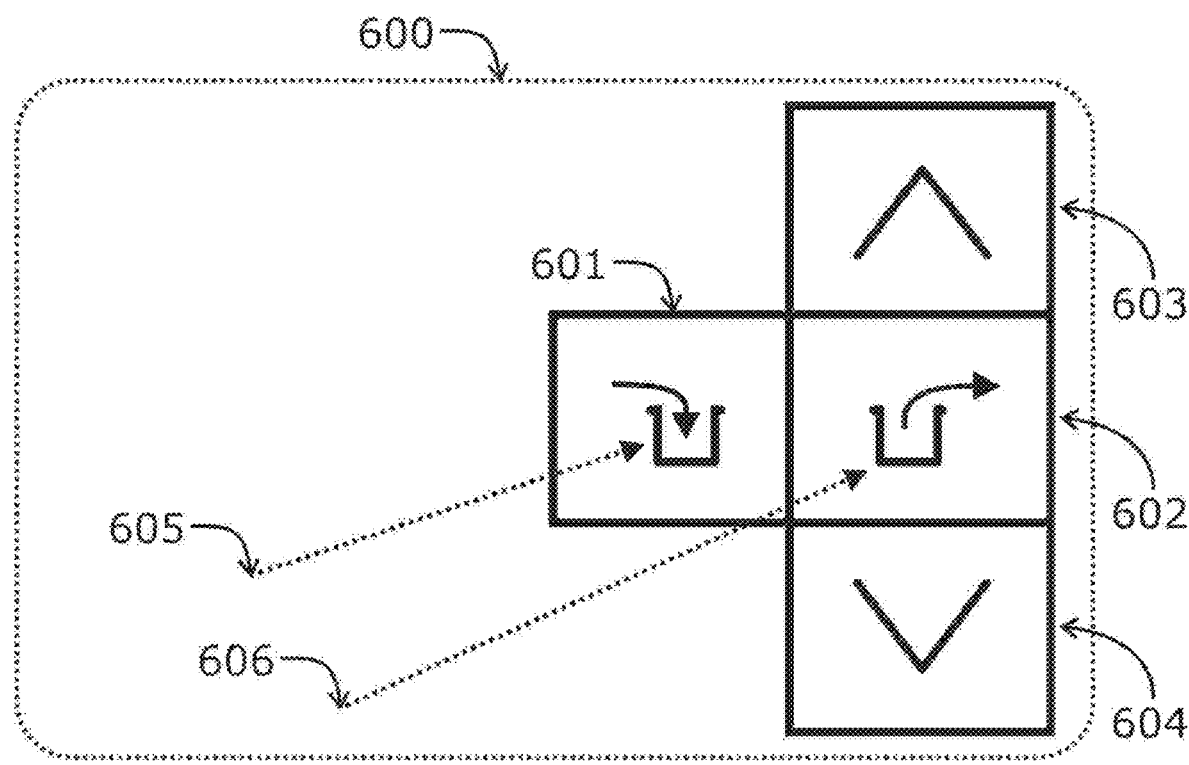
FIG. 26 is an example of graphics associated with an eye-signal controlled scratchpad for information transfer.

FIG. 26 is an exemplary display layout 600 of an eye-signal scratchpad control area. The area includes:

1. a region in which information may be deposited into the scratchpad using eye signals 601,
2. a region from which information may be withdrawn from the scratchpad using eye signals 602,
3. a region to "scroll up" to isolate previously stored entries within the scratchpad 603, and
4. a region to scroll down (i.e., forward, to more recent entries) to isolate previously stored entries within the scratchpad 604.

The process of depositing information into the scratchpad includes viewing an object and subsequently saccading from the region of the object 605 to the "deposit object" region of the display 601. As described above, deposited information may include many different forms. In addition, objects may be extracted from virtual displays 600 or the real world where object recognition may be used to register the identity of the object and/or an image of the object may be stored.

A thumbnail of the newly stored object is placed in both the "in" area 601 of the scratchpad as well as the "out" area 602. Storage of items in the "in" area 601 is simply to remind the device user of information that has recently been stored, since content cannot be directly extracted from the "in" region. The retrieval of information is performed using the "out" area 602.

The process of retrieving information from the scratchpad includes the following steps:

1. A user may optionally scroll up 603 and/or down 604 to isolate an archived representation (e.g., thumbnail) of stored information. Scrolling includes performing saccadic movements from the "out" region 602 to either the "scroll up" region 603 or the "scroll down" region 604 and then returning to the "out" region 602. If the user dwells on either the "up" 603 or "down" 604 region, then repeated scrolling may occur since the adjacent "out" region is within the foveal view and may be seen by the user.
2. For convenience, an item that has been isolated from the scratchpad and is no longer needed, may be deleted from the scratchpad. This may be performed, for example, by a saccadic eye movement from the "up" scroll region 603 to the "down" scroll region 604 or vice versa, bypassing the "out" region 602. Once deleted, the item displayed in the "out" region may be the next item "up" or "down" in the scratchpad list, depending on which region 603, 604 the delete operation was initiated from.
3. Once a desired retrieval item has been isolated from the scratchpad, a user may then explore the display region where the item is to be inserted. This can, for example, be a position within a word processor or text message, a cell within a spreadsheet, a location within a web page, and the like. Saccading from the desired insertion location 606 to the "out" region 602 completes the retrieval.

Alternatively, and in addition to the "scrolling" method described above to isolate scratchpad items to transfer, the scratchpad may be "searched." This is particularly powerful using voice input; however, text or an image that has been isolated on a display, or an image/audio captured by a device may be used as sources for search comparisons. If necessary, conversion may be performed to enable searching within the scratchpad. For example, speech-to-text (or other representation) may be performed (i.e., unless audio records are being directly compared within the scratchpad) to enable multi-modal searches. Along similar lines, object identification and/or voice recognition may be used to identify items within the scratchpad to facilitate searching. A closest match of items within the scratchpad may be placed in the "out" region 602 and readied for transfer.

Dwelling with the eye(s) on the "scroll up" region 603 may be used to alert the device of, for example, voice input for searching. Dwelling on the "scroll up" 603 may also be used to signify searching the subset of scratchpad information that is prior to (i.e., deposited into the scratchpad earlier than) the information currently in the "out" region 602. Conversely, dwelling on the "scroll down" region 604 may alert the device of voice input and signify searching within the subset of stored items that were deposited after the item currently displayed in the "out" region 602. Dwelling on the "out" region 602 may be used to signify searching the entire contents of the scratchpad. This is one of the few instances within the eye-signal language where a "dwell" operation of the user's eye is appropriate so that the result(s) of a search within the scratchpad may be perceived.

In FIG. 26, the icons illustrated in the scratchpad storage 601 and retrieval 602 areas are exemplary place-holders during situations when the scratchpad is empty. Once there is content in either the "in" 601 or "out" scratchpad then thumbnails of the scratchpad contents are shown in corresponding regions.

Eye-Signal Control of Drones and Other Remote Vehicles

The eye-signal language is particularly useful in situations where locations and/or directions need to be specified rapidly and/or repeatedly, and/or when it is desirable to reduce or eliminate controls formed using other body parts, such as hand-controlled joysticks or computer mice. The flying of a drone (i.e., unmanned aerial vehicle) or other remote-controlled vehicle (e.g., boat, submarine) with one or more on-board cameras and/or telemetry is such an example.

A primary function when flying such a vehicle is specifying "where to fly" (or "where to go" in the case of terrestrial, marine or underwater vehicles). In most cases, this is performed in a continuous or periodic manner in order to overcome obstacles, avoid "no-fly" areas, take into account wind, currents, and other environmental conditions, and other factors.

A particularly intuitive and useful way to specify a 3-dimensional flight direction is to "look at" a target location/direction from the perspective of the drone or vehicle. Real-time telemetry and views from one or more cameras mounted on the drone or vehicle may be viewed on AR, VR, mixed reality headset, tablet, smart phone, smart watch, laptop, or desktop computer monitor(s). Various selections for eye-signal control may be superimposed on or around live video images. Vehicle control is enacted using the eye-signal language optionally aided by other (e.g., manual, voice) controls.

As with other components of the eye-signalling language, it is important to distinguish exploratory eye movements that are used ubiquitously to examine the environment, from "purposeful" eye movements that convey intent in the control of the drone or vehicle. By making purposeful saccadic eye movement(s) from target(s) to an activation location or sequence of locations within a display, target direction (and distance, using other instrumentation such as GPS) may be specified. Such destination targets may be stationary or moving (and subsequently tracked by the vehicle). One or more targets may become hidden at different points in time.

In order to attain partial or completely hands-free control, eye signals may also be used to control other aspects of vehicle movement. This may include, for example, forward speed, throttle, the size and orientation of control surfaces, propeller pitch, and so on. The eye signal language may also be used to initiate other tasks such as "return home," drop payload, hover stationary, initiate warning or informative signals, etc. Eye signals may also be used to query status indicators via menus, to specify or modify flight plans, to view and mark way-points, and the like.

Gaze Tracking and Eye-Signaling while Driving a Vehicle

In further exemplary embodiments, gaze control and elements of the eye-signal language must be given special consideration when used while driving a vehicle. Vehicles may include cars, trucks, heavy machinery, boats, snow mobiles, all-terrain vehicles, and the like. Special considerations arise because, in addition to eye signaling, a driver's eyes must be used to survey the driving environment with only brief interruptions in order to avoid potentially life-threatening situations.

Agencies involved in driver safety recommend that, under appropriate conditions, any time looking away from the vehicle path ahead does not exceed 1.6 to 2.0 seconds (with some variations in recommendations among agencies). Most drivers actually report a sense of being uncomfortable after looking away for about two (2) seconds. As a benchmark, the average time taken to adjust a traditional (e.g., not associated with a heads-up display) radio is 1.6 seconds. However, wide variations of such times are reported.

During the driving process, incorporation of where the driver is looking may produce a number of benefits for both comfort and safety: 1) Displays and other forms of driver information may be modified based on whether, and for how long, the driver has viewed the path ahead. Display devices may dynamically adapt to driving conditions (e.g., highway versus parking lot) and the behavior of the driver in order to avoid attracting attention at inappropriate times and/or to reduce cognitive load. 2) The timing of eye-signal controls and display feedback may be designed to encourage the driver to look back to the path ahead after a predetermined time. 3) If an emergency situation is sensed by the vehicle (e.g., that might trigger automatic braking) and the driver is not viewing in the direction of the situation, steps may be taken to direct the gaze of the driver.

The rapidity of selection and activation within the eye-signal language may be exploited to promote safe driving using virtual (e.g., console displays, augmented reality eye-wear, heads-up displays, and the like), particularly those with larger formats. As previously described, saccades produced by the eyes are the most rapid movements in the human body. A saccade to a location on a console display (often memory-guided) followed by one or more saccades to perform selection and/or activation may generally be performed in less time than, for example, a hand movement to perform a gesture or activation of a location on a touch-sensitive screen or button to perform the same function. Using eye signaling, it may even be possible to execute all driving controls without ever removing a hand from the steering wheel.

Within the particular case of driving, context-sensitive and streamlined menu selection may be employed to further reduce times associated with viewing away from the driving process. As an example of the former, virtual "buttons" to control a radio function may not be available directly during the display of a map used for navigation. As an example of the latter, both function selection and activation may occur using a single saccade to an activation location such as one of the four (4) corners of a display.

By contrast, in a non-driving application, interactions with an image or map may involve selections from a large number of operations such as zoom in, zoom out, pan, select object, identify object, cut, paste, and the like. Within the eye-signal language, selection from such a large number of operations would generally require at least two (2) saccadic eye movements (e.g., a so-called "reveal" operation), i.e., one to produce a menu and one to select an action from that menu.

However, in a driving application when viewing a map, selections may be restricted, for example, to saccadic eye movements toward one of the four (4) corners of the screen. Actions associated with the four corners may be:
1. zoom in (centered upon the location just viewed on the map),
2. zoom out,
3. pan (in the direction just viewed on the map), and
4. escape from the map display (e.g., returning to a higher-level menu).

Rapid selection and activation of a context-sensitive, restricted set of potential functions reduces the times of glances away from the driving process as well as the cognitive load of processes not directly associated with driving. Selections may also be restricted in a manner that forces a driver to view the path ahead before continuing, promoting a strategy of brief glances away from the driving path. When viewing the path ahead, strategies to change displays in manners that avoid attracting attention (e.g., during periods of saccadic and/or blink blindness, gradually changing luminance and/or color [exploiting change blindness], etc.), as previously described, may further increase driver safety. Knowledge of a driver's gaze direction may also be used to alter the timing and content of information presented to the driver in order to further promote safe driving behavior.

During the driving process, a driver may briefly look away from the process of driving to a selectable object. The selectable object may be a virtual object such as a location displayed on a map projected onto a console or heads-up display in the interior of the vehicle, or a physical object such as a knob that controls lighting. In an alternative embodiment for activation using eye-signaling on a display, once the selectable object is identified as being viewed by the driver, driver gaze may then return attention to the process of driving. At that time, the driver may activate a function associated with the just viewed gaze location. Activation may be performed in a number of ways including a voice command (i.e., determined via voice recognition of one or more keywords), switch (e.g., located on the steering wheel), head nod, or similar indication. Different drivers may prefer different activation modes. Different activation modes may also be used at different times.

Different modes of activation (saccadic eye movement to one or more activation locations, manual button press, voice, etc.) may be used to activate different controls. Examples of driver controls include the brightening or dimming of lighting (by gazing at a lighting knob), the raising or lowering of windows (by viewing window toggle controls), the selection of a radio station (by viewing the radio), the advancing of a song or podcast on a playlist (by viewing the audio player), raising or lowering audio volume (by briefly gazing at the volume control knob) and other audio characteristics, adjusting the directions and volume of air flow (by viewing appropriate knobs and/or indicators), controlling regional temperature (by viewing indicators,) adjusting mirror position (by viewing mirror position controls), altering seating controls (by viewing appropriate buttons), adjusting wiper speed (by viewing wiper controls), and the like. In most cases, both eye-signaling and manual (traditional) controls may be made available to the driver.

Encouraging a driver to return attention to the path ahead promotes safe driving by reducing times associated with non-driving functions. Activation may occur over a time that is within the short-term or working visual memory of the driver, further reducing cognitive load for processes that are not directly associated with the guiding of the vehicle. Complex operations, such as finding and specifying a destination location on a map, may be performed as a series of short glances away from the process of driving in which activations occur when attention is returned to the process of driving following each glance. Such series of brief glances are considered optimum for driving safety. In addition, if a display is altered as a result of an activation (e.g., a pan or zoom function performed on a map) changes to the display may be performed while the driver is not directly looking at the display, further reducing visual processing associated with viewing a dynamically changing display.

Different strategies may be made available to the driver when different display and interactive devices are available. For example, if both AR display and a console display are available, then a confined amount of information might be displayed on the AR device for brief periods. However, when performing more complex operations, such as navigation, it may be safer to use the console display aided by eye signaling. Communication may occur directly between the AR device and the processor controlling the console. Alternatively or in addition, a scene camera on the AR device may be used view options displayed on the console and help guide user selections via eye interaction.

The ability to glance at controls over the full frontal view of the driver also promotes consistent and safe driving behaviors. With minimal driving experience, glances are governed by memory-guided head and eye movements to known locations (with large angular tolerances) within a vehicle. By contrast, if large amounts of information were projected onto a small space, such as a small heads-up display, it becomes more difficult to locate and identify a particular control within such a confined space. This situation is made worse if the display projects different sets of information at different times. A driver may need to wait or perform other look-up operations to be able to interact with a desired display menu.

Associating Identified Documents and Device Users

Methods to identify a device wearer based on iris identification and other measures are described in Systems and Methods for Discerning Eye Signals and Continuous Biometric Identification, application Ser. No. 14/708,241, filed May 9, 2015, the entire disclosure of which is expressly incorporated by reference herein. Many secure applications require an association between a document, form, agreement or other data set, and an identified device wearer. These applications encompass a wide range of areas including legal, financial, licensing, security, informed consent, medical and the like.

In exemplary embodiments, real (i.e., physical) or virtual (i.e., viewed on a display) documents may be viewed by a device wearer, where the identity of the document may be verified using one or more scene cameras that view the environment of the device wearer. Document identification may be based on content, embedded QR code(s), embedded barcode(s), recognition of a signature, or the location and identification of other security features. The recognition of a signature may be performed using image recognition techniques and/or machine learning techniques including classification by so-called deep-learning neural networks.

Once a document has been identified, it may be electronically tagged as being viewed by a device wearer, identified on the basis of iris recognition (e.g., an iriscode) and/or other measures. Optionally, modifications may be made to electronic representation(s) of such document(s) using the eye signal language or other methods, such as the use of a keyboard or voice recognition. Modifications may include the insertion of a "signature" based on the confirmed identity of the device wearer. This signature may be in a form (e.g., an overlaid image) typically associated with hand-written document or an "electronic signature" (i.e., numeric code) that is uniquely associated with an individual. Alternatively or in addition, a barcode or QR code may be appended to the document to indicate that it has be viewed by the identified user.

Ultimately, a signature may include metadata describing a subset or complete set of gaze data of the user that may include one or more of eye-signalling, time-stamped gaze duration, gaze sequence mapping, pupil dilation, and other biometric signals that occur as a user visually read or scanned the document. Such information may be valuable for informed consent confirmation, and may also be a method for, not only validating perusal of information, but providing an indication of comprehension and/or even agreement with contractual language.

Such "signed" and/or modified documents may then be exchanged in a manner equivalent to a physical exchange of document. The time, date, and location (e.g., determined from a global positioning system) of signing may also be embedded within the document(s).

Virtual Display "Wall"

Virtual reality, augmented reality, mixed reality, and other head-mounted display systems provide a mechanism to view virtual display "walls" or extended desktops. These walls or effective surfaces include large virtual display areas where one region of the "wall" is projected so as to be viewed by a device wearer at any time. However, all regions of the virtual display that may completely surround a device user are maintained programmatically for viewing and interaction. Virtual walls or surfaces may be of any size, perceived distance(s) from the device wearer, shape, or curvature. Applications include enhanced workstation environments, interactive displays and entertainment.

Virtual display walls are ideally suited for gaze interactions and the eye-signal language where users may select from different interaction modes based on user preferences and/or particular applications. The region that is projected into the visual field of the device wearer can be controlled based on head movements, gaze direction of the device wearer, and/or eye-signal commands.

Figure 27:
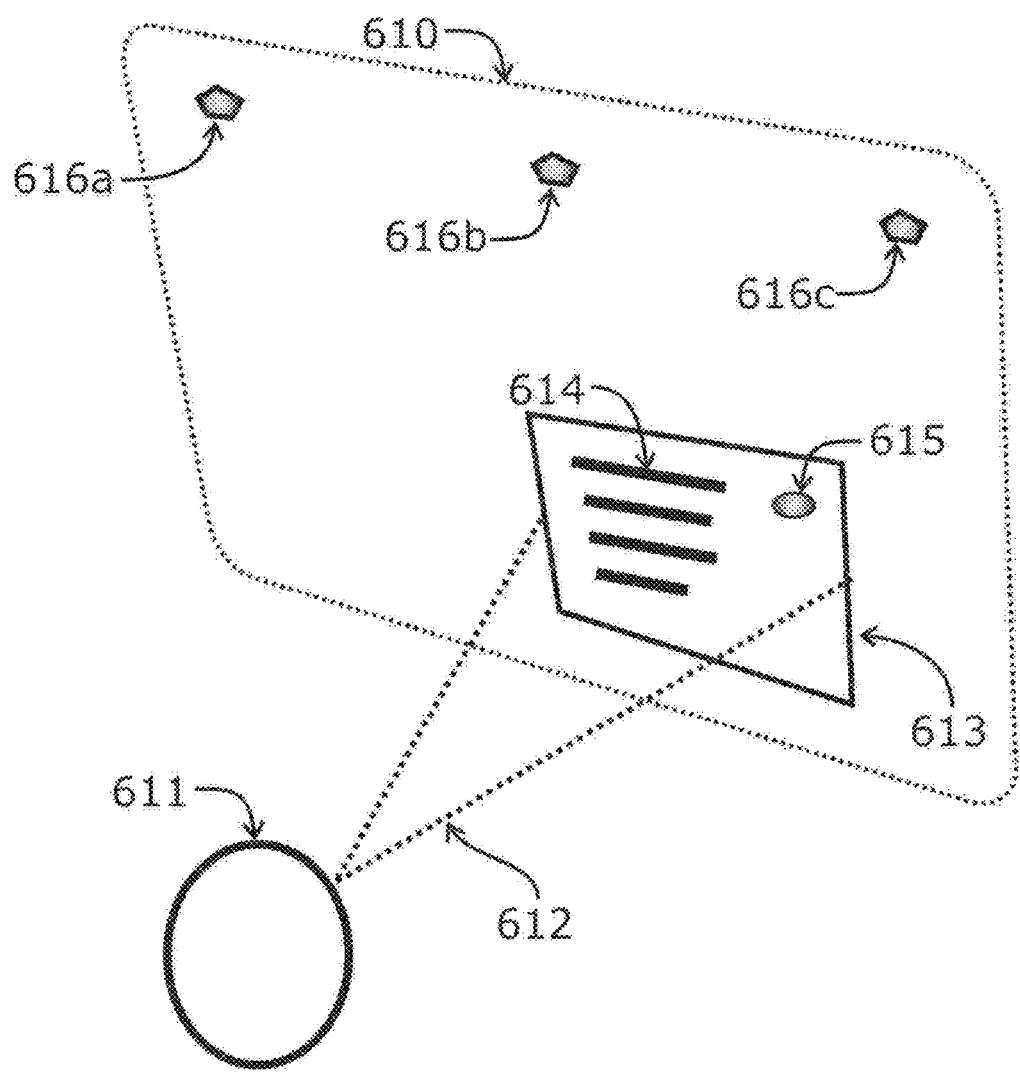
FIG. 27 illustrates the control of a virtual display "wall" using eye signals.

FIG. 27 illustrates device user 611 interactions with a typical virtual wall or display 610. Within the field-of-view (represented by dashed lines) 612 of a device user 611, a region 613 of the overall virtual wall 610 is projected onto a display device (e.g., augmented reality or virtual reality headset) for viewing. This projected region 613 may be of any size and location within the virtual display region 610 where, in some cases, the size can be made to vary automatically, depending on a particular application.

Within the art (e.g., devices manufactured by Oculus VR, USA), control of the viewable region 613 of an overall virtual space 610 is typically performed based on head movements. For example, a head movement causes the displayed image to scroll in the direction of the movement over an arc distance that makes stationary objects in the virtual environment appear stationary. However, in exemplary embodiments, by also considering gaze dynamics, an improved control of the viewable region can be attained. For example, when vestibulo-ocular eye movements are detected, where the eye continues to view a location while the head moves, the viewable region may remain stationary. This avoids excessive display movement for a device user at times when there is an object of interest.

On the other hand, in exemplary embodiments when there is head movement that is associated with non-vestibulo-ocular eye movement, the device user is generally purposefully changing the object(s) of focus. In this case, scene movement is anticipated. One very pleasing and "natural" method to move a scene is to perform the display change during the period of saccadic suppression (described above). In this way, the scene is changed at times when the device user is functionally blind, reducing distraction associated with scene movements. Scene movement performed during periods of saccadic suppression may be classified as a "biologically inspired" technique since the major physiological purpose of blink suppression is to reduce constant perceived movements.

Within the eye signal language, there is a choice as to how to position and reveal eye-selectable regions of a display. In the first example, termed "screen lock," selectable regions are located at fixed positions within the virtual display area 610. For convenience, a particular selectable region may be repeated at various locations. This is illustrated in FIG. 27 where three (3) identical activation targets 616a, 616b, 616c are repeated along the upper portion of the virtual display area 610. In some cases, a selectable area may apply only to one region of a virtual display. In this instance, the selectable region may be made available, based on context, only in one location as a "screen locked" icon or other symbol within this region.

In an alternative embodiment within the eye-signal language, eye-selectable regions (e.g., activation targets) may be positioned at fixed locations within the field-of-view of the device wearer. In this scheme, termed "head lock," icons or other symbols that guide a user's eye toward a selectable region are superimposed on the virtual display and move about as the viewable region 613 is moved within the virtual display area 610 (i.e., by movement of the user's head.

As described above, the head-controlled positioning of objects may optionally be controlled only by those head movements that are determined not to be vestibulo-ocular. In other words, it is possible to move one's head during eye signalling without moving the locations of projected/displayed objects by looking at a particular object and moving one's head (i.e., generating a vestibulo-ocular eye movement).

In additional embodiments, it is possible to use both "screen lock" and "head lock" schemes simultaneously for eye interaction. For example, selectable regions that may be associated with the content of a virtual display 610 (e.g., selections associated with editing text) may be positioned in a "screen locked" mode near the text content. Simultaneously, selectable regions that are associated, for example, with more general navigation and control functions (e.g., to launch new applications) may be made always available in a "head lock" mode. This makes more general navigation functions easier to find (i.e., promoting memory-guided saccades).

Display of icons or other symbols associated both "screen lock" or "head lock" modes may be implemented by controlling the transparency of icons and/or symbols. Faint icons may allow the content of the display to be examined without excess clutter. Opacity may be increased (i.e., transparency decreased) as warranted by context, for example, with increasing time from a previous activation and/or the experience level of a device user.

Enhanced Keyboard Entry

When using a keyboard in conjunction with headwear (e.g., virtual reality, augmented reality, or heads-up displays), the headset device and/or any attachments may physically restrict or obstruct the ability to view a keyboard. For example, virtual reality devices completely block all views of the real world. This generally disrupts the use of a keyboard since many users of keyboards must look at their hands, for example, as they type or press keys that are associated with other functions. Even those who are so-called "touch typists" occasionally generally look to ensure hands are positioned appropriately (i.e., relative to keys) prior to the process of striking keys.

In an exemplary embodiment, a wearable headset and (wearable or remote) display provide a method for overcoming any obstructed view of a keyboard and hands by viewing the region of the keyboard using a camera and overlaying camera images (i.e., including finger and key positions) within a viewable region of a display. In this way, finger positions relative to keys may be determined without having to look all the way down (or in any other direction) to an actual keyboard. The keyboard-viewing camera may be mounted on any form of headwear, on the neck or chest, or any other support (e.g., not on the body) such as a post or as a device looking downward from the top of a display monitor.

An overlaid display of the positions of fingers and keys is particularly powerful when combined with eye-signals. The eye-signal language has been constructed to utilize "efficient" eye movements in terms of distances covered by eye movements and time required to convey intent. Downward glances at a physical keyboard distract from language components, consume significant time and contribute to eye fatigue (i.e., due to long-distances saccades toward the keyboard). Furthermore, the process of returning a user's view to a region within a display generally requires a long-distance saccade, one or more corrective saccades, and, frequently, searching-saccades to return to a desired viewing location on a display.

The real-time projection of a view of a user's hands and keyboard may dramatically reduce eye (and head) movements associated with viewing one's hands during keyboard entry. In most cases, the virtual or projected images of hands and keyboard may be positioned such that it is within peripheral, parafoveal, or even foveal views while performing tasks. This allows a device user to alternate views back-and-forth between one or more regions of interest on a display, and a vision of fingers and keys during keyboard entry, without the loss of a spatial references and/or other information on the display.

Figure 28:
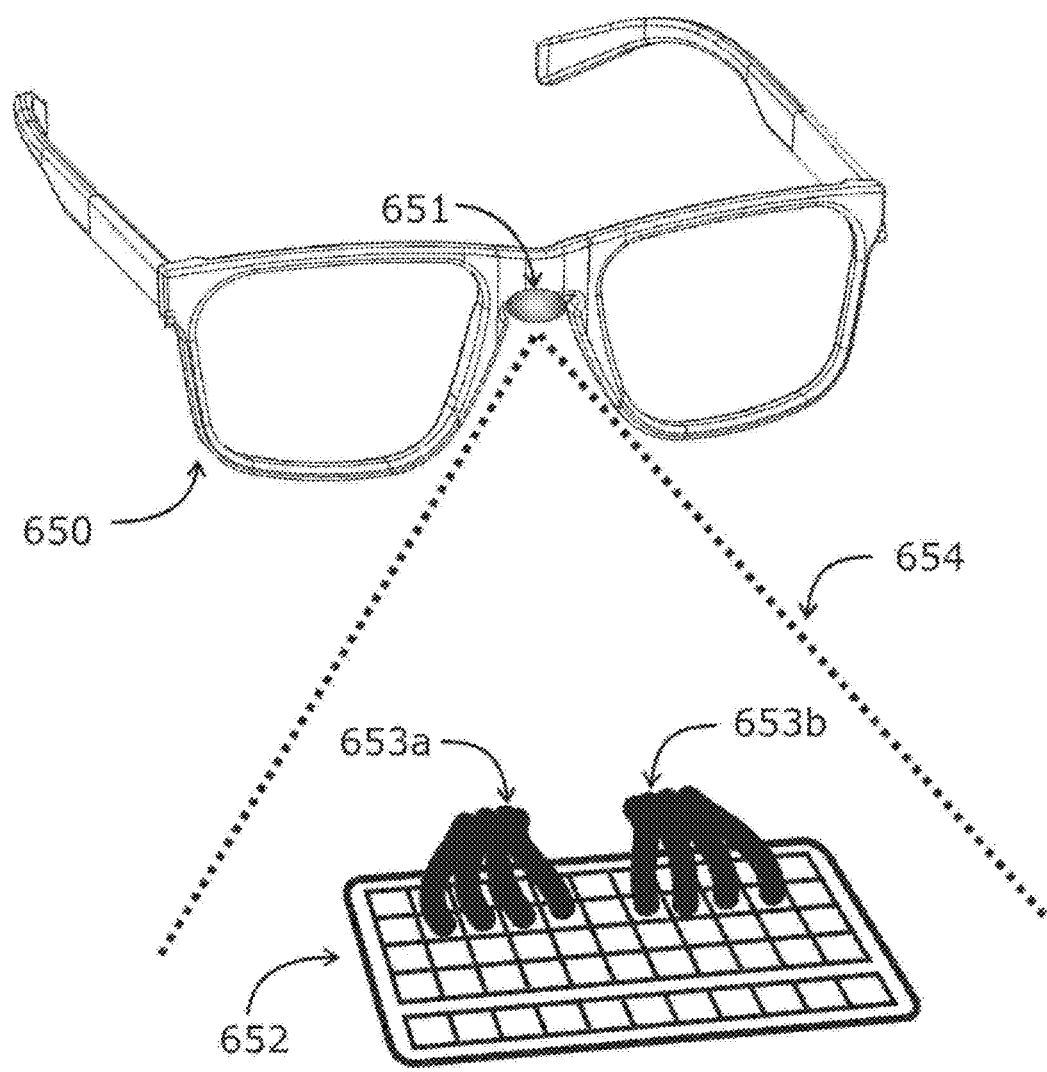
FIG. 28 illustrates the acquisition of camera images of a keyboard and the hands of a device user.

FIG. 28 shows a view of headwear 650 that includes a keyboard-viewing camera 651 oriented such that a keyboard 652 and the hands 653a, 653b of the device wearer are within the field-of-view 654 of the keyboard camera 651. In some embodiments, the device user may not be able to see the position of the keyboard 652 and hands 653a, 653b.

Figure 29:
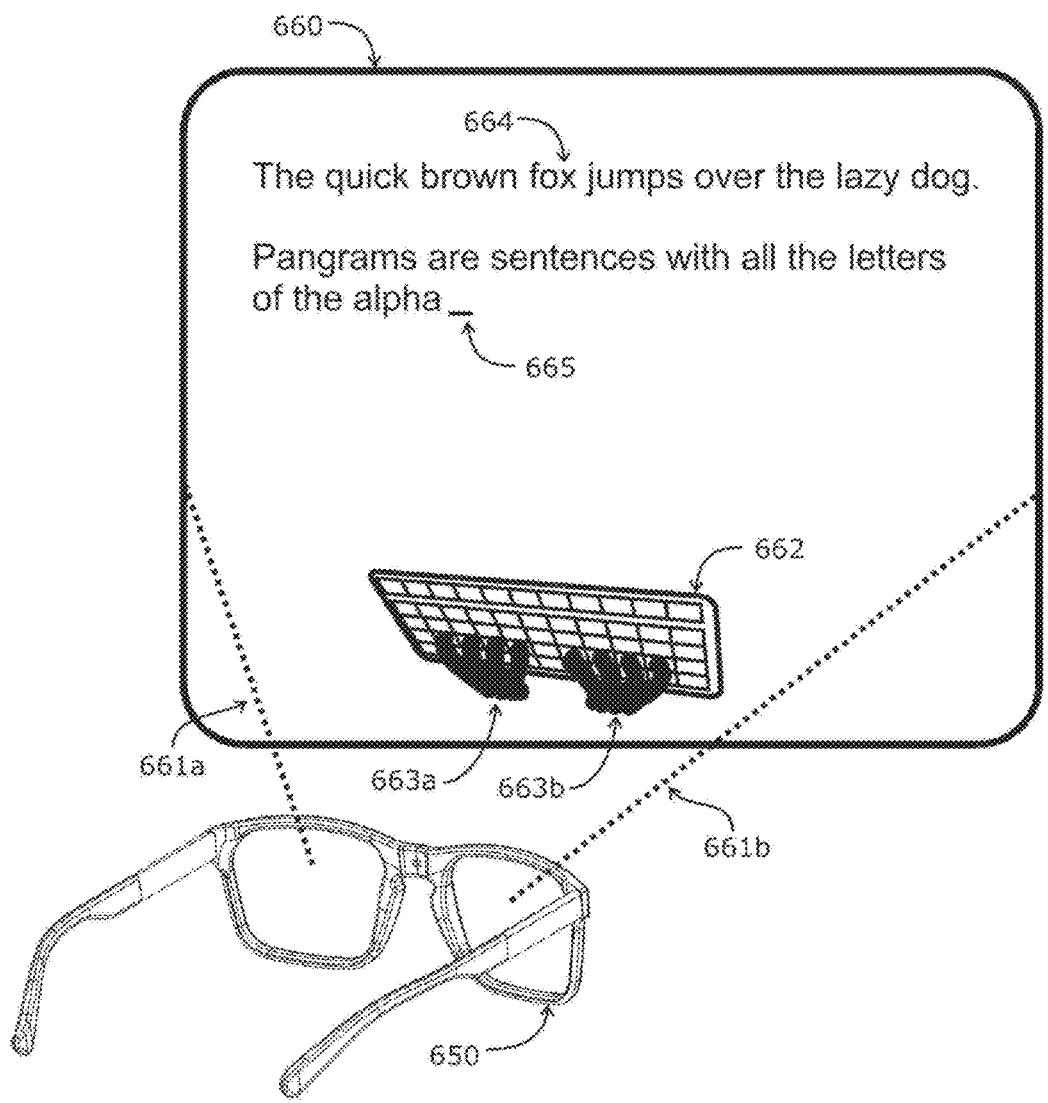
FIG. 29 shows the projection of camera images of a keyboard and the hands of a device user onto a display viewable by the device user.

FIG. 29 shows the same headwear 650 as in FIG. 28 with a projection of the keyboard 662 and device user's hands 663a, 663b as they are recorded by the keyboard camera 651 and viewed in real-time on a display 660. The display 660 may be a part of the headwear 650 (e.g., augmented reality, virtual reality or heads up displays) or located remotely (e.g., tablet, smart device, laptop, computer monitor), as long as the display(s) is/are within the field-of-view (represented by dashed lines) 661a, 661b of the device wearer.

The exemplary task illustrated in FIG. 29 includes typing by a device user. Characters and words are appended at a location 665 relative to a body of text 664. As needed, the user may glance downward to the projected image of the keyboard 662 and hands 663a, 663b to determine relative positions during the typing process. This involves much less eye movement and associated cognitive processing when compared with viewing the actual keyboard 652 and hands 653a, 653b.

The projected image of the keyboard 662 and hands 663a, 663b may be positioned anywhere on the display 660 to suit the device user. The projected image may also be made any size or any transparency (i.e., from completely blocking other displayed items to superimposed projection that is only barely viewable). Semi-transparent projections may even be positioned within regions where typing or other viewing activities are occurring (minimizing eye movements). The degree of transparency may be controlled by the user or adjusted automatically. For example, projections may be made less transparent (i.e., more obvious) when it appears that typing mistakes are being made.

In other exemplary embodiments, physical and/or projected keyboards may be optimized for use in enhanced modes. Physical keyboards may include mechanical guides or reference positions (i.e., identifiable by feel) to help position hands and fingers in the absence of being seen directly. One or more such guide posts or surfaces as well as reference surfaces that may be identified haptically may be positioned anywhere throughout the keyboard area.

Projected keyboards may be developed to accommodate practically any keyboard layout. Projected tops of keys can be recognized within video images using image recognition techniques well-known in the art. Within such images, any symbols or character sets may then be superimposed on the tops of projected keys. In this way, a completely user-selectable keyboard is possible. This can be used to account for characters and symbols used in different languages, accommodate within situations where there is a physical disability, adapt to particular applications (e.g., primarily numeric entry into spreadsheets), and/or customize layouts to optimize performance in different settings including the eye-signal language.

A particularly useful example of the latter includes the ability to specify, using the keyboard, whether eye movements are "purposeful." Any rapid movement, such as depression of a thumb, may be used to quickly indicate that eye signals are to be interpreted as purposeful and to perform resultant activations. Such a keyboard "button" may be used in a manner similar to a button press on a computer mouse or pressing on a touch-sensitive pad. In this way, without removing hands from a keyboard, cursor and/or other pointer movements may be controlled by small hand movements and rapid eye movements.

Alternatively or in addition, keyboards may include positional control using embedded touch-sensitive surfaces, directional buttons, a miniature joystick or push rod, a small track ball or similar mechanisms. These may be used in situations where more precise positional control is required than is available using eye signals. Keeping hands relatively stationary by eliminating a need to locate and subsequently use a computer mouse or remote touch pad or joystick, further enhances (i.e., by increasing the rate of entry and/or reducing cognitive load and associated fatigue) most forms of keyboard input.

In alternative or additional embodiments, the positions of the fingers in particular (and hands in general) may be sensed using various techniques that may supplement camera images described above. The proximity of a finger to a key may be estimated by proximity-sensing techniques that are known in the art. For example, some proximity-sensing techniques rely on differences in the dielectric properties of a largely water-filled finger versus the dielectric behavior of air (i.e., when a finger in not present). Thus, by measuring capacitance in the vicinity of a key (i.e., dependent on dielectric properties), the presence or absence of a finger can be determined. Other techniques include measuring the presence or absence of light that is bounced off a finger when present.

Indications of the presence or absence of fingers in the vicinity of specific keys may be indicated on the camera-based images of the keyboard described above or on a separate virtual keyboard. These indications of the presence of fingers may include images of small lights, changes in the character or symbol on the surface of a key, a superimposed outline or image of a virtual finger, or some other representation of the presence of fingers over each of the keys.

In further embodiments, the presence of each finger may be further distinguished based on the following:
1. The proximity of a finger may be sensed using proximity-sensitive techniques described above.
2. The contact of a finger with a key may be determined using touch-sensitive techniques.
3. The actual pressing of a key may be measured by the push-button switch operation of the key.

Each of these distinctions may be further indicated on the virtual keyboard described above, or superimposed on camera images of the actual keyboard being used by the device wearer. Distinctions can then also be used to modify keyboard inputs. For example, lower-case characters may be typed by simply touching a key; whereas uppercase and/or other special symbols may be accessed by fully depressing a key. This may avoid multi-key inputs or alternative keyboard layouts, and/or reduce the need to move the hands and wrists to generate different permutations of inputs. Fingers generally remain stationary except for downward strokes on keys.

In combination, these approaches may be designed to minimize both eye movements and finger movements during data entry, increasing human-machine interface (HMI) rates, and/or reducing cognitive load that leads to fatigue. Thus, these approaches may allow both the fingers and the eyes to do what they do best.

Saccadic Eye-Typing without Disruptive Eye Movements

In exemplary embodiments, "eye-typing" involves entering characters and/or other symbols by viewing (with one or both eyes of a user) a keyboard or other selection matrix. The keyboard or selection matrix may be real (i.e., a physical object) or virtual (i.e., projected as a portion of a display). A foundational aspect of eye-typing is the entry of characters and any other symbols that may convey a user's intent as rapidly as possible using purposeful eye movements while minimizing cognitive load.

Eye movements may, for example, be monitored using one or more detectors directed at one or both eyes mounted on headwear. The headwear may also include augmented reality, mixed reality, or virtual reality displays. Alternatively, or in addition, eye movements may be monitored remotely using one or more detectors directed at one or both eyes within a mobile device such as a phone, tablet, laptop computer, or similar device. Eye movements may also be monitored using detectors directed at one or both eyes within desktop computers, peripheral devices (i.e., so-called "peripherals") in communication with central processing units, wall-mounted displays, dedicated reading displays, signage, or similar devices.

An aspect of many commercial eye-typing systems is the use of dwell (i.e., one or more eye fixations for a period that exceeds a predetermined time), eye blink, or facial muscle movement to indicate the selection of a character or symbol. Each of these indicators requires a significant amount of time to signify a selection, particularly when compared with the rapid saccadic eye movement used to initially direct the eye to a specific character or symbol location. The elimination of such selections indicators may substantially increase the rate of eye-typing (i.e., the number of characters, symbols, or content entered per unit of time).

An aspect of exemplary embodiments herein is the generation by a user of sequential series of saccadic eye movements that are generally not interrupted by dwell, blink, or non-eye muscle movements. A user readily moves his/her eye(s) from one selected character to the next via series of saccades with no substantial delays. Based on one or more video streams of eye movements, purposeful saccades from one selected character to the next are recognized by the system in a sequential, non-interrupted fashion.

Another aspect of embodiments herein is a general lack of visual feedback while eye-typing. If feedback were shown (e.g., highlighting a selected character, showing a newly entered character within a word or sentence, modifying a keyboard layout), the act of displaying such feedback generally forces "perception" of the feedback on the part of the typist. Such visual perception necessitates a minimum time (including 200-250 milliseconds to fully perceive each character or symbol), limiting the maximum rate of the typing process. In fact, the perception of feedback generally requires a greater time than most saccadic eye movements (even if at least one corrective saccade is additionally involved).

In humans, it is cognitively difficult for the visual system to ignore rapid changes within the visual field (including within non-foveal regions). Thus, a key to rapid eye-typing is the maintenance of a visual field that changes little, if at all. The highlighting of a selected character or display of a sentence as it is typed, common in present-day eye-typing systems, has the effect of dramatically reducing maximum attainable typing rates by attraction attention (i.e., involving additional eye movements) and subsequent cognition/perception.

Increased typing rate also leads to improved cognitive flow by removing the bottleneck of the typing process itself. It is generally easy to form thoughts at a rate that is faster than most individuals are capable of typing (manually or using one's eyes). By simplifying and speeding the eye-typing process, it becomes easier to link together a train of thoughts.

In additional embodiments, it is possible to provide a user with a non-visual feedback so as not to distract the cognitive visual processing and control associated with eye-typing. In exemplary embodiments, feedback may be provided in the form of auditory indications of eye movement selections. Individual characters, words, or phrases may be broadcast in an audio form as visual selections are made. Alternatively, or in addition, haptic feedback may be provided to the user. An example that includes both auditory and haptic feedback consists of vocalization as each word is recognized by the system and a brief, tactile stimulus as the end of each sentence is determined.

The absence of both dwell (and most other forms of fixation) and perception triggered by visual feedback allows saccadic eye movements to select characters and/or other symbols rapidly and with reduced cognitive visual processing since the foveal view of the eye-typist consists of a static and simplified visual keyboard. The lack of feedback at the time of typing also reduces the propensity to correct errors. Within such a system, there may be a generally greater reliance on machine-based error correction. Typically, most errors that escape initial correction during the typing process may be corrected by the typist later, at a time of overall document review.

In further embodiments, neural networks (NNs) may be used to "learn" eye movements that are associated with the selection of a particular character and/or sequences of characters. General forms of NN training (e.g., using back propagation) and implementation (including deploying central processing units, graphics processing units, and hardware-based acceleration) are well known in the art within the field of machine learning.

Neural nets may be trained to recognize a user's sequence of eye movements associated with the selection of individual characters, syllables, words, sequences of characters, and/or other symbols. Inputs to the NN may include 1) video sequences of one or both eyes during eye movements, or 2) gaze tracking coordinates of one or both eyes relative to a real or displayed virtual keyboard, or selection matrix. In the case of the former configuration, the NN performs the functions of tracking the positions of one or both eyes within video images in addition to recognizing specific eye movements associated with a character or other symbol. In the latter case, the input to the NN includes a series of gaze coordinates as well as relative positions of a keyboard or selection matrix.

Training of the eye-typing NN may be 1) global (i.e., based on data from a population of eye-typists), 2) individual (i.e., based on training data generated by the user), or 3) a combination of both methods in which a global NN may be used as a starting framework for subsequent individual NN training. Training may be performed by eye-typing character sequences that are known to the system. As many different combinations of characters, pairs or collections of characters, syllables, and words should ideally be employed to train the NN. Eye-typing a brief book or article containing such combinations is generally adequate.

Individuals may differ in the way they perform saccades to direct the eye(s) to different characters and symbols. For example, an individual may not extend an eye movement all the way to the center of a character or symbol that is located near the periphery of a selection matrix. However, as long as the user maintains a similar eye movement to select such a character or symbol, the NN can recognize the movement as selecting the character, symbol, or collection of objects located near the periphery.

Based on a user's anatomy, physiology of eye muscles and cognitive processing, the path and velocity profiles involved in eye movements to a particular location may be measurably distinct in different users. By analogy, different individuals generally walk with a distinct motion gait and throw baseballs with distinct patterns of arm movement. Different users may express distinct patterns of "eye gait" when eye-typing different character and word sequences. Different users may also express a distinct "eye gait" during purposeful saccadic sequences compared with saccadic eye movements to simply explore the user's environment. Both the distances and directions (i.e., full pattern) of eye movements directed toward a target location may affect the landing profile in a user-specific fashion. Such differences may be considered by the NN and/or other algorithmic approaches to determine when a selection is being made and/or the degree of "purposefulness" of a particular eye movement. A neural net or algorithmic approach that is trained or calibrated to an individual is generally more robust that an approach based on population averages.

The ability to generate and recognize eye-movement sequences (i.e., not restricted to character-by-character or key-by-key selections) is foundational to rapid eye-typing. Rapid manual typists use so-called muscle memory (generally thought to originate in the cerebellum) to control finger movements in order to link series of characters together. Such typing is performed (after much repetition) with reduced conscious effort.

Along similar lines, the use of memory-guided saccades may be used to link together common character sequences during eye typing. For example, the word "the" may involve a series of eye movements that may not precisely land on the three characters that make up the word. However, as long as the eye movements associated with forming the word "the" are consistent, they can be recognized and subsequently result in the association with the word "the." Similar strategies may be used to classify syllables, words, phrases, sentences, or even concepts that may be coupled together to form sentences.

The neural network may be trained to recognize eye movements that are associated with individual characters, groups of characters, syllables, words, phrases, and/or sentences. Such identified individual characters, groups of characters, syllables, words, phrases, and/or sentences may then be concatenated (i.e., appended) to previously recognized and/or stored sequences of characters. Such sequences may then form a portion of a typed document and/or be a component or input to other forms of actions.

Within additional embodiments, typing using one's eye(s) may optionally omit the insertion of spaces typically placed between words, punctuation (e.g., commas, periods, semicolons, question marks), and/or other elements used to form phrases and sentences (e.g., quotation marks, parentheses, brackets). Such elements in other typing systems generally occupy a significant portion of a selection menu (e.g., keyboard) and/or disrupt the flow of the typing process (i.e., adding cognitive load) by switching back and forth between different selection menus and/or layouts.

Within exemplary embodiments, algorithms may be included to insert such word-spacing, punctuation and other grammatical elements. These algorithms may be similar to modern-day so-called "spell-checkers" and "grammar-checkers," although eye-typing algorithms may be developed to take into specific account the fact that spaces are typically not initially placed between words, and/or that punctuation is absent. Once features are inserted into the text that are specific to the rapid eye-typing process, the system may subsequently perform operations similar to more commonplace spell- and grammar-checking.

In exemplary embodiments, the machine-based correction of eye-typed sequences may take into account specific characteristics of the eye typing process. This may include "confidence factors" associated with individual or groups of saccadic eye movements. Such confidence factors indicate an assessment of the assurance that a particular character or character sequence is typed and may include an assessment of the level of "purposefulness". These assessments may be based on the degree of similarity in monitored eye movement(s) compared with historical or recorded eye movements when typing known character sequences.

Eye typing may also provide machine-based correction algorithms with alternative characters or character sets based on measured eye movements relative to keyboard (or other selection matrix) layout. For example, if an eye movement appeared primarily directed at the letter "t"; however, eye gaze was directed slightly to the left of the target location for the letter "t" (on a standard QWERTY keyboard layout), then this leads to a possibility that the letter "r" was actually intended by the device user. By providing the correction algorithm not only with a "best estimate" of the eye-typed character, but one or more alternative character or character sequences and/or confidence factors based on measured eye movements, then error correction may take into account the one or more alternative characters.

Within additional embodiments, typing using one's eyes may optionally avoid the inclusion of capitalization. The capitalization of letters may occupy a significant portion of a selection menu and/or disrupt the flow of the typing process when switching back and forth between different character sets. Algorithms may be included to insert capitalization at appropriate locations (e.g., beginning of sentences, proper names, identified acronyms).

In some situations, the entry of numbers may optionally be performed using a menu similar to a numeric keypad. This approach may be more efficient, for example, when using a calculator or spreadsheet, to enter long series of numbers as numeric digits. Similarly, selection of one or more elements from a finite list of elements (e.g., list of states, cities, countries, addresses, months, years, colors, fonts) may be more efficient by displaying switchable menu selections.

However, during rapid and more generalized typing of text, it may optionally be more efficient to not provide a numeric keypad and rather to "type" (i.e., spell out) occasional numbers as they are needed. Post-typing algorithms may be included to check for such numeric words and convert them to numbers when appropriate. For example, the sequence "one seven six" or "seventeen seventy six" can be made to appear as "1776" within a final typed document.

In exemplary embodiments, another optional component that may be used by eye-typists is the ability to insert a brief "pause" at the end of each word or sentence. The utility of a pause is not for the perception of, or dwell on, any particular character of function. Rather, the pause may act as both a signaling mechanism to indicate the end of a word, phrase, or sentence; and as a brief time when the eye-typist gathers his/her thoughts to proceed to the next word of phrase. Experience shows this to be a natural and comfortable method to pace the eye-typing process.

Taken together, the machine-based discerning of the intent of eye-typed character sequences may be designed to be much more proactive compared with modern-day grammar- and spell-checker algorithms. Discerning intent may generally assume that spaces, capitalization, and punctuation are to be inserted in an automated fashion. Formatting of eye-typed content may include automatic insertion of headings and paragraphs, and conversion of numbers and other symbols to match a writing style. If words or phrases appear improper then, in addition to corrections based on standard grammatical rules and dictionaries, alternative combinations based on confidence levels for particular characters and character sequences as well as keyboard layout may be considered.

Within additional embodiments, typing using one's eyes may optionally include any number of "shortcuts." Shortcuts may include eye-typing special characters or character sequences that represent a longer sequence of characters, words, sentences, or images. Shortcuts may also include specific, identifiable eye movements (e.g., a cross-eyed maneuver, look away from a display in a particular direction, a rapid saccadic sequence not associated with character selection), or movements of regions around the eye (e.g., movement of one or both eyelids, squinting, partial or full eye closure).

Such shortcuts may be used to quickly insert common words or phrases (e.g., one's name, salutations, answers to frequently asked questions), answers to common questions such as those on a checklist, and/or images that might be included as a portion of a conversation. Shortcuts (i.e., eye-selection of special symbols) may also be used to switch keyboard layouts. Such menu switching may be applied in situations such as numeric entry using a numeric keypad, the entry of a date using a selection sequence from a finite number of elements (e.g., year, month, day), and similar data entry situations. However, as noted above, the process of switching a menu is generally slower than other, non-interrupted eye-typing functions. Thus, frequent shifting of menus may be avoided to maintain optimal eye-typing rates.

Within further related embodiments, a user may optionally include so-called "auto-fill" or automatic completion of words, syllable, phrases, sentences, images and/or any predefined sequence of symbols or functions (or similar types of data entry) to help increase the rate of data and/or concept entry. However, unlike present-day auto-fill implementations, the eye-signaling display and subsequent selection of one or more auto-fill possibilities occurs only upon the user moving his/her gaze to one or more auto-fill activation locations on the display. Only after moving gaze to such a location are selections displayed. This avoids numerous distractive (i.e., searching, inspection) eye movements required to view numerous word-completion possibilities during the typing process that are a common feature of present-day (not guided by gaze) auto-fill implementations.

Furthermore, one or more displayed selection possibilities may be confined to the foveal view of the user (i.e., taking into account the user's current gaze direction). In this way, no further searching eye movements are required to view possible selections. A consequence of limiting displayed selections to a user's foveal view may be to limit the size of displayed representations and/or the number of selection possibilities. Selections may be made by following an expanding representation of selections possibilities (described elsewhere herein) or, alternatively, by saccading from a selection toward an activation target.

In addition, experienced users may learn optimum times to invoke the auto-fill mechanism, when desired selections are likely to be available and unambiguous, particularly for common words, phrases and/or data entry elements. Furthermore, selections may include full phrases, complete names, salutations, common data entry elements, and the like. Combinations of these strategies may greatly increase rates of eye-typing.

Discerning Intent Using Recurrent Neural Networks

Machine learning techniques including deep neural networks are particularly useful for discerning the intent of eye signals and other eye movements, as well as predicting or projecting (ahead in time) the course of eye movements. Methods for projection and discerning the intent of a device wearer are described in Systems and Methods for Biomechanically-based Eye Signals for Interacting with Real and Virtual Objects, application Ser. No. 14/708,234, filed May 9, 2015, the entire disclosure of which is expressly incorporated by reference herein. Methods are disclosed in which a recent history of eye movements is placed in a buffer (e.g., first-in, first-out) and used as inputs to a neural network.

An alternative embodiment includes the use of recurrent neural networks. Recurrent networks are a class of neural networks where interconnections are formed (sometimes described as being in the "back" direction) such that there are recurrent cycles within connections. These interconnections allow a form of recent "memory" to be incorporated within the network itself. Such structures may eliminate the need for an explicit history of eye movements to be supplied to input nodes (described previously). Rather, each eye movement is measured and sequentially fed to the network where the interactions and weights of the recent history of movements are determined by network learning processes.

The recent history of eye movements is particularly useful when discerning intent within the eye-typing process just described. Discerning intent during rapid eye-typing sequences involves not just a character-by-character form of input, but may include discernable eye movement sequences that are associated with combinations of two or more characters, entire words and/or even complete phrases when entering content. Additionally, movements (including optionally, slight pauses in eye movements) may be discerned that are associated with syllables, gaps between words, locations where punctuation normally occurs including those associated with commas, and the ends of sentences. Thus, within exemplary embodiments, neural net architectures used to discern intent when eye-typing may include a sufficient history to incorporate extended phrases and any brief pauses (i.e., up to approximately twenty (20) seconds).

Buttons and Controls within the Environment of the Device Wearer

In additional exemplary embodiments, "virtual buttons" or physical buttons may be viewed and "virtually pressed" or activated on any recognizable surface within the visual field of the device wearer. "Virtual buttons" may perform the same functions as those found on a standard keyboard, number pad, wall switch, and the like; or they may be used to perform supplementary functions such as those associated with a target icon within the eye-signal language. In addition, inputs may be continuously variable, such as a "slider" used as input to, for example, select speaker volume. A key element of virtual button(s) and/or controls includes the ability to have the control surface move or the device user move (including relative to the control surface). Using image recognition of the control surface and/or the position(s) of virtual buttons and other controls may remain fixed relative to such a surface.

Control surfaces may be recognized by a scene camera along with virtual buttons, physical buttons, and continuous controls located relative to reference surface locations (e.g., edges, changes in color, spots, patterns). Activation is performed only when the region of the button(s) is viewed by the device user and by virtually "pushing" or "sliding" the virtual button/control on the surface. Activation is determined using image processing techniques by recognizing when one or more fingers push (i.e., binary control) or slide (i.e., continuous control) along the surface.

An example of a convenient "virtual control surface" is the surface of the skin on a device user's arm. The sides of the arm along with wrist and elbow provide reference locations for touching and sliding actions by fingers on the hand of the opposite arm. As an example of such controls, a virtual button press nearest a device user's wrist might, for example be used to start and stop (in a flip-flop fashion) the vocalization of recent text messages by the devices (i.e., using text to speech software). A virtual slider control in the mid-portion of the arm may be used to control speech volume. A virtual button closer to the elbow might be used to "skip" or "go back" within the sequence of text messages. Such actions may be performed even if the arm that includes the virtual buttons moves, the device wearer moves, and/or both the head and eyes of the device wearer (e.g., a vestibulo-ocular reflex).

Another example of a "control surface' (i.e., combining virtual control with a physical object or surface) is a white board or surface that receives projected images typically found in conference rooms and theaters. The control surface (e.g., white board, projection screen) is identified using a scene camera where reference locations (e.g., edges of the white board) are determined. By both looking at and using one or more fingers to touch or slide along the control surface, inputs can be discerned to control applications and perform other actions.

In additional embodiments, objects or symbols (e.g., drawings, characters, graphics) may be included within the control or "activation" surface. For example, any symbol may be drawn on a white board or other surface, and then assigned a "meaning" or associated action using the eye-signal language or any other input means. For example, the letter "W" may be drawn on the surface and a series of commands executed to display the current "weather" whenever there is activation (e.g., look at and press with any finger) of the "W." Alternatively, a recognizable drawn shape (e.g., "W") or physical object may be pre-assigned an action (e.g., display the current weather).

As another example, colored dots, symbols, or cut-outs (collectively referred to as icon symbols below) may be affixed or stuck (e.g., temporarily) to surfaces such as a device user's arm using, for example, paper or plastic backed with a light adhesive (i.e., "stickers"). Different icon symbols may be assigned to perform different tasks and icon symbols may be placed anywhere within the visual field of the device wearer. This allows a device wearer to establish and customize an environment rich with control inputs.

The action(s) associated with a virtual control or (physical) icon symbol as described above may include pre-assigned symbols and/or relative locations, symbols and/or relative locations that are assigned during use, or a combination of both. Context may also be considered during the assignment of actions to virtual or real controls. For example, during the review of text messages, a slider may be used to control speech volume as just described; however, if reviewing photos, a slider (at the same location on the control surface) might be used to quickly scan through thumbnail sketches of groups of photos.

In additional embodiments, control or activation may be performed using a display, including a remote display monitor and/or a display within an augmented reality headset. In other words, once an object associated with an action is visually identified, the action may be initiated by one or more saccades (or other eye movements) toward one or more virtual targets on the display. Sequences of actions associated with objects in the environment may be performed quickly, particularly using a plurality of distinct activation targets (that may denote distinct actions) within an augmented reality headset.

Context-Sensitive Eye-Signal Activation Triggered by Notifications

Within wearable, portable, and fixed-position computing devices, a common method of device user notification of incoming information is the temporary superposition within a display of a thumbnail, title, first several words of a message, and/or other visual indication. These are generally presented at a fixed location on the display device (e.g., upper right corner) that becomes well-known to a user. Notifications can, for example, include an incoming text message, phone message, e-mail, warning, alarm clock notification, calendar event, update service, significant change in data stream (e.g., weather, stock market report, GPS location), and the like. Using the systems and methods herein, such devices may allow "sharing" of a region on a display in a time-dependent fashion with time-dependent information.

Such notifications generally cause a quick glance (i.e., saccadic eye movement both toward and away from the location of the temporary notification) by the device user. The glance may result in a desire to respond to the notification. The eye-signal language provides an opportunity to efficiently react to such incoming information by allowing an "activation" in response to such a temporary notification. Activation is performed by an eye movement that saccades from the position of the temporary notification to an "activation" target. If the user saccades from the notification location to a non-activation target location (e.g., returning to the original task being worked on) or if the notification disappears prior to any significant saccadic movement, no activation takes place.

Activations may be "context sensitive." In other words, appropriate software tool(s) are launched, dependent on the data type within the notification. For example, activation of a notification of the receipt of an e-mail causes the launch and/or appearance of software to read and review e-mail. An incoming text message causes the launch and/or appearance of software to review and respond to text messages. Activation of a calendar event notification results in the display of details about the event and the ability to send a response concerning event participation.

Dynamic Control of Selection Stringency

There are numerous conditions that can affect the ability of a user to accurately produce eye-signal (e.g., saccade, smooth pursuit) language components. Similarly, there are a number of conditions that can affect the ability of a device to accurately measure and identify eye movements. In some cases, both user and device performances are affected, such as when driving on a bumpy road, riding a bus or bicycle, operating a boat, skiing, running, or even simple walking.

A primary cause that affects the accuracy of language component identification under these conditions is the production of accelerations and resultant forces that can move any object (where, using Newton's laws, force is proportional to object mass) that is compressible, supported by a compressible surface or is free to move about with at least one degree of freedom. In the case of accelerations applied to one or both eyes, all three of these mechanisms have potential to move the eye in a manner that is beyond the physiological (including purposeful) control imposed by the user's oculomotor system. Accelerations in the region of the head of a user can compress (particularly fluid-filled regions of) the eye, push the eye into or out of its socket and/or cause the eye to rotate (vertically and/or horizontally) within its socket. Although these movements are generally slight, because of the geometry involved in gaze estimation, they can have a pronounced effect on the ability to accurately track purposeful eye movements.

Along similar lines, accelerations applied to headwear or other devices may cause portions of the device itself to flex, compress at any or all points where the device contacts the user (e.g., nose, upper portion of the ears), or the device may even slip, changing the relative position(s) of the detector(s) (e.g., one or more cameras) that sense eye position. The situation is generally made worse if the detector used to view the eye(s) is affixed to a mobile phone or tablet and/or held by the user. The mass of the device as well as the leverage involved in holding the device containing one or more detectors may increase forces and subsequent movements of the device relative to one or both eyes.

Other conditions that may affect accuracy when performing eye-signal language components include ambient lighting (e.g., indoors versus outdoors), pupil size and responsiveness, the moment-to-moment position of eyelashes and/or other obstructions, and the general position of eyelids that also may vary as one goes about daily activities (e.g., upon waking up, mid-day within a bright environment, late at night).

In exemplary embodiments, the stringency of making selections and other components of the eye-signal language may be varied in a dynamic manner that is dependent on an anticipated eye-tracking accuracy. In addition to externally imposed conditions that may be monitored by the device, stringency may also be varied in a manner that is dependent on the experience of the user in utilizing the device, the historical accuracy of the user (e.g., determined from the number of "back" or other corrective operations performed by the user), time of day (that may also be based on an historical estimate of accuracy throughout a typical day), as well as any preferences specified by the user (e.g., selected using the eye-signal language).

When wearing headwear, the magnitude and frequency of accelerations applied to the region of the head may be estimated using a number of methods including one or more accelerometers embedded within headwear, sharp lateral movements of the pupil and eye detected in the one or more cameras that view the eye(s), and/or overall movement of the environment within images captured with one or more outward-facing scene cameras.

The latter method comprises comparing images acquired from one or more scene cameras over a period of time to determine if background within images shifts translationally (allowing a small amount of rotation movement within images), in a manner consistent with head movement. Scene camera (affixed to the head of the device user) angular velocity is approximately proportional to the degree of translational movement of a background from one camera image to the next (i.e., per unit of time). The movement of a background within images may be separated from the movement of individual objects that may move about relative to the device user, using image recognition techniques.

Ambient lighting (and its effect on tracking accuracy) may be estimated from overall brightness levels within detectors that track the eye or from one or more ambient light detectors (e.g., photodiodes) embedded within the device. Ambient lighting may also be estimated based on images acquired from one or more scene cameras.

In exemplary embodiments, a number of strategies are available to alter stringency when making selections. These may be used individually or in combination. They may be applied globally, to subsets of eye-signal menu selections or to individual selections.

A relatively simple method to regulate selection stringency involves control of the spatial target range over which a selection is made. In most cases, a well-designed target object includes a central focal point (e.g., with distinct contrast, brightness, color) to guide the eye of a user to an optimum (generally central) location within a target object. When an eye movement is within the spatial target range for a particular selection, then algorithms may consider whether the movement is a purposeful component of the eye-signal language.

The spatial target range may be of any shape including circular, elliptical, square, or rectangular. Stringency may be controlled by controlling the size and/or shape of the spatial target range. Generally, decreasing the size of the target range increases the stringency of the target selection thereby decreasing the number of inadvertent activations when there is increased uncertainty in determining precise gaze locations. Conversely, under more ideal eye-movement recording conditions, increasing the size of the target range may allow a user to more rapidly produce sequences of eye-signal movements and decrease cognitive load with a reduced need to make precise eye movements.

Stringency may also be regulated by controlling temporal ranges of detected eye movements. For example, during times when conditions appear more optimal for accurate eye tracking, the predicted landing location of a ballistic saccade and a determination that the saccade will land within the region of an activation target may be made sooner. This allows subsequent changes to eye-signal language elements to be made more rapidly. Consequently, an icon or object at the target location may be altered, or removed producing a gap effect. Additional menu selections such as those displayed during a "reveal" selection process may be presented following little or no delay. Additionally, the length that a "reveal" menu remains available on the screen may be reduced during times when more accurate eye tracking is available (i.e., facilitated by more accurate eye tracking).

In general, when there is uncertainty in a measure, accuracy may be improved by making multiple measurements and, for example, averaging those measurements (as long as the item being measured is relatively stationary during the measurement time). Such statistical approaches may take into account so-called "stringency maps", described in more detail below. Under less than ideal recording conditions, more measured eye locations (i.e., image frames collected by a detector) may be required to, for example, identify with certainty the real-world or virtual object (or portion of an object) being viewed by a user. This strategy applies particularly during situations when there are two or more closely spaced target objects.

In additional exemplary embodiments, during high-stringency situations, more measurements may be considered during eye-signal selection and activation processes. Conversely, low-stringency conditions may permit fewer measurements to attain a pre-defined level of confidence, allowing sequential eye signals to be performed more rapidly. In addition to the conditions described above that may be used to compute stringency, the degree of variation in measurements at times when eye position is expected to be substantially stationary can be used to estimate a degree of "noise" in measurements. When there is increased noise, stringency may be increased to compensate for the decreased certainty in spatial measurements.

Avoiding Inadvertent Activations (IAs)

Although most descriptions of the eye-signal language are focused on processes to select and perform various actions, consideration must also be given to avoiding so-called inadvertent activations (IAs). IAs result from one or more eye movements that cause an action to be performed that is unintended on the part of the device wearer. For example, IAs may result from eye movements involved in viewing real world objects that overlap with, and are interpreted as, selection sequences. Another example involves the display of an object that "yells" at the user where user attention generates a distractive eye movement that mimics characteristics of a purposeful eye selection and/or activation sequence.

IAs may simply be considered annoying under some conditions (e.g., game play), but in some use cases IAs might pose a real hazard with a requisite need to be circumvented, for example, an IA that enables the projection of information in regions of an augmented reality display might block viewing of the real world. This has the potential to interfere with activities or even be considered dangerous, for example, when operating machinery. Along similar lines, an IA may result in the production of unanticipated sounds, startling a device wearer.

In exemplary embodiments, strategies to avoid IAs can be described as adding "friction" to the process of performing selections and activations. As just described, different use cases may pose different risks and or loss of effectiveness to the consequences IAs, and thus require different levels of friction. Strategies to increase or lower friction may be used individually or in combination to produce a wide range of friction levels. Friction levels may be pre-set for individual selection and/or activation sequences, or they may be dynamic, adjusting based on factors such eye-signal language context, user experience, a recent record of IAs, the velocity of recent eye movements, and the like.

As just described, one of the simplest ways to control the friction of eye signals involves the control of the size and shape of target regions for eye movements. Generally, decreasing the size of a target region increases friction, reducing the number of IAs. Reducing target size may be performed at the expense of unsuccessful completion of some selection or activation sequences due to eye movements "missing" one or more targets. This, in turn, may slow down (and make annoying) eye-signal language sequences. Thus, in addition to the environmental conditions (described above) that may affect physical tracking accuracy, stringency may be altered dynamically based on the number of missed target attempts and subsequent retries (i.e., repeated successful or unsuccessful saccadic movements in the general direction of the same target).

In additional embodiments, the friction applied to avoid IAs may depend on a precise analysis of eye movements. The purposeful viewing of a specific object at a location is often accompanied by so-called corrective saccades. Such saccades allow the gaze direction of an observer to more accurately target the viewing of an object. Corrective saccades are indicative of an intent to view an object and thus may be interpreted as "purposeful." Their presence may be used to reduce friction for object selection within a region.

Along similar lines, saccadic eye movements that cover larger distances frequently undershoot their target, requiring corrective saccades in the same direction to "zero-in" on a target location. The eye-signal language may recognize this tendency by extrapolating the trajectory of long-distance saccades. If a long-distance saccade appears directed at a target selection object but undershoots (often in a range of up to 20%) then the eye-signal language may consider the target to be selected (i.e., reduce friction) and proceed by performing the action that is associated with the selection. Optionally, the system may also confirm that there are no possible targets between the landing location of the initial saccade and the projected target to confirm that the initial saccade is likely to be followed by one or more corrective saccades to the projected target Conversely, shorter saccades have a tendency to overshoot intended landing locations. Similar to considerations for long-distance saccades, the eye-signal language may take this tendency into account. When a short-distance saccade is detected and a selection target is within a shortened target path (reduced by up to approximately 20%), then friction may be reduced by considering the target to be selected and proceed to perform the action that is associated with the selection.

Recognizing the tendency to either undershoot or overshoot a target based on distance traveled during a saccade may be particularly useful during purposeful movements designed to convey intent such as saccades directed toward activation targets (e.g., "go" or "reveal" targets). Furthermore, as described previously, saccades are "ballistic" in nature, allowing distance traveled and landing locations to be predicted. Thus, any tendency for longer saccades to undershoot and shorter saccades to overshoot may also be predicted as a component of more rapidly discerning user intent.

Within further embodiments, an intended target location of a purposeful saccade may be computed based on the measured (including predicted) saccadic landing location and whether the saccade traveled a prolonged distance (e.g., >10°). If the saccade traveled (or is projected to travel) a prolonged angular distance, then selection targets that are in the same direction (within a predetermined range of directions) as the measured saccade but beyond the saccadic landing location (by up to approximately 20%) may be considered as "selected". Such a selection may occur prior to any corrective saccades that subsequently approach the target (i.e., saving time), or even if the gaze direction of the user never actually reached the intended target (i.e., selectively controlling stringency).

Along similar lines, if a saccade traveled (or is projected to travel) a short angular distance (e.g., <5°), then selection targets that are in the same direction (within a predetermined range of directions) as the measured saccade but that were bypassed by the saccadic eye movement (by up to approximately 20%) may be considered as "selected". As just described, such a selection may occur prior to any corrective saccades that approach the target (i.e., saving time), or even if the gaze direction never actually reaches the intended target (i.e., selectively controlling stringency).

Such strategies may help to more accurately and rapidly discern the intent of a device user based on purposeful eye movements.

Selection by Pursuit of Expanding Features

Visual resolution is frequently used as a guide to determine the feature size of displayed objects (e.g., text, symbols, cells within a spreadsheet) on a screen (e.g., monitor, HMD, tablet). Gaze resolution (i.e., the ability to specify a location based on eye viewing direction) is generally less than visual resolution, often by at least an order of magnitude. This leads to a need for specific strategies within the eye-signal language in situations where one or more eye-signal positional selections must be made from features or objects that are sized to be within a user's visual resolution, but less than a user's gaze resolution. This situation may occur, for example, when editing cells within a spreadsheet, inserting objects within a 1-dimensional list or 2-dimensional array of icons, or replacing a word within a string of text.

The detection and use of eye-movements is particularly powerful in these exemplary situations when combined with other modes of input such as those involving the use of a keyboard or microphone. For example, when entering values into a spreadsheet or list, the efficiency of data input may be greatly enhanced by allowing the eyes to specify locations within the spreadsheet or list while data entry is extracted from the coincident modality (e.g., typing or voice).

In exemplary embodiments, a method to allow eye-signal selections in situations where selectable features are smaller than gaze resolution involves expanding or progressively "zooming in" on the area being viewed. Expansion comprises a gradual increase in magnification performed within a video sequence in such a way that regions and objects in the viewed area are expanded at rates that are within the ability of an individual to follow a specific object or expanding region using smooth pursuit eye movements, series of short tracking saccadic eye movements, or a combination of the two. In other words, the video display of the rate of expansion of an area is limited such that objects or points in the area move at radial velocities that can be readily followed by eye movements. As a general guide, this imposes a limit on the movement of objects within the expanding area to velocities less than approximately 30°/second.

During the time that expansion or magnification of an area is performed, an object within the area may be tracked by the user to indicate a selection of the object. Selection may occur once an object has been tracked for a predetermined time or distance, or selection may occur upon performing some other indication of intent such as a switch, keyboard press or audible signal (e.g., keyword, phrase, click) produced by the user.

Figures 30A, 30B:
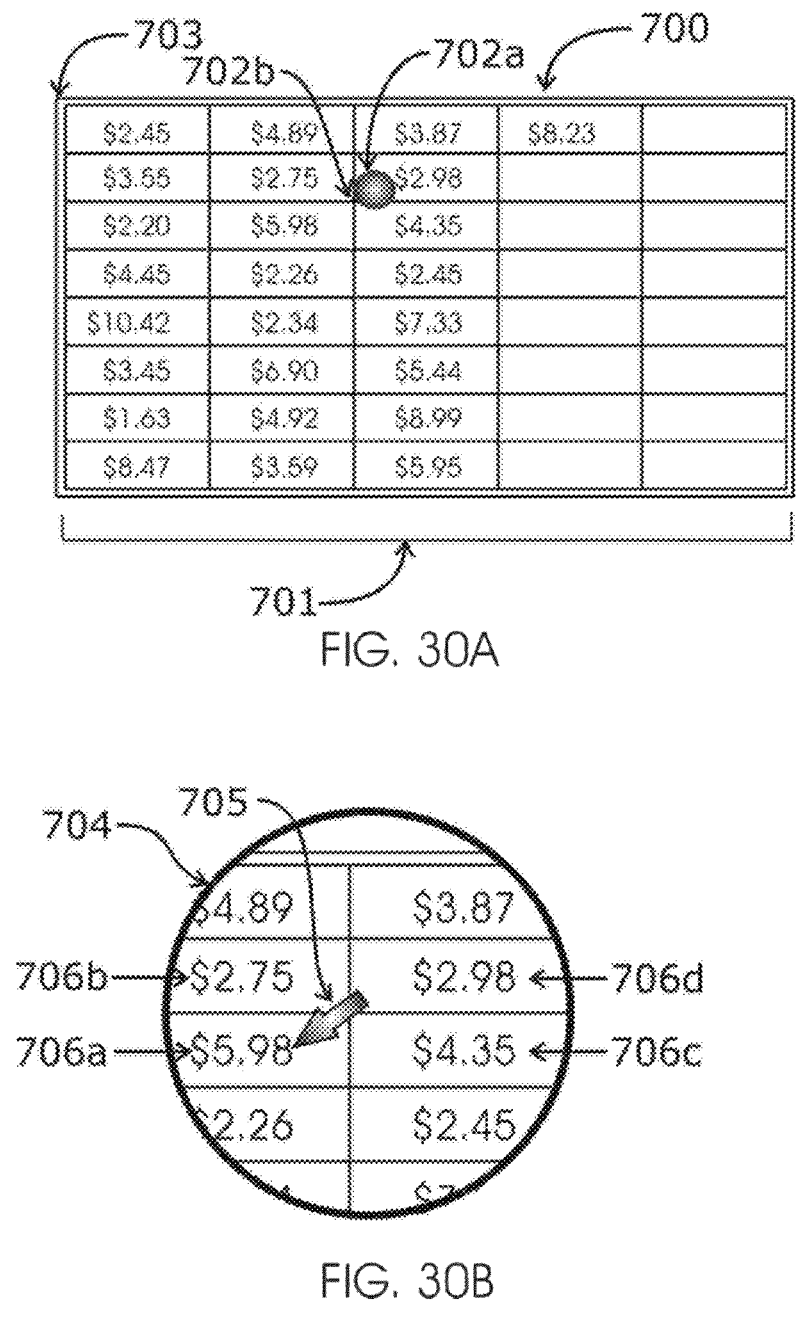

FIGS. 30A and 30B demonstrate the process of selecting a specific "cell" within a spreadsheet 700 using pursuit during expansion. As illustrated in FIG. 30A, the exemplary spreadsheet 700 is composed of a large number of elements or "cells" 701 that (in this case) contain dollar values. The size of individual cells within the spreadsheet 700 is less than the resolution that a user's gaze can be measured within a practical amount of time (e.g., <1 second). An estimate of eye gaze location (represented by a spherical disc 702a) is roughly in the region that is two (2) cells down and two (2) cells to the left of the top-left corner of the spreadsheet 703. The identification of a specific cell for editing (or other purposes) is not possible at this time.

The region around the estimated eye gaze 702a location is subsequently expanded at a rate that allows pursuit of individual objects. FIG. 30B shows a single frame during the process of expansion. The magnified area 704 contains elements and objects within a portion of the original spreadsheet 700. In this illustration, the general direction of eye movements to pursue a specific cell within the spreadsheet is indicated by an arrow 705. This pursuit by the user's eye allows the identification of a specific cell within the spreadsheet 706a, e.g., containing the value $5.98. Once identified, the cell may subsequently be modified (e.g., deleted, edited, copied, pasted) as desired by the user.

As objects and features within a gradually expanding area move away from the center of expansion, they may begin to cover distances on the display that exceed a maximal velocity for pursuit. In order to manage this condition, the rate of expansion or "zooming" may be varied as a function of time, optionally, as well as other factors such as feature size and relative position within the area, and user experience and/or preferences. For example, by slowing the rate of expansion at later times during a magnification process, the velocity of objects near the periphery of a zoomed-in region may be constrained to be within physiological limits for eye tracking based on smooth pursuit and/or short series of saccades.

In additional exemplary embodiments, the rate of expansion in different directions may also vary. For example, for most users, the range of eye movements in the horizontal axis is greater that in the vertical direction. Thus, expansion of a region may be greater in the horizontal axis compared with the vertical direction. Similar strategies may be applied when expanding regions near the edges or corners of a displayed area, or region of a user's foveal view. For example, the side or area near an edge or corner may be expanded more slowly compared with other directions, resulting in an increased display time for a user selection of an object to be made before the object leaves the displayable area.

In addition to the rates and radial profile of expansion, another key variable to govern the expansion process is a center location of the expansion. In exemplary embodiments, the center may be:
 a current gaze position,
 a running average (or other statistical approach) of recent gaze positions, or
 a previously specified area such as a location identified during a so-called "reveal" operation.

Alternatively, eye-signaling language elements (e.g., a "reveal" or other menu selection) may be used to place eye movements into a continuous expansion mode. In this mode, regions of a display are expanded as they are viewed. If an expanding object is followed, a selection is made based on the followed object. Otherwise, when different regions of a screen are viewed, expansion is initiated (generally slowly at first) until a selection is made or the expansion mode is turned off.

Regardless of the method for indicating a region for expansion described above, the context of objects on the display may also be used to adjust or "fine-tune" a location for the center for expansion. Such adjustments may be made to enable complete objects (versus portions of objects stretched apart at the center for expansion) to be shown radially expanding in distinct directions outward from an initial gaze direction of the user.

An adjustment of the center for expansion may also be performed to allow any of the expanding objects to be followed (equally well) by radially outward eye movements. The adjustment may avoid situations where a specific object would be more likely or difficult to select because it does not move (i.e., it is at the center), is clustered among a number of nearby selectable objects, or is initially further away from the user's gaze direction.

An adjustment of the center for expansion can readily be illustrated during the process of selecting a specific cell within a spreadsheet of cells. By adjusting the center for expansion to be between spreadsheet cells, both horizontally and vertically (versus within the area of an individual cell), then the selectable cells may be expanded radially from the approximate gaze location of the user. As an example, an adjustment of the center for expansion from the user's gaze location $702a$ may be set to the nearby intersection of horizontal and vertical cell boundaries $702b$ within the spreadsheet $700$ shown as FIG. 30A. As shown in FIG. 30B, any of the cells $706a$, $706b$, $706c$, $706d$ that touch upon this intersection $702b$ (as well as other cells further away) may be followed, and thus selected, during the expansion process.

The ability to specify a selection by pursuit of an object within an expanding area is a foundational element of the eye-signal language. The strategy may be used even in situations that are not designed to be specifically compatible with the eye-signal language. For example, when browsing a page on the web (designed without regard for eye signaling), a user may encounter a desire for expansion and/or selection within a specific area where the area may contain one or more selections, hyperlinks and/or data entry points. By using eye movements to pursue a desired element during the expansion process, the desired selection, hyperlink, or data entry point may subsequently be activated.

Once a selection from an expanding area has been made, there are a number of possible feedback modalities (depending on context) to proceed with user interactions:
 The display may be returned immediately to its pre-expansion form and an indication (e.g., change in font, color, luminance) may optionally be included to designate the selected element.
 The expanded area may remain expanded until an entry (e.g., cell within a spreadsheet, text) is completed.
 Additional moving, expanding, and/or selectable objects may be introduced within the expanding area that allow further selections (i.e., so-called sub-menu selections).
 Screen content may switch to a separate display as a result of the selection.

Eye Selections Augmented by Superimposed Markers

In further exemplary embodiments, to address the issue of the discrepancy between exquisite visual resolution and the relatively much lower eye gaze tracking resolution, superimposed markers and auxiliary inputs may be coupled with measured gaze locations to efficiently perform user selections and/or activations. Auxiliary inputs may be in the form of any device capable of specifying a 1-of-N selection such as a keyboard, key pad, computer mouse, trackball, one of a set of keywords identified using voice recognition, switches, head nods, finger or hand gestures, and the like.

Gaze may be used to specify a general location of a user's region-of-interest within a display. The ability to specify such a region using eye movements takes advantage of the ability of the eyes to rapidly (i.e., at angular velocities up to 900°/sec) indicate such a general location with minimal cognitive load. If the general location contains only a single selectable item, then activation may proceed using a typical activation sequence within the eye-signal language (e.g., so-called "go" or "reveal" sequences). However, if multiple selections are possible within an eye-gaze region that exceeds, or is close to, the resolution for gaze tracking, then additional steps must be taken by the user to indicate a specific selection. Examples where this situation may occur include one or more cells within a spreadsheet, a location (e.g., to delete or insert) within a body of text, a grid of thumbnail images or icons, an array of word selections, a checklist or other series of items, a pop-down menu, and the like.

The general region of a gaze on a display that contains multiple possible selections may be referred to as a "candidate fixation area" (CFA). Once the user fixates briefly on such a CFA, markers may be superimposed on all possible selections within the CFA. For convenience, markers are referred to as being "superimposed"; however, markers may also be made partially transparent, superimposed on the background, made from colors or luminance levels that contrast with objects within the CFA, only shown in outline, and/or similar methods to display markers without fully obscuring objects within the CFA.

Alternatively, any signal generated by the user may be used to initiate the superposition process. Examples of such signals include pressing any key (e.g., the space bar) on a keyboard, vocalizing a keyword, pressing a switch, and the like.

Examples of CFA superimposed markers include numerical digits, characters, special functions (represented on most keyboards), directional arrows, symbols, patches of distinct colors, objects representing sounds, and the like. Selection of a specific element within the CFA, optionally combined with the activation of a consequent event, is performed by specifying a selection based on the superimposed marker overlaying the desired element. For example, if the superimposed markers include numeric digits, then typing the digit (e.g., on a keyboard or numeric keypad) that overlays a desired selection indicates that a selection process is desired and which element (i.e., beneath the superimposed digit) is desired.

Alternatively or in combination, selections may be made by typing keys corresponding to superimposed characters or colors, or by vocalizing a sound corresponding to a superimposed symbol or word. In the case where symbols represent directions (e.g., left, right, upper-left, etc.), either specific keys (e.g., so-called "arrow" keys) may be used, or any of a number of keys may be used to indicate a given direction. As an example of the latter case, if a superimposed symbol indicates an upper-right direction, then keys that may be used to indicate an upper-right selection might be a "P" or "O" key (i.e., located in the upper-right region) on a standard, so-called "QWERTY" keyboard.

Figure 31A:
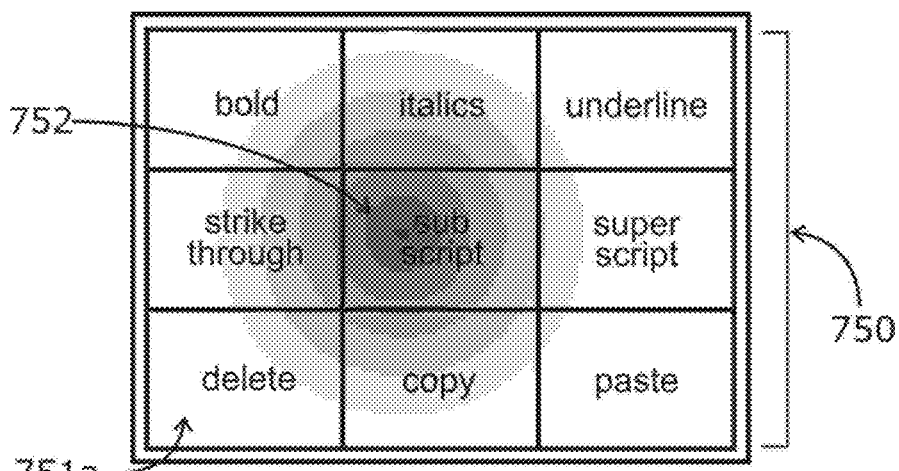
FIG. 31A shows an example of uncertainty in object selection based on eye gaze within a region of a display.

FIG. 31A shows an example of a 3×3 grid 750 of nine word selections that might be used, for example, to control font characteristics and cut-and-paste flow during the formation of a text document. In this exemplary case, the CFA grid 750 of nine selections could be routinely made available in a small, unobtrusive region of a display. The uncertainty in the measured location of eye gaze, illustrates as a circular "cloud" 752, exceeds the size of an individual selection element (e.g., 751*a*) within this grid 750. Thus, a selection cannot be made based on the measure of a single eye movement.

Figure 31B:
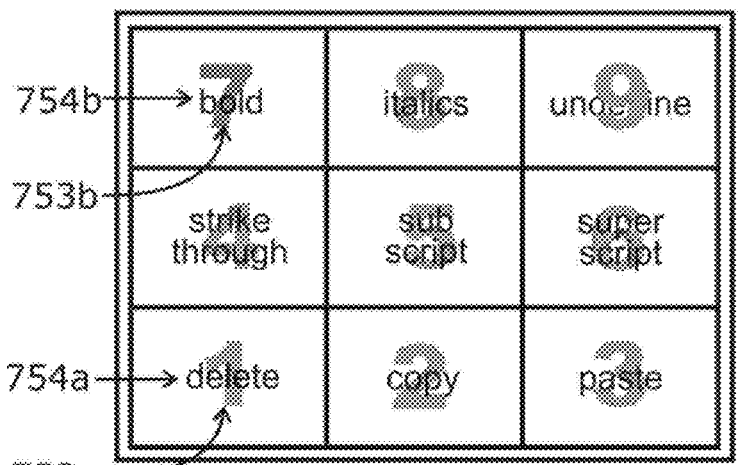
FIG. 31B shows an example of the selection of an object within a region of a display via overlaid numeric digits.

FIG. 31B shows nine selectable digits (e.g., 753*a*, 753*b*) superimposed over the CFA grid 750 illustrated in FIG. 31A. Marker digits (e.g., 753*a*, 753*b*) are arranged in the same layout as a typical numeric keypad. In alternative exemplary embodiments in which a keypad or keyboard is not available, the digit could be spoken and subsequently recognized using voice recognition methods that are well-known in the art. The selection of the one of nine digits results in the action to be performed associated with the word beneath the superimposed digit. For example, using the table illustrated in FIG. 31B, if a "7" were indicated 753*b*, then the "bold" attribute 754*b* for subsequent text entry is toggled on or off. Similarly, if a "1" were indicated 753*a*, then the system would "delete" 754*a* a character or word during text entry.

Figure 31C:
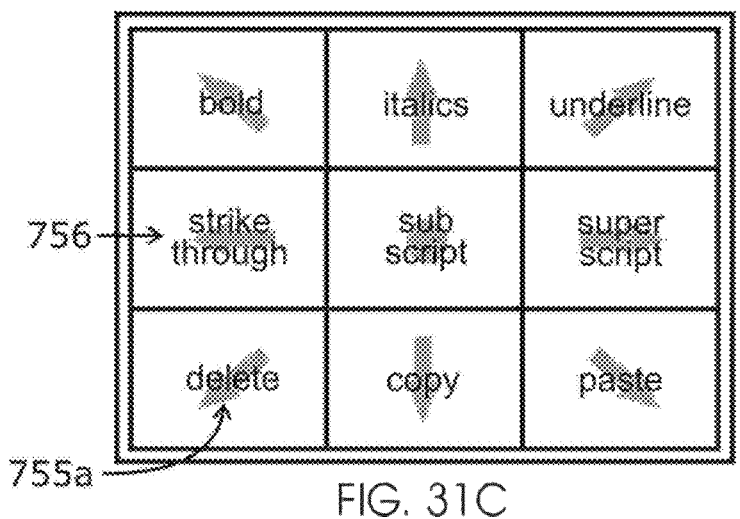
FIG. 31C shows an example of the selection of an object within a region of a display via overlaid directional arrows.

FIG. 31C shows an alternative set of symbols superimposed over the CFA grid 750 of 3×3 selections illustrated in FIG. 31A. In this case, directional arrows (e.g., 755*a*) are superimposed over possible selections. An individual selection may subsequently be made by pressing individual keys associated with arrow directions or by pressing any key that is in the direction of the arrow relative to some reference point on the keyboard or other data entry device. For example, if the center of a standard QWERTY keyboard is used as reference then either of the characters "A" or "S" might be used to indicate a leftmost selection associated with the "strike through" 756 function within the CFA grid illustrated in FIG. 31C.

Once a selection has been made, superimposed markers may be made to disappear and/or additional entries using the same keyboard or auxiliary device may be supplied as input to the selected element. For example, alphanumeric characters may be entered into a selected cell within a spreadsheet as a portion of a data entry process. Superimposed markers may also be removed after being displayed for a predetermined period of time (i.e., if no selection process is initiated) or if the user gazes toward a different region on the display.

Within additional embodiments, each superimposed symbol may be associated with multiple selections by either repeating the symbol at multiple locations on the display or superimposing a (large) symbol over multiple selectable items. In this case, multiple actions may be performed (e.g., if the selectable items represent actions) or an action may be applied to multiple items. Eye selections augmented by superimposed markers may also be subsequently repeated any number of times.

Eye Gaze Calibration Incorporating Provisions for Eye Dominance

A key component of calibration is the formation of a mapping scheme (e.g., one or more mathematical functions, look-up tables, interpolation strategies) to convert the locations of one or more features (e.g., pupil, limbus) of one or both eyes to gaze locations on a display (e.g., HMD, mobile device, remote monitor) or within the real-world environment of the device user. Calibration schemes may be based on anatomical models of one or both eyes in addition to known or measured relative positions of illumination sources, reference object locations and/or cameras located on headwear or elsewhere. Parameters within such anatomical models may be assigned based on population averages, estimates based on known characteristics of a device user (e.g., age, ethnic origin), measured characteristics of the device wearer (e.g., during calibration procedures), or combinations of these schemes.

In exemplary embodiments, when both eyes are tracked, under most recording situations, it is possible to take into account eye dominance within calibration and gaze tracking schemes. Eye dominance is the tendency to utilize the visual input from one eye in favor of the other eye. Approximately 70% of the population is right-eye dominant where there is a correlation between eye and hand dominance. In some cases (e.g., cross-eye versus hand dominance for shooting or hitting a baseball), it is possible to modify the eye dominance of an individual using eye patches or light diffusers. Approximately 30% of the population is left-eye dominant. A small number of individuals demonstrate no eye dominance.

The most extreme form of eye dominance occurs when looking at extreme angles where the bridge of the nose may physically block the vision of the eye furthest from the region being viewed. However, in most individuals, eye dominance may shift well before reaching such angles. In the case of a normally right-eye dominant individual, dominance may shift to the left eye when looking to the left of the center of the visual field. Similarly, normally left-eye dominant individuals may shift to viewing with the right eye in the region to the right of the center of the visual field. On average, the switch from normal dominance to the contralateral eye occurs approximately 15° from the center of the visual field, although wide variations exist among individuals.

If eye dominance is not taken into account, then objects that are cognitively selected by the user may be misidentified when gaze direction is determined based on a vector originating from the non-dominant eye, or from some location between or around both eyes. Such considerations are particularly important for near-eye display(s), illuminator(s), and detector(s) used within wearable devices for gaze tracking. Currently available eye tracking systems may use a (weighted in some cases) average of measures of left and right eye measurements. These systems do not take into account the spatial dependence (particularly in the horizontal axis) of eye dominance. Thus, both calibration and the subsequent determination of gaze locations must consider eye dominance as a function of gaze location and taking into account the wide variation among individuals for accurate (e.g., <2°) gaze determination.

In exemplary embodiments, the continuous tracking of a moving object about a pattern may be used to: 1) determine parameters for the mapping scheme (described above) employed during calibration, and 2) determine the location of any transition zone(s) where dominance shifts from one eye to the other. The following of a focal point as it moves about one or more of a wide range of patterns such as a circle, rectangle, series of line segments, polygon, or polygon with rounded edges may be used.

Figure 32:
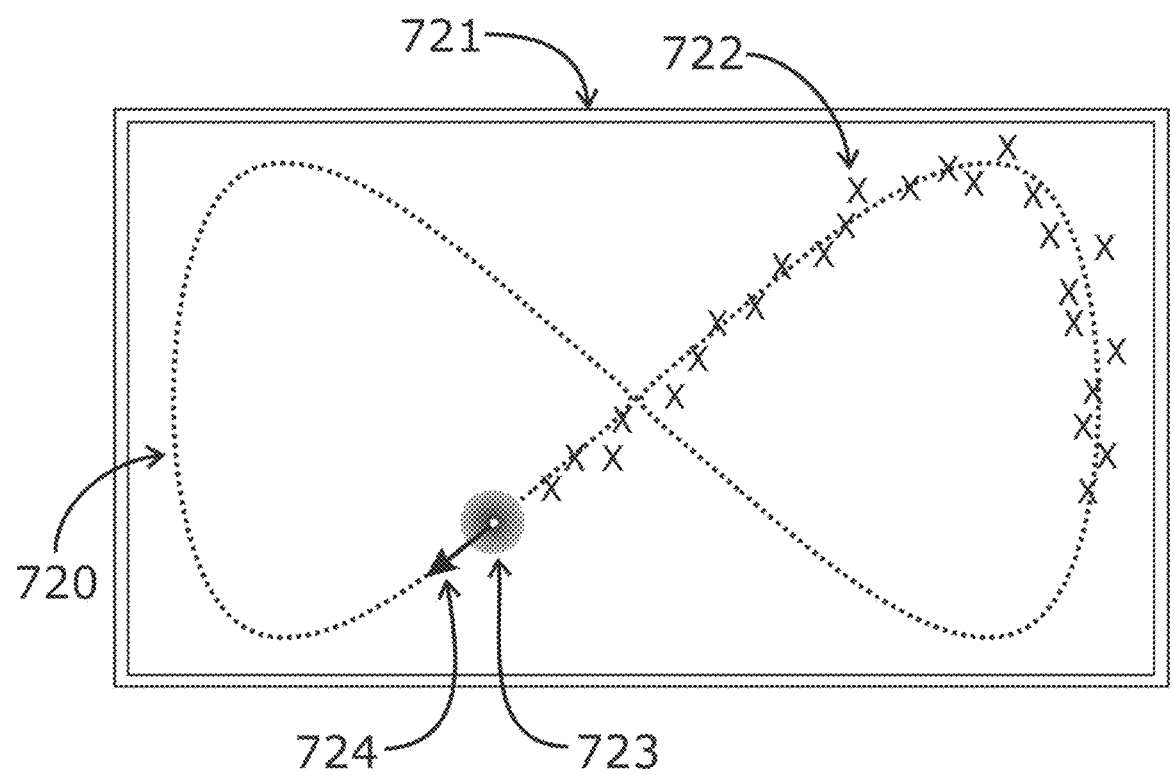
FIG. 32 illustrates the continuous tracking of a focal point during calibration.

FIG. 32 illustrates the tracking of a focal point within the pattern of an "infinity symbol" (also known as a "limniscate" and referred to by some as a "sideways 8"). The path of the limniscate, represented by a dashed line 720 in FIG. 32, takes advantage of a generally wider range of eye movements available in the horizontal direction by placing more points within the horizontal far reaches of the display 721. In this example, the device wearer is instructed to follow the central region of a moving disc 723 that includes a high-contrast focal spot. The focal spot helps focus user attention to the very center of the moving disc 723. The device wearer follows (represented by arrow 724) the limniscate 720 throughout one or more repetitions of the pattern. The velocity of movement of the focal spot may be a pre-determined constant, or may vary as a function of time and/or location, for example, to permit slower eye movements in the far reaches of the display 721.

Curve fitting may be used to determine "best fit" parameters between a mapping function that transforms measured eye position (e.g., center of pupil or limbus) to the position on the display. For example, mapping functions may be linear expressions with a restricted range of rotation, polynomial expressions, etc. Curve fitting using techniques such as gradient-descent are well-known in the art.

During calibration, eye tracking proceeds as a function of time where the coordinates of the displayed pattern (x, y) may be expressed as:

$$(x,y)=f(t)$$

where f(t) is an expression defining the tracking pattern (e.g., limniscate, circle, rectangle). Much like the tracking of an object within an expanding region described above, the velocity of the target is restricted such that the target is followed using smooth pursuit eye movements, a series of short tracking saccadic eye movements, or a combination of the two.

Regardless of the tracking pattern and velocity, there is a delay between the time when a tracking target (723 in FIG. 32) is displayed and the time when a visual response of the device user may be registered. This delay, $\Delta t$, not only includes any hardware and software delays in acquiring eye position coordinates $(x_i,y_i)$ from images, but also includes "biological" delays in transmitting signals detected on the retina to the visual cortex via the optic nerve, the cognition time of the device wearer to process visual information, the time to send motor signals to the muscles that move the eye(s), and the time for muscles to develop force and generate eye movement that can subsequently be detected. Target eye position coordinates, $(x_t,y_t)$, can be expressed as:

$$(x_t,y_t)=f(t-\Delta t)$$

Thus, in addition to best-fit parameters used to map eye position measurements into gaze locations, the system delay, $\Delta t$, is initially unknown. In exemplary embodiments, in order to perform an initial curve-fit, $\Delta t$ may assigned an initial value (e.g., 30 milliseconds) that is based on a system average. This allows a curve-fit to be performed between acquired eye position coordinates $(x_i,y_i)$ and initial target coordinates, $(x_t,y_t)$. If desired, mapped eye position coordinates $(x_i,y_i)$ may be superimposed on the tracking pattern display as illustrated in FIG. 32 where the locations of exemplary mapped coordinates are represented by X's 722.

By calculating the cross-covariance between the displayed target pattern (x, y) and corresponding mapped coordinates, the system delay, $\Delta t$, can be measured from the (averaged, if desired) peak in the cross-covariance. At this point, outlier mapped gaze positions (e.g., those greater than twice the standard deviation of all measurements from the displayed target) may be discarded. This elimination process takes into account both time (i.e., $f(t-\Delta t)$) and distance between target and mapped gaze coordinates. A process of re-determining the parameters of a best-fit and re-establishing the system delay with outliers discarded may be repeated any number of times to further eliminate outlying measurements that, for example, may have been due to eye blinks, inaccurate eye tracking measurements and/or inattention on the part of the device wearer.

In exemplary embodiments, the process just described may be performed separately for the left and right eyes. To ensure that only a left or right eye is used, the display of the target may be projected onto only one eye at a time or visibility by the non-target eye may be blocked. The net result is a set of calibration parameters (and $\Delta t$'s) to separately map left and right eyes into display coordinates.

In order to ensure accurate calibration, tracking patterns may be repeated any number of times to acquire additional data points for curve-fitting. The repetition of target patterns may depend on the accuracy of the curve fit (e.g., as measured by a correlation coefficient) and/or the number of discarded outliers.

In additional exemplary embodiments, the target may subsequently be projected onto both eyes simultaneously. As this is performed, a determination may be made whether the eye position and calibration for the left eye, or the eye position and calibration for the right eye (also taking into account $\Delta t$) better corresponds with the displayed target pattern. Based on such comparisons, a visual "map" can be constructed that shows eye dominance within different regions of a display.

Figure 33:
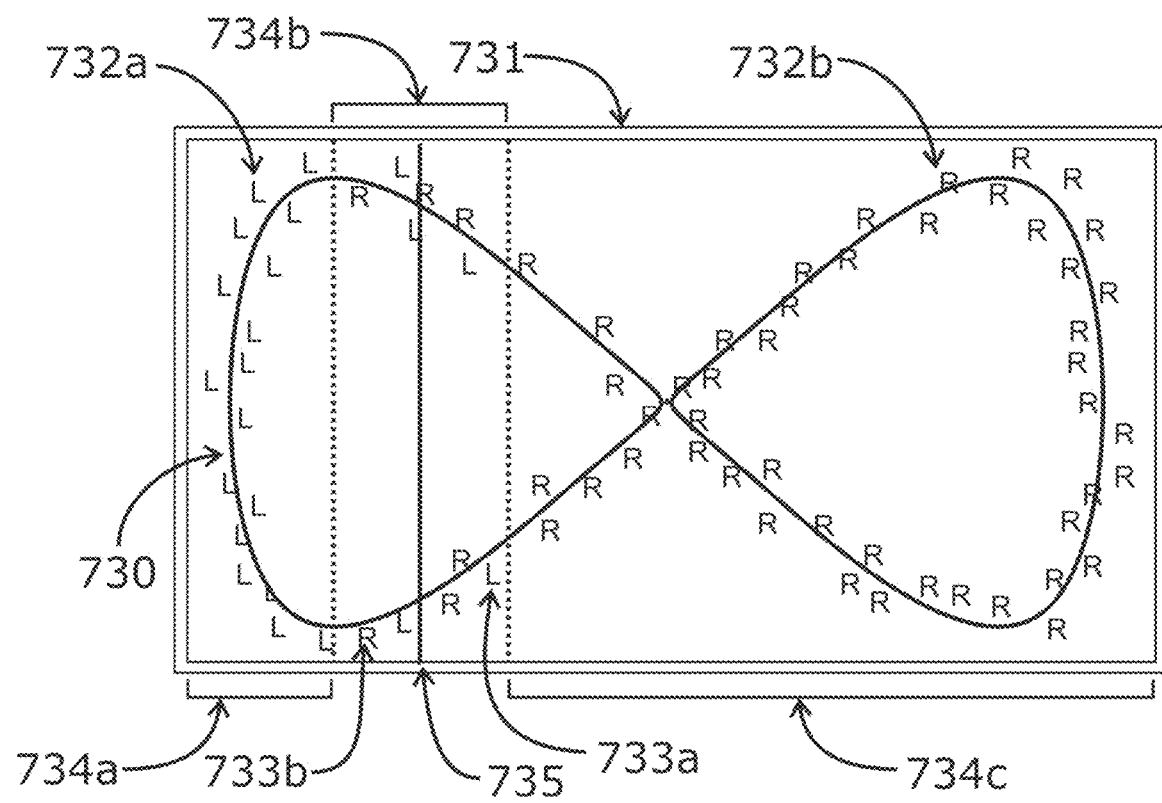
FIG. 33 illustrates a process to form a dominant eye spatial map.

FIG. 33 illustrates an example of a visual dominance map where the location of a gaze projection by the left eye that better matches its corresponding location within the target pattern 730 is represented by an "L" 732a. Each gaze projection by the right eye that better matches its corresponding target location 730 on the display 731 is represented by an "R" 732b. In FIG. 33 there are three (3) distinct regions where:
1. left eye measurements and calibration more accurately map target locations 734a,
2. right eye measurements and calibration more accurately map target locations 734c, and
3. a "transition zone" where eye dominance appears mixed 734b.

The identification of such eye-dominance regions allows mapping operations to be dependent on eye location. If a location maps to a left-eye zone, then left-eye calibration may be used. If a location maps to a right-eye zone, then right-eye calibration may be used. Although not illustrated in FIG. 33, vertical eye position may also be taken into account when determining different zones. In addition, there is some empirical evidence that the characteristics of viewed object (e.g., size, luminance) may affect eye dominance. In situations where these are known (e.g., when controlled) within a display, these display characteristics may also be considered when determining whether left- or right-eye calibration should be used. These considerations may be particularly important when designing and displaying activation targets, described elsewhere herein.

As illustrated in FIG. 33, the choice of a left- or right-eye calibration process may not be immediately evident within a transition zone. In exemplary embodiments, a number of strategies may be used within any transition zones:
1. As illustrated in FIG. 33, a horizontal position (i.e., vertical line 735) may be computed that minimizes the total number of "L" representations 733a to the right of the line and "R" representations 733b to the left of the line. This position is used as a threshold to separate left-versus right-eye dominance.
2. If left- and right-eye selection targets are within the transition zone, then both left- and right-eye mapping may be calculated. If either results in a selection, then the selected action may be performed. This scheme may result in a slight increase in inadvertent activations.
3. An average position may be used based on both left- and right-eye calibrations.
4. A weighted average may be used where the weighting of left-versus right-calibrated location is dependent on the distribution of "L" and "R" locations during calibration in the regions pointed to by left-eye and right-eye mapping.

Eye Gaze Calibration Incorporating a User's Visual Axis

It is well known in the art that the so-called "optical axis" differs from the "visual axis." The optical axis is a line in which light goes through the center of the cornea, pupil, and lens to reach the back wall of the eye containing the retina without bending. Because the macula and fovea, where vision (and subsequently cognition) is centered, are displaced on average 5° nasally from this optical axis, it is essential to distinguish the visual axis from the optical axis of an individual for accurate gaze tracking.

A traditional method for determining the visual axis involves aligning a rod (where the same principles can be demonstrated simply using a pencil held at arm's length) in the visual field of an individual with one eye open so that the back end of the rod cannot be viewed because it is obscured (radially symmetrically) by the front face of the rod. When purposefully positioned in this orientation, the center axis of the rod points along the visual axis of the observer. The process may be repeated in any number of directions.

In exemplary embodiments, a display-based method that uses some of the same principles as the traditional, rod-based technique just described for determining a visual axis, involves aligning near-field and far-field discs (or any other shape) in regions of the visual field. A device wearer is instructed to align objects such that the far-field object is maximally obscured by the near-field object. Although not an essential component of this technique, the near-field and far-field objects may be assigned different colors. The device wearer may then be instructed to uniformly "hide" or obscure (in a radially symmetric fashion) as much of the color of the far-field object as possible using the near-field object.

In an augmented reality (AR) situation, the near-field object may be a substantially opaque disc or other shape projected onto the AR display. The far-field object may be a virtual object displayed on a screen (e.g., mobile device, tablet, monitor) or a real-world object. In the case of far-field virtual objects on a display, either the near-field AR object or the far-field virtual object may be moved during the alignment process. The process may then be repeated at distinct locations (i.e., viewing directions) to generate additional alignments for multiple measures of the visual axis.

In the case of far-field real-world objects, the object may be intentionally added to the environment of the device wearer for calibration, or the object may be a naturally occurring shape or portion of an object that can be recognized in the environment of the device wearer. Examples of the former include uniquely colored paper discs or a pattern generated by one or more LED light-sources affixed with adhesive to the corners of a display monitor. An example of the latter is the "L-shaped" (bezel) regions at the four (4) corners of most display devices where the shape may be determined based on images using an outward-facing or so-called "scene" camera, or a database of templates of such shapes.

Figure 34:
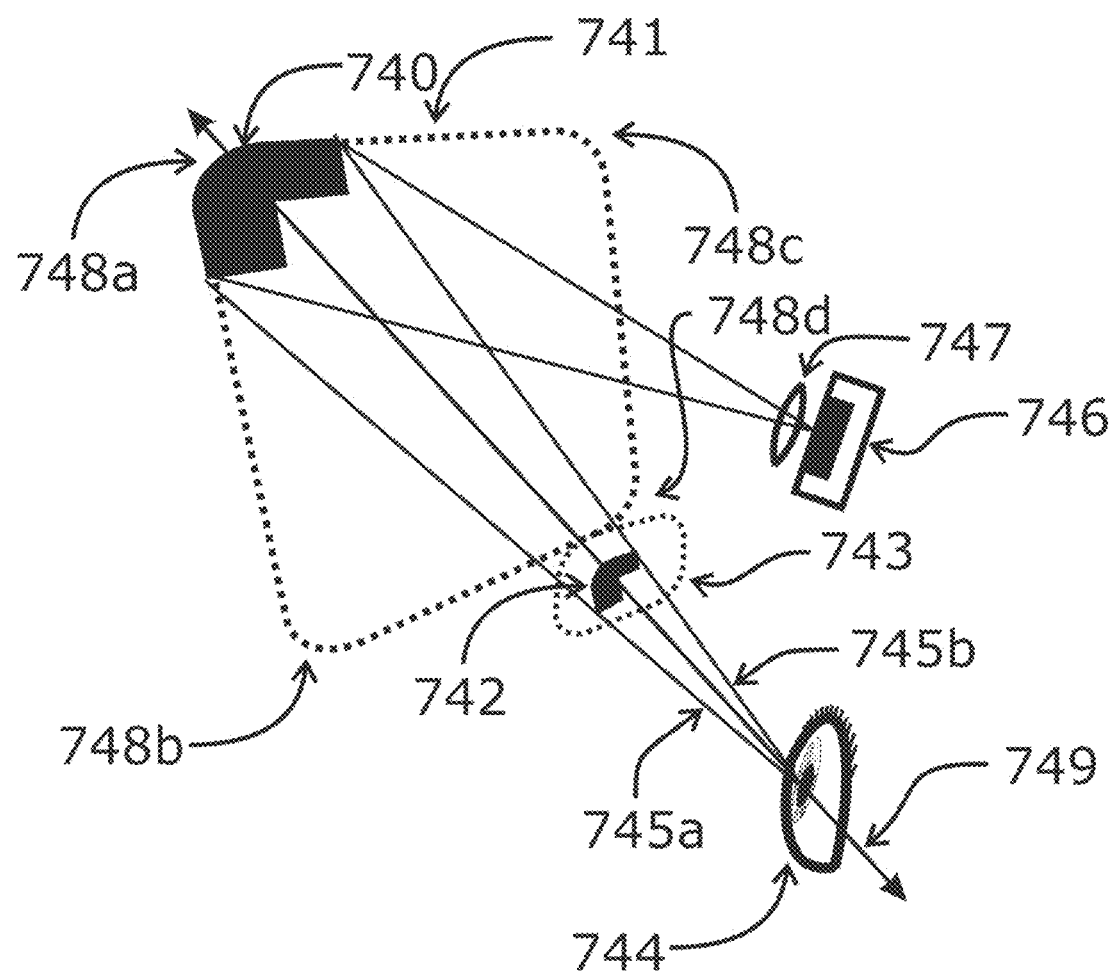
FIG. 34 illustrates a process to determine a user's visual axis.

FIG. 34 shows an example in which the real-world, four (4) corners 748a, 748b, 748c, 748d of a display device, such as a mobile phone or tablet 741, are used as a visual axis alignment tool. The structure of a corner 740 of the display device 741 may be determined from 1) a database of templates based on mechanical designs of such devices, 2) images acquired using a scene camera 746 and optics 747 to visualize the environment of the device wearer, or 3) a combination of the two sources where the database may provide exact dimensions of objects (or portions of objects) recognized within scene camera images.

Once the shape of the alignment object or portion of an object 740 has been determined, the shape is re-constructed as a virtual object 742 within the augmented reality display 743. The device wearer is then instructed to move either the display 741 or the location of his/her eye to a position where the virtual object 742 aligns to maximally obscure the far-field object 744. At this head/eye position 744 (i.e., relative to the far-field object 740), the edges of the near-field 742 and far-field 740 are perfectly aligned 745a, 745b as viewed along the visual axis of the eye 744. The center of the far-field object 740 and its corresponding center location in the near-field object 742 define a line 749 in 3-dimensional space that crosses the center of the visual axis within the device wearer's eye 744.

In additional embodiments, the device wearer may be instructed further to move closer to and/or further away from the far field object 740 to make the near-field object 742 just overlay (i.e., appear to be exactly the same size as) the far-field object 740. If the dimensions of the far-field object 740 are known (e.g., based on a database of objects) then, since the dimensions of the near-field object 742 are controlled (and thus known) by the device, the distance between the far-field object 740 and the eye's visual center (i.e., the intersections of 745a, 745b and 749) can be computed using trigonometry. This distance allows a single point along the line of the optical axis 749 to be assigned the center of the visual field for the selected eye.

In further embodiments, the visual axis alignment process may be repeated using each of the four corners 748a, 748b, 748c, 748d (where the display of virtual references within the headset are rotated 90°, 180°, and 270°) or any number of other far-field reference locations. The intersections of the visual axes defined by each of these measures may be used to identify (e.g., if the method just described to determine distance to the center of the visual field is not utilized) or further (e.g., more accurately) define the location of the visual axis and/or visual center for a particular device user.

In yet further embodiments, the location of one or more identifiable points on the device wearer's eye (e.g., center of the pupil, center of the limbus, identifiable blood vessel on the sclera) may be determined relative to the center of the newly-determined visual axis. The difference between the visual axis and such identifiable points may subsequently be considered a "visual axis offset." This permits the device to subsequently compute the visual axis of the device wearer (i.e., where the device wearer is "looking") based solely on measurements of the one or more identifiable points on the eye.

In additional embodiments, the far-field object may be a virtual object (e.g., disc, polygon) displayed on a screen. In this case, communication may be used between the AR or MR (i.e., mixed reality) headwear and the far-field display device to control the display characteristics (e.g., size, location) of the far-field, virtual object. The same strategy as depicted in FIG. 34 may be used to determine an individual's visual axis and center. During this calibration process, the size(s), location(s), orientation(s) and other characteristics of the virtual, far-field object may be controlled to further aid during the alignment process by the device wearer.

In further embodiments, the visual center may be determined for each eye by repeating the above process by opening an initially closed eye and closing the eye that was open. In setups where video streams are projected onto each eye separately, the video stream to one eye may be turned off or held stationary while assessments are performed using the other eye. Including measures of the visual axes of both eyes in gaze calculations may increase gaze accuracy, particularly those involving vergence.

The process to measure visual axes may be further repeated with both eyes open. In this case, in some viewing directions and at some viewing distances, measurements may be assigned to a dominant eye, as described above (where there is variation among individuals). In other viewing directions (generally looking straight forward) and distances (generally away from the head), the so-called "egocenter" may be determined. The egocenter is a reference location, usually located mid-way between both eyes, from which distances and directions are cognitively perceived when viewing an observer's environment. In some applications (e.g., first-person shooter and other forms of gaming, driving simulation, education of infants), knowledge and use of the egocenter may aid in making a virtual environment more realistic. Measures and/or display of distances and directions may subsequently be made relative to the device user's egocenter. Such measures may more accurately represent and/or quantify the cognitive processes involved in perception by the device wearer.

In the case of virtual reality (VR) headsets and AR headsets in which both near- and far-field alignment objects are included within a single display, additional considerations must be made that are dependent on the exact modes of image projection to utilize the methods just described to determine the visual axis of a device wearer.

In the case of VR or AR headsets that are capable of projecting to only one plane or "depth" at a time, then the visual axis alignment process may be performed by switching the perceived depth in alternate (or any series of) projected image frames. The display of differing images in rapid succession is similar to the technique of "interlacing," for example, used in traditional/legacy television sets. Alignment, similar to that shown in FIG. 34, is performed with a near-field object displayed in one plane and a far-field object displayed within a separate (interlaced) frame.

In VR and AR headsets that utilize a so-called "light field" to direct light as a vector from points in space, both near- and far-field objects may be projected within the same frames. In this setup, alignment may include moving either the near-field or far-field object so that the distant object appears maximally (and radially uniformly) blocked.

In additional embodiments, when both near- and far-field objects are virtual, then any of a number of methods may be used to move one object or the other (or both, if desired) during the alignment process. This can be performed in any of a variety of ways:

- If the device wearer is near a keyboard, repeated pressing of directional arrows (or any other set of keys) to indicate movement left, right, up, or down may be performed.
- Touch-sensitive areas on the eyewear or headwear device (or any other touch-sensitive surface such as a tablet or mobile phone) may be assigned movement functions (i.e., left, right, up, or down).
- The device wearer may "nudge" an object using head movements (i.e., rotation, tilt, or both). If desired, the degree of movement may be proportional to the degree of head movement (measured, for example, using an accelerometer, or scene camera movement).
- Audio commands, such as vocalizing "left", "right", "up", or "down", may be used to align near- and/or far-field objects.

In additional embodiments, in order to speed the alignment process, the virtual movement generated by each command (i.e., left, right, up, or down) may be adjusted dynamically. Initial commands cause coarse movements of near- or far-field objects. Repeated movements in the same direction (e.g., "right," "right") do not affect the size of the movement. However, any movement in an opposite direction causes the size of the movement (i.e., so-called "increment") to decrease (e.g., cut in half). As the device wearer converges toward optimum alignment, the progressively smaller increments allow more precise control. This technique has similarities with the "successive approximation" method of analog-to-digital conversion. The size of the increment may be tracked and adjusted separately during calibration in horizontal and vertical axes.

High Resolution Rendering of High-Relevancy Objects (HROs)

A technique that combines gaze tracking with highest resolution imagery projected in a central display region being viewed by an observer is well-known in the art. Bandwidth to generate the overall user display is reduced by allowing lower-resolution imagery to be projected in regions not being directly viewed by the observer. In most implementations, regions within the peripheral visual field are displayed with lower spatial resolution and/or reduced projection of fine detail within displayed objects. In some implementations, there is an intermediate-resolution transition zone between the high-resolution centrally viewed region and the lower-resolution peripheral regions of a scene. Bandwidth savings of up to 80% have been realized.

This technique is commonly referred to as "foveated rendering", "foveated imagery", or "foveated graphics" in the art. The term "foveated" arises as a result of generated imagery aligning, at least in some respects, with the physiology of the human visual system. Biologically, the fovea is a small region of the retina where visual acuity is the highest. Although the fovea is responsible for detecting imagery from only within an approximately 2° region of the overall visual field, approximately half of the nerve fibers in the optic nerve bundle that transmits information to the brain, carry information from the fovea.

In a number of situations, a low spatial resolution rendering of some objects within the peripheral view of an observer may compromise the visual experience and decision-making capabilities of an observer. In exemplary embodiments, it is advantageous to render high-relevancy objects (HROs) using high spatial resolution display techniques, particularly when they are within the parafoveal and even when they are within the peripheral view of an observer. By selective high-resolution rendering of one or more such regions associated with HROs, the majority of overall bandwidth savings may continue to be realized, but not at the expense of effectively interacting with such objects.

Although the parafoveal and peripheral visual system are weak in some aspects of image processing (e.g., discerning fine detail, color discrimination), the ability to determine spatial positions (including movements) or flicker of objects is particularly strong. The ability to determine positions within parafoveal and peripheral views is well-demonstrated, for example, during activities such as juggling and avoiding incoming projectiles.

There are a number of conditions (e.g., within virtual reality, augmented reality, mixed reality, or remote display systems), when, in particular, the location of HROs is important during human-machine interactions. For example, during eye signaling, the general region of an activation icon may be remembered by a device user. The exact location may then be detected using parafoveal or peripheral vision (often absent the perception of fine detail). In most cases, it feels "comfortable" to perform a saccadic eye movement directly toward such an object or activation target within a parafoveal or peripheral view based, at least in part, on spatial memory (where locations may, in turn, be associated with particular functions). Saccading towards such targets is a foundational element of the eye-signal language.

Within exemplary embodiments, such HROs may be displayed at high resolution. If initially displayed at lower resolution, saccading toward such HROs and subsequently switching to a higher resolution (e.g., as a result of being within the new foveal view) may cause a rapid change in the appearance of the HRO, naturally attracting one or more exploratory or "startle" eye movements that may disrupt purposeful movements associated with the eye-signalling language. Maintaining a high-resolution display of HROs avoids this situation.

A subsequent display of newly revealed additional selectable icons (or other HROs) may be displayed using high resolution within the new peripheral view. The spatial locations of these new icons may be discerned with saccadic movements to directly view each of them. Repeating the same strategy, experienced device users in particular feel comfortable to saccade directly toward a specific (i.e., purposefully selected by the user) newly revealed target within the parafoveal or peripheral visual fields. These one or more saccadic eye movements may, if desired, be performed any number of times in the absence of full perception within the foveal regions of the user's eye(s).

Within additional embodiments, the introduction of new potential target objects may be performed using one or more techniques to introduce the one or more objects without attracting attention of the user (i.e., making the object(s) "invisibly visible"). As previously described, this may be performed by introducing object(s) during one or more periods when the user is functionally blind (e.g., during blinks and/or one or more saccades). Other strategies (used alone or in combination) to introduce one or more "invisibly visible" objects include gradually changing object resolution, detail, color content, luminance, size, transparency and/or contrast compared with background. Some aspects of these methods use principles associated with "change blindness," where slow changes on the appearance of an object or background go unnoticed to an observer.

In further embodiments, potential objects may be carefully moved about without attracting inadvertent attention of the user. As previously described, a substantial amount (e.g., up to 2°) of object movement may be tolerated following a period of saccadic blindness. This is known as the "blank effect" and is thought to suppress the potential for perception of movement when a saccade does not perfectly land on its expected target location. Further movement of one or more potential target objects may then be introduced in fashion designed not to startle or attract exploratory user eye movements. Such movement may be slow (using components of "change blindness") and/or designed in a fashion not to attract attention in a particular direction due to one or more objects that may be one or more of particularly high resolution, bright, large, containing detailed features, opaque, contrasting color(s), or similar visual attributes. Along similar lines, exploratory or startle eye movements may be avoided by ensuring that the timing of object movements or changes in visual attributes is uniform, such that one or more objects do not stand out (i.e., changes in one or more objects occurring before similar or corresponding changes in other objects).

Additional examples of HROs include, for example, friend or foe targets within first-person shooter games, objects that are being discussed during story-telling or conversation, and symbols or imagery (e.g., mathematical operations, flow diagrams, component parts, circuit diagrams, key facts) that represent concepts when making high-level decisions. It is helpful for a user to be aware of the presence of such objects (and what those objects might represent) without the necessity of simultaneously maintaining all symbols and/or imagery within a foveal view, or the need to repeatedly scan such objects within foveal views to ensure they are considered within short-term or working memory.

In further exemplary embodiments, the high-resolution rendering of HROs not only aids in the identification, mental association(s), and spatial localization of such non-foveal objects, but if there is a saccadic (or other form of head or eye) movement toward the HRO, then, as just described, the rendering properties of the region of the new center of focus remain largely unchanged. This avoids any startle or exploratory reflex (associated with the introduction of new visual features) and/or the cognitive processing associated with the introduction of new visual information (i.e., using the cognitive principle of being "familiar" described previously). Instead, if time is taken to perceive the object, then the object is perceived as unchanged from what was anticipated based on memory and the parafoveal or peripheral view of the observer prior to a saccade (and any number of subsequent corrective saccades).

There is some flexibility in the implementation of high resolution rendering of HROs. One or more schemes may be used, even within the same image. For example: 1) An arbitrarily shaped region representing the object form may be rendered in high resolution superimposed upon a lower-resolution background. 2) A rectangular region of the overall field-of-view that includes one or more HROs may be rendered in high resolution. 3) A circular region around one or more objects may be rendered in high resolution. In each of these cases, the degree of high-resolution rendering may (optionally) be a function of the distance from the current (i.e., foveal) view of the observer.

In some situations, it may be desirable to change the size of the high-resolution or so-called "foveal" region of the display. Biological variations in the size of an individual's fovea, generally in the range from 1° to 3°, may be used to assign a size of a central, high-resolution display region. It may also be advantageous to adjust the size of the high-resolution region during some applications or forms of eye-interaction. For example, during cognitive processes that require a number of distinct elements to be considered within an individual's working memory (e.g., high-level decision-making), those elements (or symbols representing such elements) may be displayed within an expanded "foveal" or high-resolution view. In contrast, during a gaming application involving rapid motion and/or "threat" objects arriving from different directions, the "foveal" or high-resolution view may be reduced in size to allow greater temporal resolution (i.e., a higher display frame rate) and/or a higher resolution rendering of specific objects (e.g., HROs).

As described above, terms such as "foveated rendering" are commonly used in the art to describe the varying of display resolution. Although the fovea is a structure within the retina with distinct anatomical features, from the perspective of a human-machine interface (HMI), the physiological (i.e., functional) region of the foveal area is actually the most relevant during vision and subsequent HMI. The term "perceptive field size" (PFS) has been used in the art to describe the region in and around the fovea that is used during perception.

Light intensity may vary the PFS of an individual. Thus, in exemplary embodiments, the size of the viewed, high-resolution (i.e., so-called "foveated") rendering region may be varied as a function of the amount of light reaching the retina. This light intensity may be determined from knowledge of what is being displayed in more highly controlled visual environments, such as VR displays. Alternatively or in addition, light in the vicinity of the eye may be measure using one or more photodiodes, phototransistors, or other light sensors, particularly when using AR or MR devices. Specific ranges of wavelengths (see below) may be selected using one or more optical filters.

More specifically, as the amount of light reaching the retina decreases, the PFS increases. Thus, the size of the region of high-resolution rendering may be increased to accommodate for this variation. Conversely, as light intensity increases, the PFS decreases, allowing the size of the region of high-resolution rendering to be decreased. Physiologically, this variation is consistent with the notion that there is a shift in vision that uses cones (that are relatively less light sensitive but encode color information) in high concentration within more central regions of the fovea when there is abundant light, to the more light-sensitive rods that are expressed with an increased density upon moving away from the central region of the fovea.

Even more specifically, wavelengths of light in the blue and green portion of the visible spectrum (i.e., with wavelengths in the range of approximately 400 to 550 nanometers) modulate the size of the perceptive field; whereas red light has a lesser or no influence on the size. Thus, in exemplary embodiments, high-resolution rendering within the central viewing region of a display may be controlled based on the presence/absence of light specifically in the blue-green portion of the visible spectrum.

In further embodiments, changes in the rendering of a central display region (i.e., based on the PFS) may also take into account the time required for the eye(s) to adapt to new lighting conditions. Adaptation of cones begins quickly, but may require up to a few minutes to fully adapt. The responses of rods take even longer, requiring up to 20-30 minutes to fully adapt. Thus, in exemplary embodiments, transitions to accommodate to a different lighting conditions may be performed gradually (i.e., compared with the high frame rates of a display) and progressively (e.g., to match the roughly exponential form of a light adaptation versus time curve) to correspond with the time course and magnitude of visual accommodation.

As described in greater detail elsewhere herein, shorter saccades (e.g., <5°) tend to undershoot intended target locations and longer saccades (e.g., <10°) tend to undershoot intended target locations. In further embodiments, these tendencies along with estimations of tracking errors may be used to structure the size and shape of (so-called "foveal") regions rendered in higher resolution on displays around intended target locations during eye movements.

For example, in addition to a region around an anticipated saccadic target landing location, an addition region that extends beyond the target area in the same direction as the saccade may be rendered in high resolution when a long saccade is detected. This extension may anticipate that one or more corrective saccades typically occur to make up the (generally about 20°) undershoot of a long saccade. Rendering such a region in high resolution as soon as a long saccade is detected, allows the user to view a high-resolution (so-called "foveal") image upon landing and during any subsequent corrective saccades. This avoids (sudden, distracting) changes in resolution in the region while the user progressively hones in on the intended target location.

Along similar lines, short saccades tend to overshoot intended target locations. Thus, in exemplary embodiments, in addition to rendering a target landing area in high resolution, an additional region in between the launch and landing locations (adjacent to the landing area) may be rendered in high resolution that takes into account the tendency to overshoot shorter saccades. In this way, re-rendering one or more regions is minimized in the area where one or more corrective saccades generally direct gaze position back to the intended landing location (in the general direction of the original saccadic launch location).

In further embodiments, size and/or shape of region of high resolution based on eye movement target locations may include a consideration of the degree of expected error in determining a gaze location or a predicted and/or measured landing location. A degree of error (or conversely, an indication of confidence) in a measure of gaze position may be estimated based on a number of factors including an overall measure of variance in gaze positions for a particular user and/or during recent usage (particularly when it is identified that a user is viewing a known object location), vibrational and other mechanical accelerations (described previously) that may be present within the headset and/or user's head region, uniformity and/or intensity of lighting, a degree of random (e.g., so-called "shot") noise within video images, the presence of obstructions (e.g., eye lashes) that might obscure eye tracking measurements, the presence of additional motions such as tremors and or oscillations of the eye, the occurrence of a blink, and a number of factors determined by one or more algorithmic approaches when identifying structures of the eye (e.g., the degree of match to a template).

Additionally, when predicting or projecting to landing locations, (spatial and temporal) errors based on velocity as well as any tendency toward non-ballistic velocity profiles of eye motion (that may vary among individuals) may be taken into account.

In exemplary embodiments, the size and/or shape of a displayed region rendered in high resolution may be adjusted dynamically based on estimates of an expected degree of error in gaze measurements and/or predicted (i.e., based on velocity) landing locations. Generally, if estimates of error are increased, then the size of region of higher resolution may be increased to accommodate the increased uncertainty in gaze location. In this way, there is a greater assurance that the user actually views a high-resolution rendering of the display.

Along similar lines, based on the velocity of recent movement(s) and/or any suspected noise in gaze measures in a preferential direction (e.g., near the edge of a display), the shape of a region may be adjusted based on the direction of apparent movement(s), size of movement(s), and/or degree and distribution of noise. For example, if a noise measure and or uncertainty is generally increased near the edge of a display, then the shape of the high-resolution region may be expanded in the direction toward the edge of the display to accommodate the increased noise/uncertainty.

Within additional exemplary embodiments, an alternative or additional method to reduce bandwidth within selected display regions (e.g., not HROs and/or within a foveal view) involves reducing the color content of such regions. Color appearance of images is frequently described in a number of different ways including those methods involving the use of terms such as hue, tint, colorfulness, chroma, saturation, and luminance; in addition to the foundation display of red, green and blue (i.e., RGB) intensities. Reducing the color content may involve reducing the overall range (i.e., from darkest to brightest) of one or more displayable colors and/or reducing the resolution (i.e., reducing the number of selectable intensities for a particular color). Alternatively, within schemes in which ratios or relative intensities of one color compared to others are computed (and transmitted), the range and/or resolution of such relative intensities may be reduced. By reducing color range and/or resolution, the number of bits required to represent each color (within a pixel or group of pixels) is reduced, thereby reducing the bandwidth required to transmit such imagery.

In many respects, embodiments involving a reduction in the color content of non-foveal display regions is biomimetic. As mentioned above, visual systems are generally poor at discerning both object details and object colors within the peripheral visual field. Thus, a scheme to reduce bandwidth by reducing color content and/or detail within parafoveal and/or peripheral regions aligns with the capabilities for processing such images by the human visual system.

Within additional embodiments, the relevancy of an object may be determined in a number of ways: 1) In the case of a typical software application, an application developer may assign a relevancy to different objects within any displayed screen. Menu selections involved with eye signaling, images of key characters during story-telling, headings and page numbers within a body of text, hyperlinks, and incoming text are examples of objects that might be assigned high relevancy. 2) Based on scenes comprised of any combination of real and virtual objects, the relevancy of particular objects within the scene may be determined algorithmically based on object identification using image recognition techniques that are well-known in the art. For example, all faces or a particular face may be displayed using high resolution. Similarly, an icon "alerting" (i.e., visually calling out or shouting to) a user may be displayed in high resolution in anticipation of attracting at least a visual glance. 3) Machine-based recognition of specific activities performed by one or more objects may trigger a high relevancy state. For example, if a face within the environment is identified as being angry or is associated with the process of talking, then its relevancy may be increased. 4) Neural net and other forms of machine learning approaches may be used to determine objects that are typically important (e.g., by repeated selection) to a particular user. For example, if a user typically reviews baseball scores at certain times of the day, then machine learning approaches may result in such scores being displayed in high resolution as they are updated.

In additional embodiments, relevancy may be modulated by any number of conditions that might be assigned to particular objects. For example, sports scores may be relevant when first announced, but decrease in relevancy with time. Images regarding particular sports may be assigned high relevancy during certain times of the year. Public transit schedules and/or announcements might be assigned increased relevancy at certain time of the day and/or certain days of the week. Calendar events may be relevant for a selected time prior to the scheduled event.

Objects that are displayed as being close to and/or moving toward the user may be assigned an increased relevancy. Objects within a particular direction compared with instantaneous gaze location may be assigned higher relevance. For example, when reading using a language in which letters/symbols are generally arranged left-to-right and top-to-bottom (e.g., English, French, German), letters and words that are positioned to the right of and/or below a gaze location may be displayed with increased resolution in anticipation of gaze being directed in the sequence in which text and/or objects are viewed.

In some cases, absolute position (i.e., relative to a display) may be one determinant of relevancy. Potential targets for purposeful, memory-guided saccadic eye movement are a particularly useful class within this category. For example, within the eye-signal language, one or more activation targets and/or selectable objects may appear at the same location(s) within a given application or throughout most applications. As potential targets, such potential HRO targets may be displayed with enhanced spatial and/or color resolution.

Relevancy of objects may be graded (i.e., assigned a score within a continuous spectrum). If a large number of objects with high relevancy are to be displayed simultaneously, then those with lesser relevancy scores (but still within the high relevancy bracket) may, at least temporarily, be displayed with reduced resolution in order to stay within an available bandwidth.

Bandwidth reductions may be used synergistically with other strategies to reduce overall processing requirements by one or more processing units and/or transmission devices, along with resultant control of power consumption. Such strategies may additionally reduce unwanted heating and extend battery life during mobile applications.

During times when a display is not required, such as periods (described elsewhere herein) when a user is functionally blind (e.g., during blink suppression or saccadic suppression), displays may (temporarily) not be updated and/or some display/processing components may even be electronically turned off. During these times, transmission may pause or, alternatively, the transmission of display information may continue to occur in anticipation of needs at the time when the user returns from a functional blindness state to full vision. For example, the display of high-resolution central (foveal) views may be temporarily suspended while generally static (e.g., background) and/or peripheral regions of a display region may be updated during such times of functional blindness. Such schemes may make maximal use of available time and bandwidth.

Inclusion of Object Saliency to Determine a User's Focus of Attention

Physiologically, one of the first steps in the processing of visual information in humans occurs at the level of ganglionic cells within the retina. These cells are arranged within so-called "center-surround receptive field" patterns where neurons fire when there is a difference in light hitting photoreceptors within a central region versus an annular surrounding region. The net result of this arrangement is the detection of the locations of edges (i.e., spatial gradients that exceed predetermined levels) that are subsequently transmitted to the brain.

The fact that the brain primarily uses edges to identify an object is evidence that different regions within the overall body of a viewed object receive differing degrees of visual attention. Regions where there is high contrast in luminance and/or color variation generally receive the most visual attention. Consequently, focus of an observer is often centered upon such regions of high contrast that are not necessarily the geometric center of the object. This has led to the construction and use of so-called "saliency maps" that empirically identify locations most frequently viewed by an observer relative to one or more object features or reference location(s) (e.g., object center).

The "saliency" of an object (or portion of an object) is not solely determined by the physical features of the object. Saliency is dependent on the (time-varying in some cases) interests of an observer. For example, regions about the eyes within almost any facial form (human or other animal) is frequently viewed as a high-saliency region. In some cases, it is possible for an observer to "learn" to influence the saliency of an object or portion(s) of an object. For example, repeatedly viewing an object that might initially startle an individual (or produce some other emotional reaction) may cause the viewer to eventually learn to reduce overall saliency as the object and its features become more familiar.

As a consequence of saliency, some features within an object may be viewed more frequently than others. As a result of this, any form of "averaging" or other statistical means to determine a gaze focus and/or object being viewed based on one or more measurements must take into account such preferred viewing directions/locations. Typically, averaging a series of spatial measurement assumes some form of radially symmetric (e.g., Gaussian) distribution of errors relative to some reference location. However, if there are preferred viewing locations within one or more objects, then this assumption (i.e., radial symmetry) is not generally met, leading to the notion of a so-called "probability density function" (PDF) for the statistical handling of multiple measurements.

In exemplary embodiments, an assumed (based, for example, on high-contrast regions of an object) or empirically measured saliency map may be used to determine a PDF associated with a particular displayed object. Once a predicted or measured PDF is determined, multiple gaze location measurements may be combined (e.g., using weighted averaging) in a manner that takes into account the individual PDF associated with each object. Weight factors are computed based on spatial distributions with the PDF.

Combined (e.g., weighted average) measures of gaze locations generally provide higher confidence and spatial accuracy within estimates of user attention compared with individual gaze measurements. Such measures are increasing viable and valuable as camera frame rates (i.e., corresponding to the maximum number of gaze measurements that can be acquired per unit of time) within modern eye tracking systems increase. Combined gaze estimates are particularly valuable when they are used to determine if user attention (e.g., a saccadic landing) is located within a predetermined distance from the center (or any other reference location) of a particular object, thereby indicating a selection and/or initiating an action related to the selected object (and/or other parameters). The use of combined measures that consider saliency and resultant PDFs leads to greater accuracy and consistency in determining objects being viewed and/or selected within the eye signal language (and conversely, a reduction in inadvertent activations).

Figure 35:
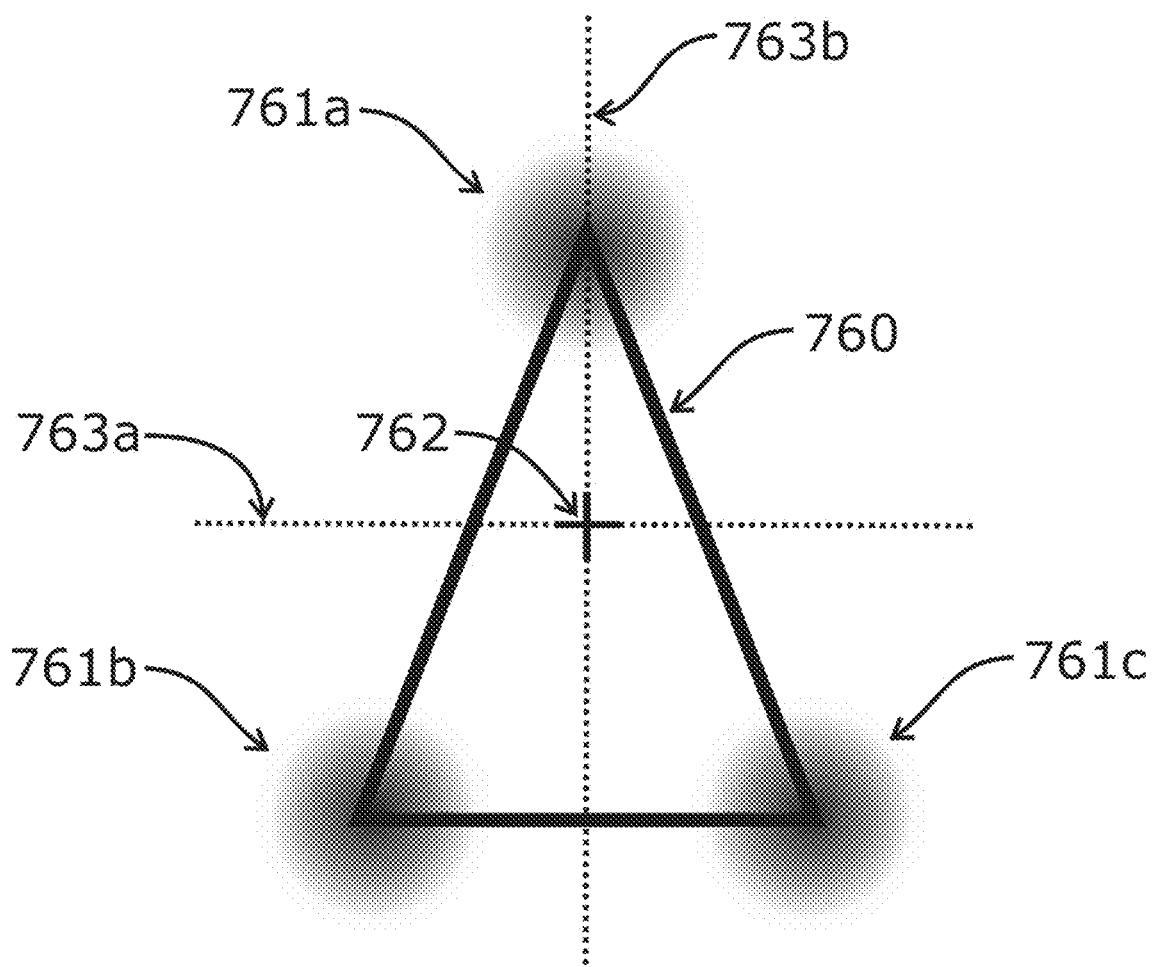
FIG. 35 illustrates an expected saliency map for an object in the shape of an isosceles triangle.

FIG. 35 shows an example of an expected saliency map for an object 760. The exemplary object consists of a simple, isosceles triangle 760. Focal points, where saliency is presumed to be the highest are located where the triangle 760 sides intersect where, in the saliency map illustrated in FIG. 35, the degree of saliency is represented by greyscale levels 761a, 761b, 761c (dark representing highest saliency regions). The geometric center of the object (i.e., the isosceles triangle) 760 is indicated by a crosshair 762.

The saliency map 761a, 761b, 761c contains equal regions on left versus right sides of a vertical axis 763b drawn as a dashed line through the object center 762. Thus, gaze measurements in the horizontal axis may be weighted equally when determining a combined horizontal gaze position. However, there are an increased number of salient features 761b, 761c below compared with above 761a a horizontal axis 763a drawn as a dashed line through the object center 762. Thus, it would be expected that more measurements of gaze by an observer would be made below the geometric center of the object 762 compared with above.

In the simple case shown in FIG. 35, there are twice as many salient regions below the central horizontal axis 762a compared with above the axis 763a. An observer viewing the object would be twice as likely to initially target below the object's geometric center 762 and/or to subsequently observe object features below the horizontal center line 763a (including during microsaccades, tremors, etc.). Thus, it would be expected that each measure above the horizontal axis 763a should be weighted as if twice as many observations were made above the axis 763a compared with below. With this weighting and assuming that all other sources of error are random, the resultant weighted average of a large number of gaze measurements converges to the true geometric center of the object 762.

Eye-Signal Selection of Regions and Clusters

A fundamental component found in many HMI (human-machine interface) systems involves the ability to specify and interact with clusters or groups of objects. Examples of such objects include collections of data files, applications, images, icons representing functions, names, addresses, phone numbers, words within text, hyperlinks, videos, audio recordings, surfaces, and the like. Within present-days systems, typical screen-based GUIs (graphical user interfaces) handle the grouping of clusters by allowing a user to specify (e.g., using a touch screen or computer mouse) one or more generally rectangular regions on a screen that include representations of desired objects within a cluster. Operations may then, for example, be performed on all of the objects or functions within the cluster simultaneously.

A challenge during eye signaling arises due to the inherent "point-to-point" nature of rapid, saccadic eye movements, as well as the fact that viewable items (i.e., targets) need to be provided for the eyes to land on during each movement. This makes it difficult for the eye-movements of a user to identify a specific and arbitrarily sized region without a GUI strategy that takes into account the physiology of eye movements.

In exemplary embodiments, clusters of objects on a display may be selected by considering an identifiable sequence of saccadic eye movements. All objects within the area specified by the saccadic sequence are included as a portion of the selection. Multiple areas may be selected/appended sequentially to encompass any number of objects within any size or shape of regions.

Within the eye-signal language, a corner of a selectable region may be specified by a saccadic eye movement from the location of the corner to an "area selection" target. Generally, an area to be selected is rectangular; however other selection shapes are possible, for example, when selecting multiple elements from a substantially 1-dimensional list of elements. The "area selection" target is not associated with any particular function other than the selection of one boundary of a region.

There may be variants in specific sequences of eye movements used to specify an area; however, essential elements of the such eye movement sequences include: 1) the ability to specify the two (non-adjacent) corners of a rectangular area using two saccadic eye movements, 2) the ability to optionally add additional areas to the cluster with additional pairs of eye movements, 3) the ability to correct or "forget" an inadvertent selection of one or more regions, and 4) the ability to subsequently perform a selectable action on the objects (including functions represented by the objects) within the one or more selected regions.

The action of displaying an "area selection" target may be embedded within a so-called "go" selection sequence (to minimize the number of activation regions). However, in many applications it may be more user-friendly and efficient to have the "area selection" target available at all (or at least most) times. In addition, in cases where there may be large areas of a display where there are few objects, it may be helpful to superimpose or include within a background, graphic cues such as a line grid or matrix of dots to provide visual "rest areas" where gaze may land in the absence of other viewable objects.

Figure 36A:
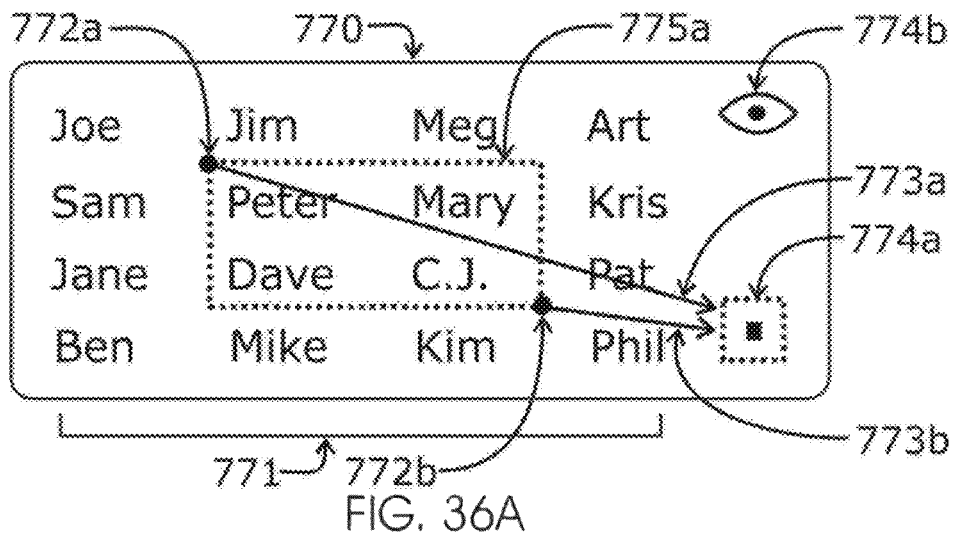
FIG. 36A illustrates a pair of saccadic eye movements to select multiple elements (i.e., names) from within a region of displayed elements.
Figure 36B:
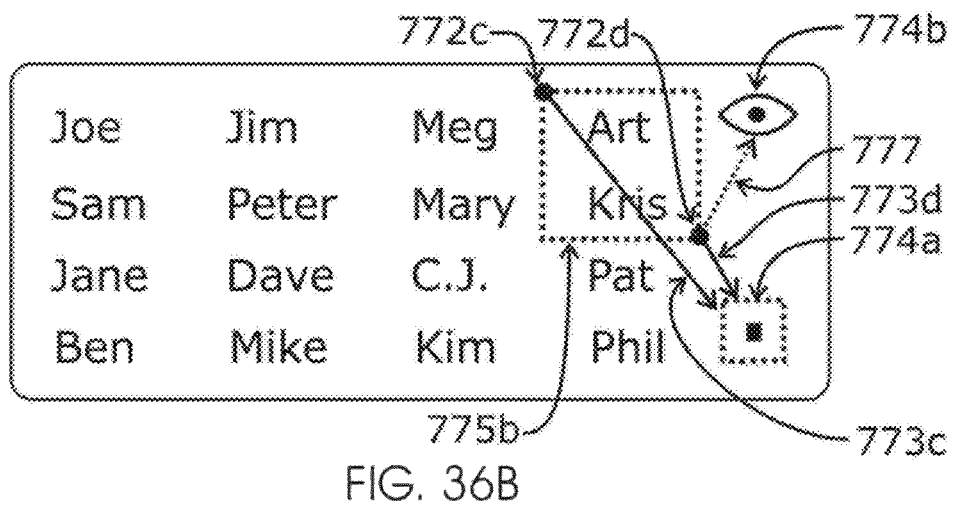
FIG. 36B shows additional saccadic eye movements to append additional elements (i.e., names) to previously selected elements.
Figure 36C:
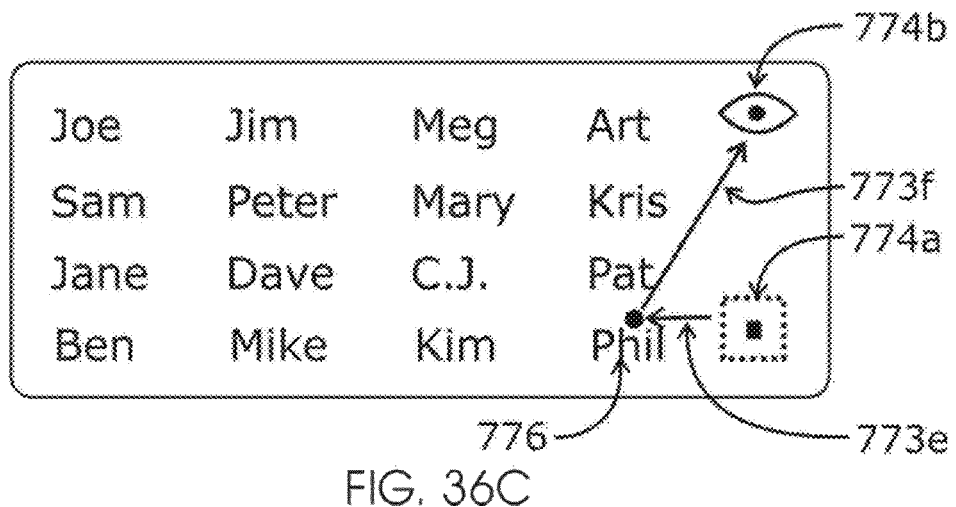
FIG. 36C illustrates a saccadic eye movement to append an additional name and to perform an action on all of the selected elements.

FIGS. 36A-36C illustrate series of eye movements 773a, 773b to select multiple individuals from an array of potential text-message or e-mail recipients 771 listed on a display 770. In FIG. 36A, a group of recipients (Peter, Mary, Dave, C.J.) within a region 775a on the display 770 may be selected by first performing a saccadic eye movement (represented as a solid line containing an arrowhead representing movement direction, 773a) from a corner 772a of the selected region 775a to an "area selection" target icon (in this case, a square made from dashed lines with a central focal spot, 774a). The user may then perform any number of additional eye movements (as long as no saccade to an activation target 774b is performed) in order to seek out a second corner 772b of the region 775a containing the desired elements. Once found by the user, a saccade 773b from the second corner 772b of the region 775a to the area selection target 774a defines the region 775a with the selected names.

At this point, a saccade from the area selection target 774a to the activation target 774b would initiate an action (i.e., sending e-mails to recipients) based on the four (4) names in the first selected region 775a. However, as illustrated in FIG. 36B, if another region of recipient names is to be included in the action, then an initial corner 772c of the second selected region 775b may be specified by saccading 773c from the selected corner 772c to the area selection target 774a. Similar to the first region selected 775a, the user may then perform any number of exploratory eye movements (as long as no saccade to an activation target 774b is performed) in order to seek out a second corner 772d of the second region 775b containing selected elements. Once found by the user, a saccade 773d from the second corner 772d of the region 775b to the area selection target 774a defines the region 775b with the additional selected names (i.e., Art, Kris). Alternatively, the order in which corner elements 772a, 772b are chosen may be reversed.

If no further names were to be added to the list, the user may make a saccadic eye movement (illustrated as a dashed line with an arrowhead, 777) directly from the second corner 772d of the selected region 775b to the activation target 774b, thereby appending the second set of names to the list of e-mail recipients and performing a function within the activation sequence (e.g., sending the e-mails). Alternatively (although less efficient from a total eye movement perspective), after saccading 773d to the area selection target 774a, a subsequent saccade directly to the activation target 774b, would similarly apply the selected function to the combined first 775a and second 775b sets of recipients.

FIG. 36C illustrates a series of additional eye movements that may be used to append one additional name (Phil, 776) to the list of e-mail recipients. A saccade 773e may be made from the area selection target 773c to explore such additional recipients 771. Once found, a saccade 773f directly from the single selection (Phil, 776) to the activation target 774b appends the single element to the accumulated list and initiates the selected action. In this case, it was not necessary to define a region on the display 770 since only a single element was selected; however, an equivalent result would have been achieved if a region containing a single element were selected using the area selection target 774a followed by a saccade directly from the area selection target 774a to the activation target 774b.

It will be appreciated that the various components and features described with the particular embodiments may be added, deleted, and/or substituted with the other embodiments, depending upon the intended use of the embodiments.

Further, in describing representative embodiments, the specification may have presented the method and/or process as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims.

While the invention is susceptible to various modifications, and alternative forms, specific examples thereof have been shown in the drawings and are herein described in detail. It should be understood that the invention is not to be limited to the particular forms or methods disclosed, but to the contrary, the invention is to cover all modifications, equivalents and alternatives falling within the scope of the appended claims.

We claim:

1. A method for providing a graphical user interface to convey intent of a user based at least in part on movement of the user's one or both eyes using a detector, the method comprising:
   identifying, with the detector, when the user's one or both eyes are directed at a first key of a first keyboard;
   identifying, with the detector, a first one or more saccades of the user's one or both eyes from the first key towards, not within a pre-determined distance from, a second key of a second keyboard that has a set of keys;
   confirming, with the detector, that one or more corrective saccades toward the location of the second key for the first one or more saccades are completed to within the pre-determined distance from the location of the second key; and
   performing an action associated with one or both of the first key and the second key, without waiting for perception of the second key by the user.

2. The method of claim 1, wherein the second keyboard is one of a virtual keyboard projected onto a display and a physical object.

3. The method of claim 1, wherein the action comprises concatenating a character associated with the first key to a series of characters.

4. The method of claim 3, wherein the concatenating a character associated with the first key forms one of a group consisting of a word, phrase, sentence, and a number.

5. The method of claim 1, wherein the first and second keyboards are virtual keyboards presented on a display adjacent one another.

6. The method of claim 1, wherein the first and second keyboards include a plurality of keys including one or more of a representation of numbers, letters, words, phrases, selections, media glyphs, or special characters.

7. The method of claim 1, wherein the action comprises adding a symbol assigned to the first key to a field displayed on a display.

8. The method of claim 1, further comprising:
   identifying the second key with the detector when the user's one or both eyes are directed at the second keyboard;
   identifying, with the detector, a second one or more saccades of the user's one or both eyes from the second key towards a third key of the first keyboard;
   confirming, with the detector, that a second one or more corrective saccades toward a location of the third key for the second one or more saccades are completed within a predetermined distance from the third key of the first keyboard; and
   performing a second action associated with one or both the third key and the second key, without waiting for perception of the third key of the first keyboard by the user.

9. The method of claim 8, wherein the action comprises modifying symbols presented on keys of the second keyboard based on at least in part on the first key.

10. The method of claim 9, wherein modifying symbols presented on keys of the second keyboard comprises omitting symbols from the keys of the second keyboard that cannot be associated with a symbol presented on the first key.

11. The method of claim 8, wherein the action comprises modifying symbols presented on keys of the second keyboard based on at least in part on the first key.

12. The method of claim 1, wherein the second key is an activation target.

13. The method of claim 1, wherein the second key is located within one of a parafoveal view and a peripheral view of the user.

14. The method of claim 1, wherein the first key is located within a virtual keyboard on a display and the second key is located within a field-of-view of the user not on the display.

15. The method of claim 1, wherein the action is performed immediately upon confirming that the one or more corrective saccades for the first one or more saccades are completed from the first key to within a pre-determined distance from the location of the second key independent of any further action by the user.

16. The method of claim 1, further comprising:
   after identifying when the user's one or both eyes are directed at the first key of the first keyboard, changing a brightness of a most frequently used feature of the second key of the second keyboard.

17. The method of claim 1, wherein:
   the second keyboard has a same set of keys in an identical layout as the first keyboard; and
   the second keyboard is adjacent and in a same orientation as the first keyboard.

18. A method for providing a graphical user interface to convey intent of a user based at least in part on movement of the user's one or both eyes using a first keyboard, a second keyboard, and a detector, the method comprising:
   identifying, with the detector, when the user's one or both eyes are directed within a predetermined distance from a location of a first key on the first or second keyboard, wherein at least one key of the first or second keyboard is activatable using a single saccadic eye movement while other keys of the first and second keyboards are activatable using two saccadic eye movements, wherein the second keyboard is positioned vertically adjacent and in a same orientation as the first keyboard relative to the user's eyes, the second keyboard having a same set of keys in a same layout as the first keyboard, and wherein most frequently used keys of one or more of the first and second keyboards occupy one or more central rows of a plurality of rows of keys of the keyboards;
   identifying, with the detector, a first one or more saccades of the user's one or both eyes from the first key towards, not within a pre-determined distance from, a second key on the keyboard;
   confirming, with the detector, that one or more corrective saccades toward a location of the second key for the one or more saccades are completed to within the pre-determined distance from the location of the second key; and performing an action associated with one or both of the first key and the second key.

19. The method of claim 18, wherein the action is performed without waiting for perception of the second key by the user.

20. The method of claim 18, wherein the action comprises concatenating a character associated with the first key to a stored series of characters.

21. The method of claim 20, wherein the concatenating a character associated with the first key forms one of a group consisting of a word, a sentence, and a number.

22. The method of claim 18, wherein at least one of the first and second keyboards are projected onto the graphical user interface.

23. The method of claim 18, wherein the first and second keyboards include an off-display modifier target for a frequently used function associated with at least one key of one of the keyboards, the method further comprising:

changing brightness of a most frequently used feature of the second key on the keyboard after identifying with the detector when the user's one or both eyes are within the predetermined distance from the location of the first key on the keyboard.

24. A graphical user interface to determine intent of a user based at least in part on movement of the user's one or both eyes, the graphical user interface comprising:

a projector configured to display at least a first keyboard;
a detector configured to:
identify when the user's one or both eyes are directed at a first key of the first keyboard, wherein at least one key of the first keyboard is activatable using a single saccadic eye movement while other keys of the first keyboard are activatable using two saccadic eye movements;
identify a first one or more saccades of the user's one or both eyes from the first key towards, not within a pre-determined distance from, a second key of a second keyboard;
confirm that one or more corrective saccades toward a location of the second key for the first one or more saccades are completed to within a pre-determined distance from the location of the second key; and
a processor configured to perform an action associated with one or both of the first key and the second key in response to confirmation that the one or more corrective saccades for the first one or more saccades are completed to within the pre-determined distance from the location of the second key, without waiting for perception of the second key by the user.

25. The graphical user interface of claim 24, wherein the action the processor is configured to perform comprises concatenating a character associated with the first key to a series of characters.

26. The graphical user interface of claim 24, wherein the first and second keyboards include a plurality of keys including one or more of a representation of numbers, letters, words, phrases, selections, media glyphs, or special characters.

27. The graphical user interface of claim 24, wherein the first and second keyboards are virtual keyboards that have identical layouts.

28. The graphical user interface of claim 24, wherein the detector is configured to:

identify the second key when the user's one or both eyes are directed at the second keyboard;
identify a second one or more saccades of the user's one or both eyes from the second key towards a third key of the first keyboard;
confirm that a second one or more corrective saccades for the second one or more saccades are completed within a specified distance from the third key of the first keyboard; and
the processor is configured to perform a second action associated with one or both the third key and the second key in response to confirmation that the second one or more corrective saccades for the second one or more saccades are completed within the specified distance from the third key of the first keyboard, without waiting for perception of the third key of the first keyboard by the user.

\* \* \* \* \*